United States Patent
Suzuki et al.

[19]

[11] Patent Number: 5,869,916
[45] Date of Patent: Feb. 9, 1999

[54] ELECTROSTATIC ACTUATOR WITH DIFFERENT ELECTRODE SPACING

[75] Inventors: Hidetoshi Suzuki, Hamamatsu; Takeshi Tanaka, Toyohashi, both of Japan

[73] Assignee: Asmo Co., Ltd., Kosai, Japan

[21] Appl. No.: 653,717

[22] Filed: May 23, 1996

[30] Foreign Application Priority Data

May 26, 1995 [JP] Japan .................................. 7-127912

[51] Int. Cl.⁶ .............................................. H02N 11/00
[52] U.S. Cl. ........................................................ 310/309
[58] Field of Search ............................................ 310/309

[56] References Cited

U.S. PATENT DOCUMENTS

| | | | |
|---|---|---|---|
| 5,239,222 | 8/1993 | Higuchi et al. | 310/309 |
| 5,448,124 | 9/1995 | Higuchi et al. | 310/309 |
| 5,541,465 | 7/1996 | Higuchi et al. | 310/309 |
| 5,585,683 | 12/1996 | Higuchi et al. | 310/309 |

FOREIGN PATENT DOCUMENTS

| | | | |
|---|---|---|---|
| 0 584 479 | 3/1994 | European Pat. Off. | H02N 1/00 |
| 283013 | 8/1991 | Germany | H02N 1/08 |
| 293 013 | 8/1991 | Germany | 310/309 |
| 2-311186 | 12/1990 | Japan | H02N 11/00 |
| 04-236179 | 8/1992 | Japan | 310/309 |
| 4-236179 | 8/1992 | Japan | H02N 10/00 |
| 4-237179 | 8/1992 | Japan | H02N 2/00 |
| 4-271284 | 9/1992 | Japan | H02N 1/00 |
| 4-281371 | 10/1992 | Japan | H02N 1/00 |
| 5-122948 | 5/1993 | Japan | H02N 1/00 |
| 5-176558 | 7/1993 | Japan | H02N 1/00 |
| 5-184162 | 7/1993 | Japan | H02N 1/00 |
| 5-236768 | 9/1993 | Japan | H02N 11/00 |
| 5-260766 | 10/1993 | Japan | 310/309 |
| 06339285 | 12/1994 | Japan | 310/309 |
| 7-16599 | 3/1995 | Japan | H02N 1/00 |
| 7-42572 | 8/1995 | Japan | H02N 1/00 |
| 7-281110 | 10/1995 | Japan | G02B 26/02 |
| 6-19270 | 1/1996 | Japan | H02N 1/00 |
| 8-29556 | 2/1996 | Japan | G04C 3/00 |
| 187364 | 10/1966 | U.S.S.R. | |
| 92/22125 | 10/1992 | WIPO | 310/309 |

OTHER PUBLICATIONS

US Application No.: 08/580,292; Applicant: Tanaka; Title: Light Transmittance Adjusting Apparatus, file date: Dec. 28, 1995.

*Primary Examiner*—Thomas M. Dougherty
*Attorney, Agent, or Firm*—Burns, Doane, Swecker & Mathis, LLP

[57] ABSTRACT

In an electrostatic actuator, a stator element having electrodes formed on an insulation layer and a movable element having electrodes formed on an insulation layer. The movable element is arranged opposite to the stator element so as to be movable with respect to the stator element. The electrodes of the movable element and the stator element are connected together at every other electrode to provide two phases for the movable element and the stator element, respectively. An interval of the electrodes of the stator element is made unequal. The electrodes of the movable element are applied with a voltage of fixed polarity, while the electrodes of the stator element are applied with a voltage of switched-over polarity. A ground section is provided between adjacent ones of the electrodes of one of the movable element and the stator element and is continuously grounded.

7 Claims, 39 Drawing Sheets

$(t_0 \sim t_1)$ $(t_1 \sim t_2)$ $(t_2 \sim t_3)$ $(t_3 \sim t_4)$ $(t_4 \sim t_5)$ FIG. 5(A) (t5~t6)
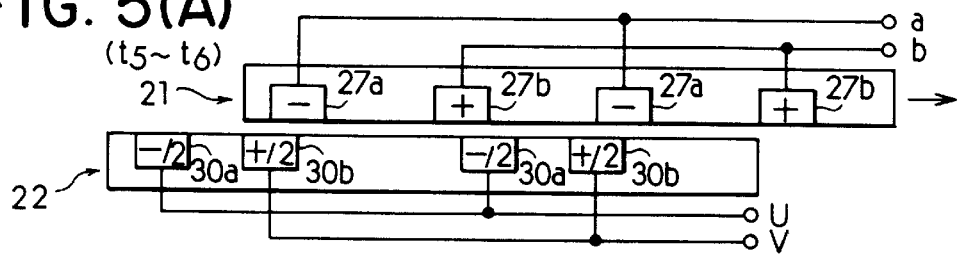
FIG. 5(B) (t6~t7)
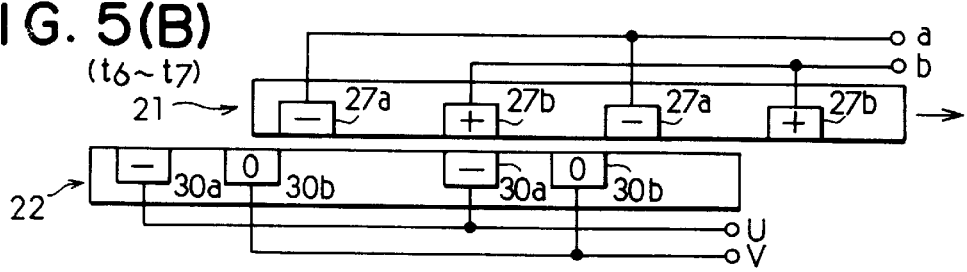
FIG. 5(C) (t7~t8)
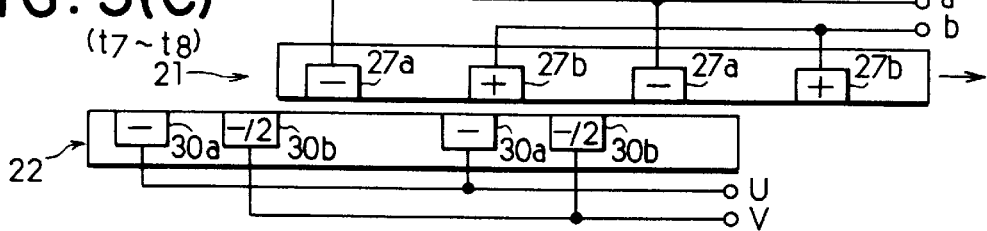
FIG. 5(D) (t8~t9)
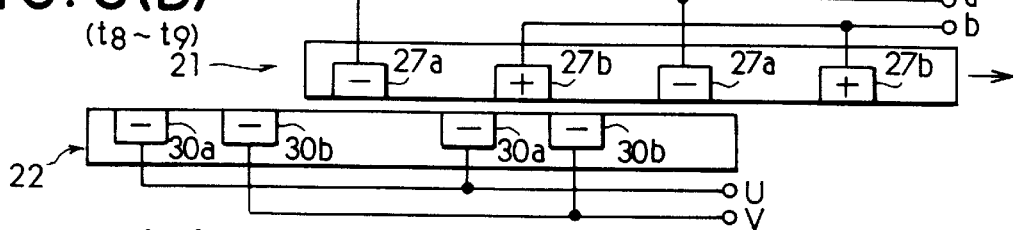
FIG. 5(E) (t9~t10)
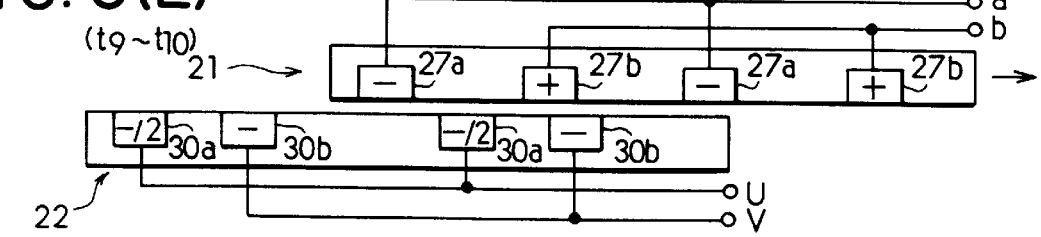

FIG. 11(A) (t5~t6)
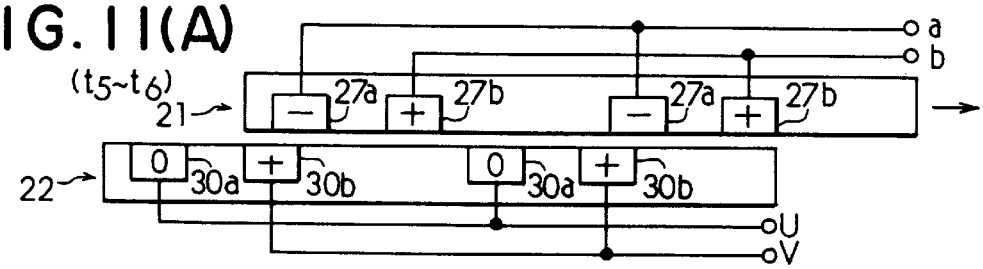
FIG. 11(B) (t6~t7)
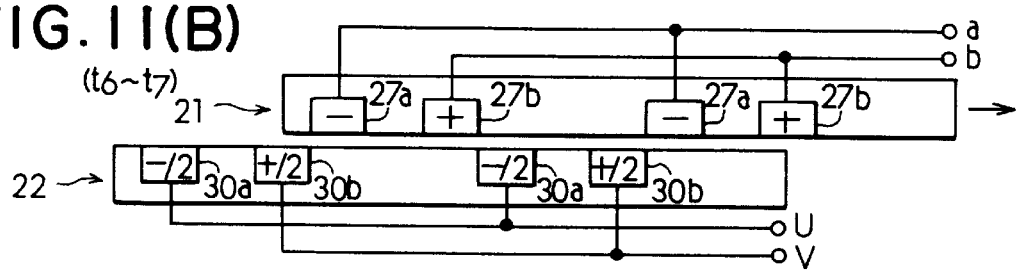
FIG. 11(C) (t7~t8)
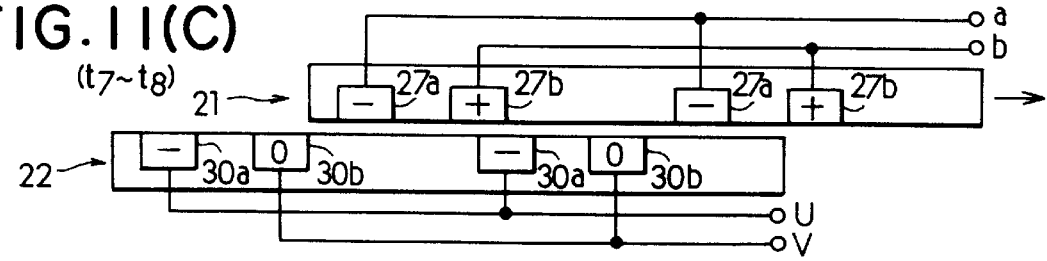
FIG. 11(D) (t8~t9)
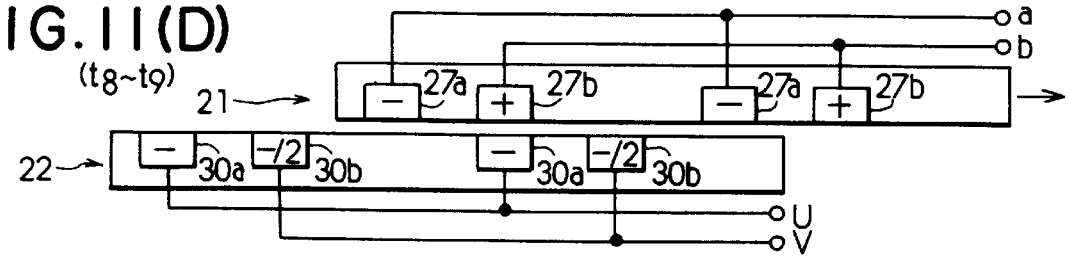
FIG. 11(E) (t9~t10)
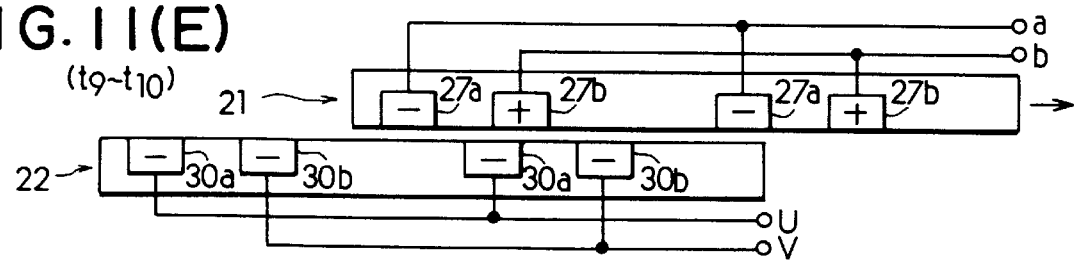

FIG. 16(A) (t0~t1)
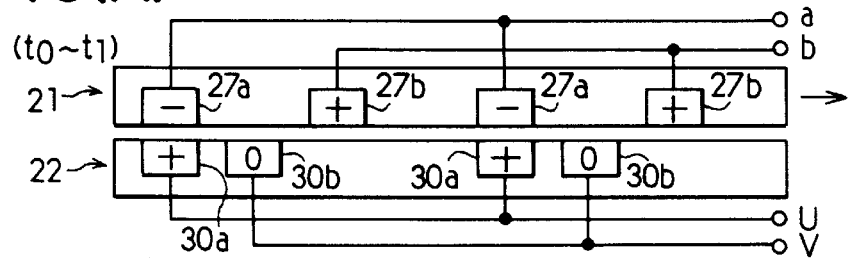
FIG. 16(B) (t1~t2)
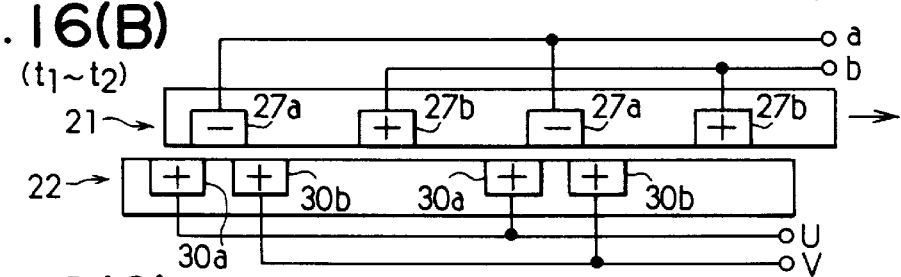
FIG. 16(C) (t2~t3)
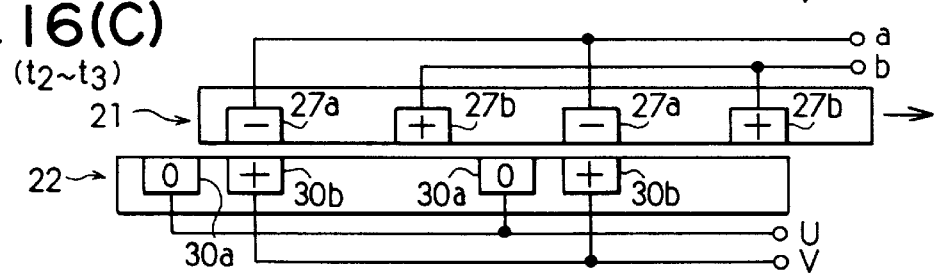
FIG. 16(D) (t3~t4)
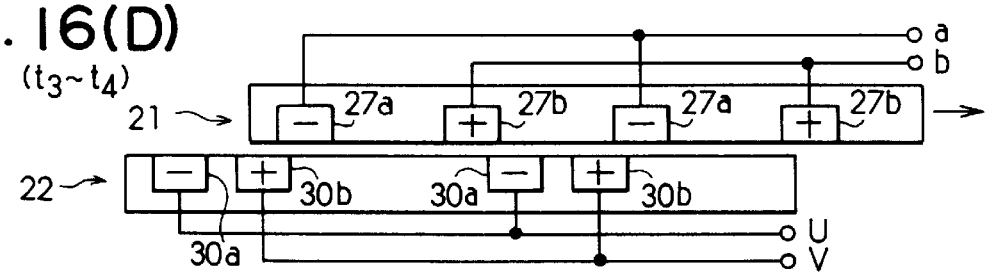
FIG. 16(E) (t4~t5)
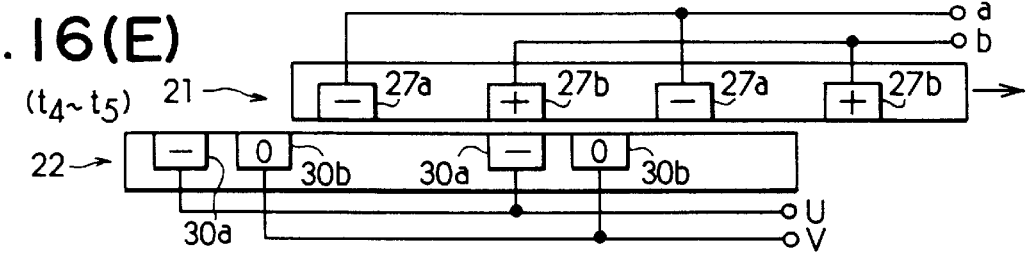

FIG. 23(A) ($t_4 \sim t_5$)
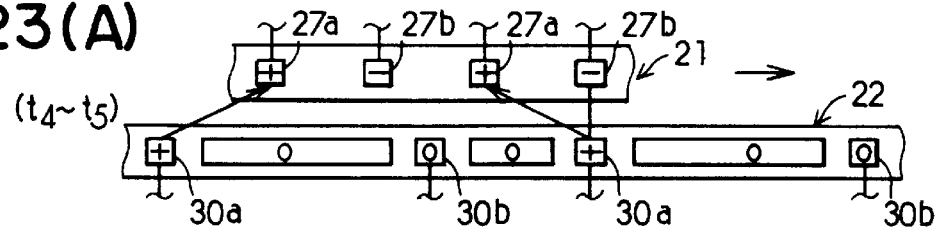
FIG. 23(B) ($t_5 \sim t_6$)
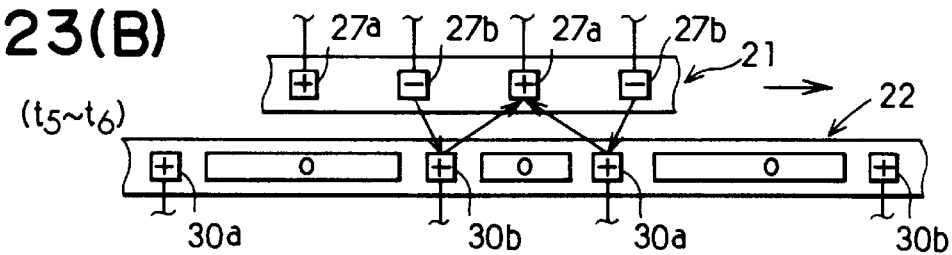
FIG. 23(C) ($t_6 \sim t_7$)
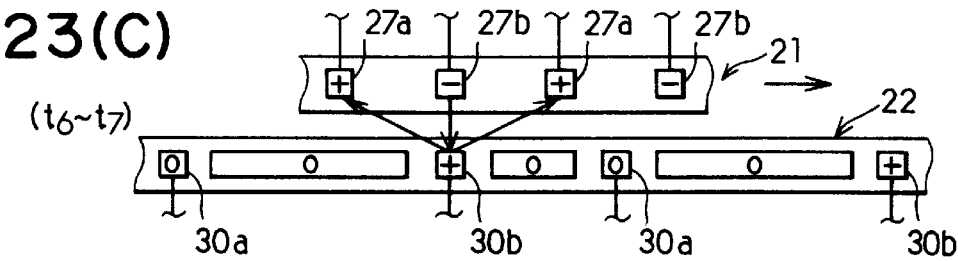
FIG. 23(D) ($t_7 \sim t_8$)
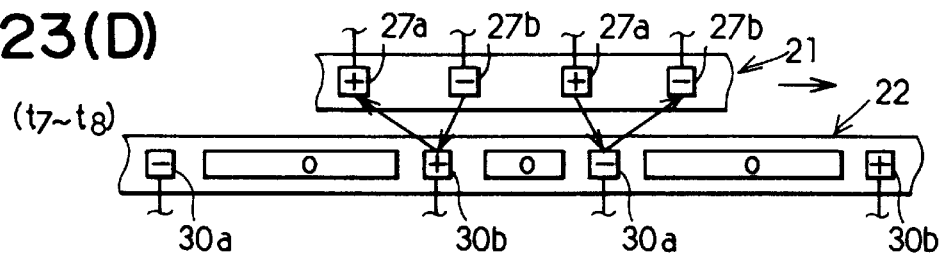
FIG. 23(E) ($t_8 \sim t_9$)
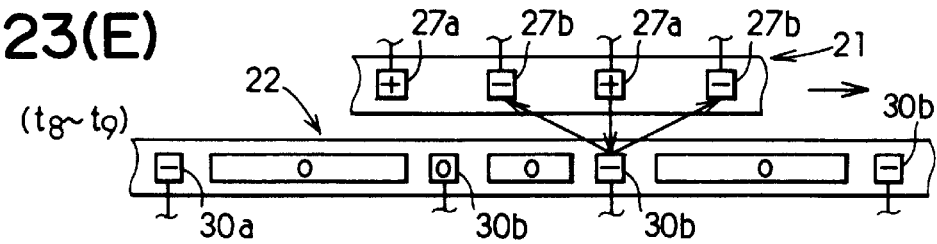

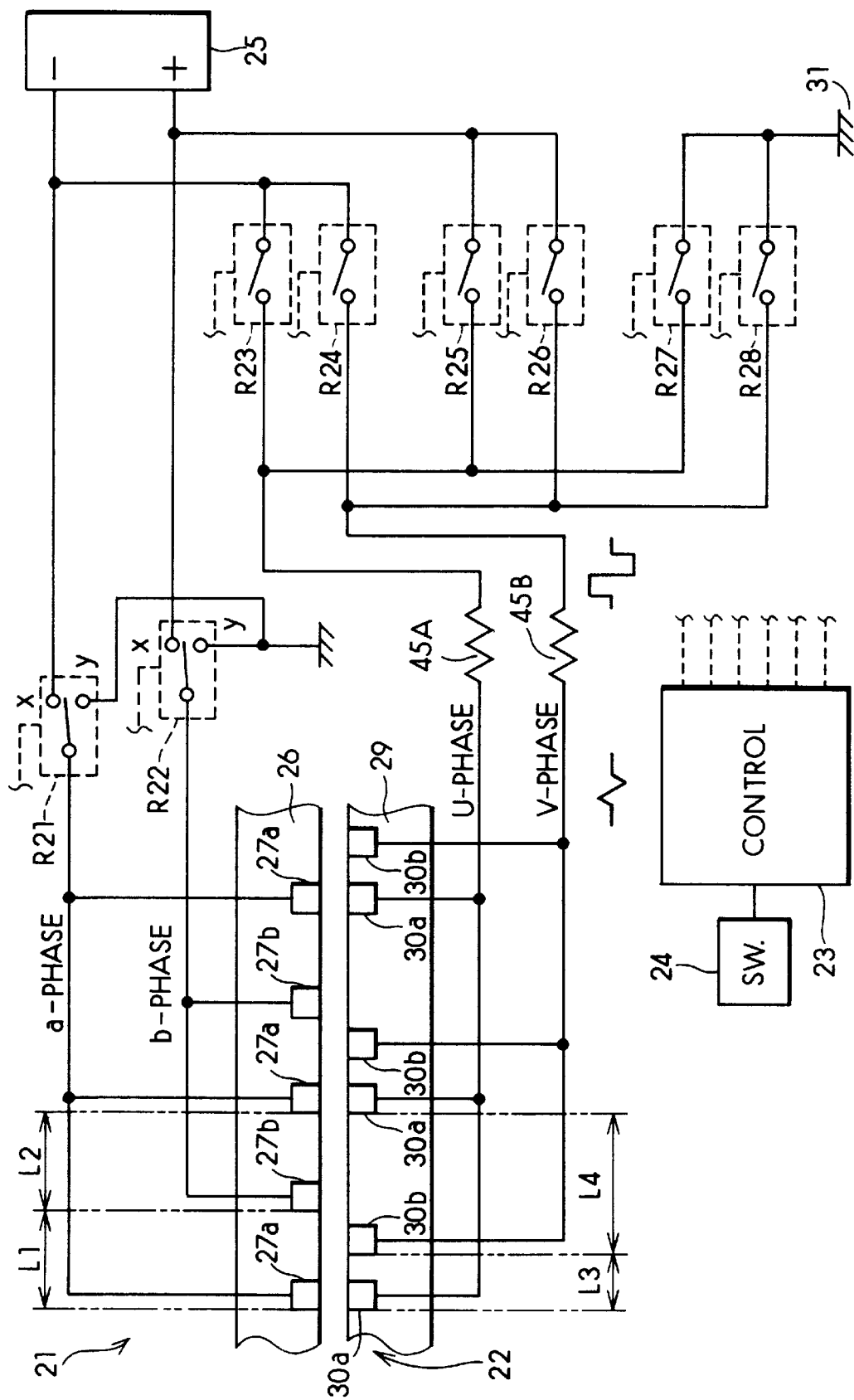

F I G. 36(A)
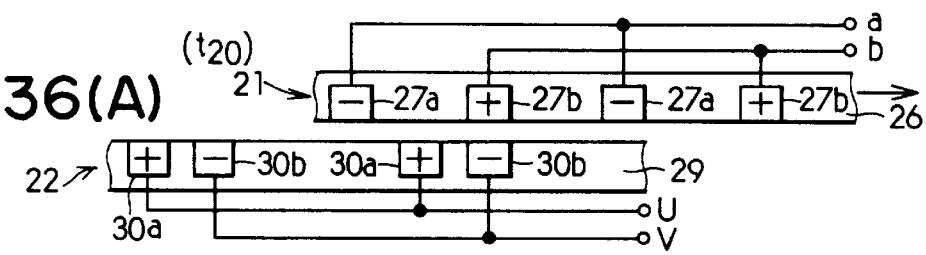
F I G. 36(B)
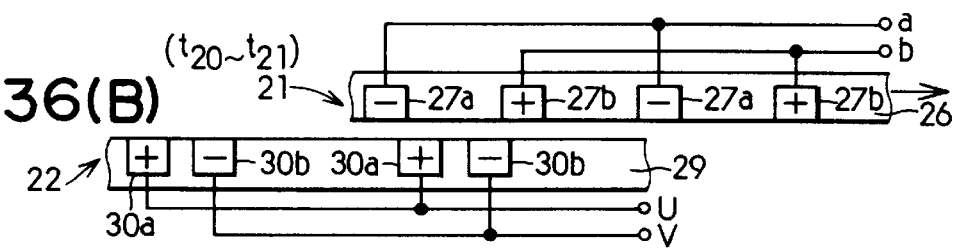
F I G. 36(C)
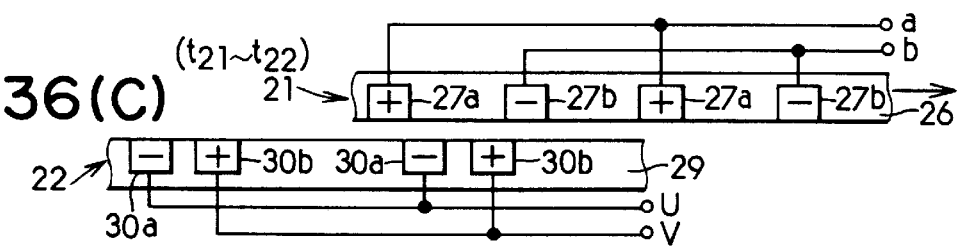

5,869,916

ELECTROSTATIC ACTUATOR WITH DIFFERENT ELECTRODE SPACING

BACKGROUND OF THE INVENTION

1. Field of the Invention

This invention relates to electrostatic actuators suitably used as driving sources of shading devices such as vehicular sunvisors, moon-roofs, and rear-windows, or those for trains, aircraft, ships or others, or paper-feeders for copying machines. More particularly, it relates to simplification in structure and prevention of electrification of a stator element and a movable element of an electrostatic actuator which has electrodes provided on respective insulation layers of the stator element and the movable element so that the movable element is driven by attractive force and repulsive force resulting from static electricity created between the electrodes of the stator element and the electrodes of the movable element.

2. Description of Related Art

Conventionally, as an electrostatic actuator of this kind, there has been an electrostatic actuator, shown in FIG. 40, previously proposed in Unexamined Utility Model Publication (Kokai) No. H7-16599 by the present applicant.

In this electrostatic actuator, the movable element 1 has electrodes 3a, 3b, 3c . . . 3a, 3b, 3c . . . provided in an insulation layer 2 thereof so that electrodes 3a, 3b, 3c positioned every third one of these electrodes 3a, 3b, 3c . . . 3a, 3b, 3c . . . are connected so as to provide three phases, or a-phase, b-phase, and c-phase. With the a-phase electrode 3a and the b-phase electrode 3b are further connected together to form two phases. On the other hand, the stator element 4 has electrodes 6a, 6b, 6c provided in an insulation layer 5 thereof so that electrodes 6a, 6b, 6c positioned in every third one of these electrodes 6a, 6b, 6c are connected together to provide three phases, or U-phase, V-phase, and W-phase. In this manner, where the electrodes 6a–6c of the stator element 4 are structured in three phases, electrodes of two phases, or the U-phase and V-phase electrodes 6a, 6b in FIG. 41, of the U-phase, V-phase, and W-phase electrodes 6a–6c are connected to electricity-feed portions 7A, 7B provided in a plane same as the insulation layer 5 in which electrodes 6a–6c are arranged, while the remaining one phase of electrodes, or the W-phase electrodes 6c in FIG. 41, are connected to an electricity-feed portion 7C located in a surface of the insulation layer 5 opposite to the surface provided with electrodes 6a to 6c through a conductive member 8 inserted in a through-hole 5a formed in the insulation layer 5.

In this structure, however, there is a necessity of providing an electricity-feed portion 7C on a side opposite to the electrodes 6a–6c and the electricity-feed portions 7A, 7B, as well as providing the through-hole 5a and the conductive member 8, resulting in structural complexity for the stator element 4.

On the contrary, Unexamined Patent Publication (Kokai) No. H2-311186 provides an electrostatic actuator, as shown in FIG. 42, which possesses three phases of electrodes 11a, 11b, 11c provided in the stator element 10 so that one phase of electrodes 11b are arranged in a zigzag form with respect to other two phases of electrodes 11a, 11c, thereby providing three phases of electrodes 11a–11c in one surface of the stator element 10.

However, in the electrostatic actuator of Unexamined Patent Publication No. H2-311186, shown in FIG. 42, the stator element 10 is complex in structure because there is a necessity of providing three phases of electrodes 11a, 11b, 11c with one phase of electrodes 11b arranged in the zigzag form, as stated hereinbefore. Also, in this electrostatic actuator, there is a problem that the driving force for the movable element is small because voltage is adapted to be applied solely to the electrodes 11a, 11b, 11c of the stator element 10 without applying voltage to the electrodes of the movable element.

Also, Unexamined Patent Publication No. H4-281371 discloses an electrostatic actuator having, as shown in FIG. 43, electrodes of three phases of R-phase, S-phase, and T-phase in the stator element, wherein an S-phase electrode is arranged zigzag relative to other two phases of electrodes, to provide three-phase electrodes in one surface of the stator element with the spacing unequally made between electrodes of three phases.

The electrostatic actuator of Unexamined Patent Publication No. H4-281371, shown in FIG. 43, also has the electrodes of three phases provided in the stator element so that the stator element is complex in structure. Further, the driving force is small because of absence of electrodes in the movable element.

Further, Unexamined Patent Publication No. H5-176558 proposes an electrostatic actuator, which as shown in FIG. 44 has electrodes of four phases a, b, c, and d provided zigzag in the stator element with the spacing made unequally between electrodes of four phases.

In the electrostatic actuator of Unexamined Patent Publication No. H5-176558, shown in FIG. 44, the stator element is particularly complex in its structure because four phases of electrodes are provided in one surface of the stator element. And no electrodes are provided in the movable element, not shown, resulting in small driving force.

Furthermore, Unexamined Patent Publication No. H4-236179 proposes an electrostatic actuator, which as shown in FIG. 45 has a structure of two phases provided for both of electrodes 13a, 13b of the movable element 12 and electrodes 15a, 15b of the stator element 14.

In the electrostatic actuator of Unexamined Patent Publication No. H4-236179, the electrode pitch is constant for the electrodes 15a, 15b of the movable element 14 as well as the electrodes 13a, 13b of the stator element 12, to provide such a structure that the movable element is driven solely by the attractive force acting on between the electrodes 15a, 15b of the movable element 14 and the electrodes 13a, 13b of the stator element 12, reducing the driving force small. Also, in this electrostatic actuator, there is a necessity of switching over of the polarity of voltages applied to both of electrodes 13a, 13b of the stator element 12 and the electrodes 15a, 15b of the movable element 14, imposing complexity in its control manner.

Further, in the above conventional electrostatic actuators, there may be a case where voltages with a waveform in the same polarity be applied to a plurality of phases of electrodes present in the movable element or stator element. In the electrostatic actuator shown in FIG. 40, for instance, there is a state in which voltages in the same polarity "+" are applied to the U-phase electrodes 6a and the W-phase electrodes 6c as shown in the figure, though switching over is made for the polarities of the voltages applied to the electrodes 6a, 6b, 6c of the stator element 4. In such state, there is a possibility of electrification of "−" on the insulation layer 5 of the stator element 4.

Also, if there occurs deviation in the polarity of voltage applied to electrodes of one phase among plural phase electrodes within one period, there may occur electrification on either the movable element or the stator element which is provided with the electrodes. For instance, if the polarity of voltage applied within one period involves deviation toward the "−" side in one-phase electrodes, there is a possibility that electrification occurs on either the movable element or the stator element which includes electrodes. This electrification on the movable element or the stator element may possibly lower the driving force for the movable element.

SUMMARY OF THE INVENTION

The present invention has an object to provide an improved electrostatic actuator.

The present invention has an additional object to provide an electrostatic actuator, which has a movable element and a stator element simple in structure but is capable of solving the problem involved in the conventional electrostatic actuators.

The present invention has a further object to provide an electrostatic actuator which prevents electrification on the stator element or the movable element.

According to a first aspect of the present invention, an interval or spacing of at least one of electrodes of a movable element and electrodes of a stator element is made unequal so that two electrical phases are provided for the movable element by connecting together at every other electrode of the movable element and two electrical phases are provided for the stator element by connecting together electrodes at every other electrode of the stator element. Thus the electrodes of both the movable element and the stator element are made in two electrical phases, simplifying the structure of the movable element and the stator element.

Preferably, one of the interval of the electrodes of the movable element or the interval of the electrodes of the stator element is made unequal, or the interval of both of the electrodes of the movable element and the electrodes of the stator element is made unequal. Thus, two electrical phases can be provided for the electrodes of both the movable element and the stator element, simplifying the structure of the movable element and the stator element.

Preferably, the interval of the electrodes of the movable element and the interval of the electrodes of the stator element are set identical so that the movable element and the stator element is the same in structure. If electrodes are provided at a required interval in an insulation layer, it can be employed as a movable element and as a stator element.

According to a second aspect of the present invention, an interval or spacing of at least one of electrodes of a movable element and electrodes of a stator element is made unequal to provide two electrical phases for each element. Further, a ground section is provided in at least one of the movable element and the stator element so that the potential thereof is held at 0, preventing electrification on the movable element or the stator element.

BRIEF DESCRIPTION OF THE DRAWINGS

Other features and advantages of the present invention will become more apparent from the following description when read in conjunction with the accompanying drawings, in which

FIGS. 5(A), 5(B), 5(C), 5(D), and 5(E) are schematic diagrams for explaining a state of movement for the moving element;

FIGS. 11(A), 11(B), 11(C), 11(D), and 11(E) are schematic diagrams for explaining a state of movement for the moving element;

FIGS. 16(A), 16(B), 16(C), 16(D), and 16(E) are schematic diagrams for explaining a state of movement for the moving element;

FIGS. 23(A), 23(B), 23(C), 23(D), and 23(E) are schematic diagrams for explaining a state of movement for the moving element;

FIG. 25 is a schematic circuit diagram of an electrostatic actuator according to a fifth embodiment of the invention;

FIGS. 36(A), 36(B), and 36(C) are schematic diagrams for explaining a state of movement for the moving element;

DETAILED DESCRIPTION OF THE PRESENTLY PREFERRED EMBODIMENTS

Figure 1:
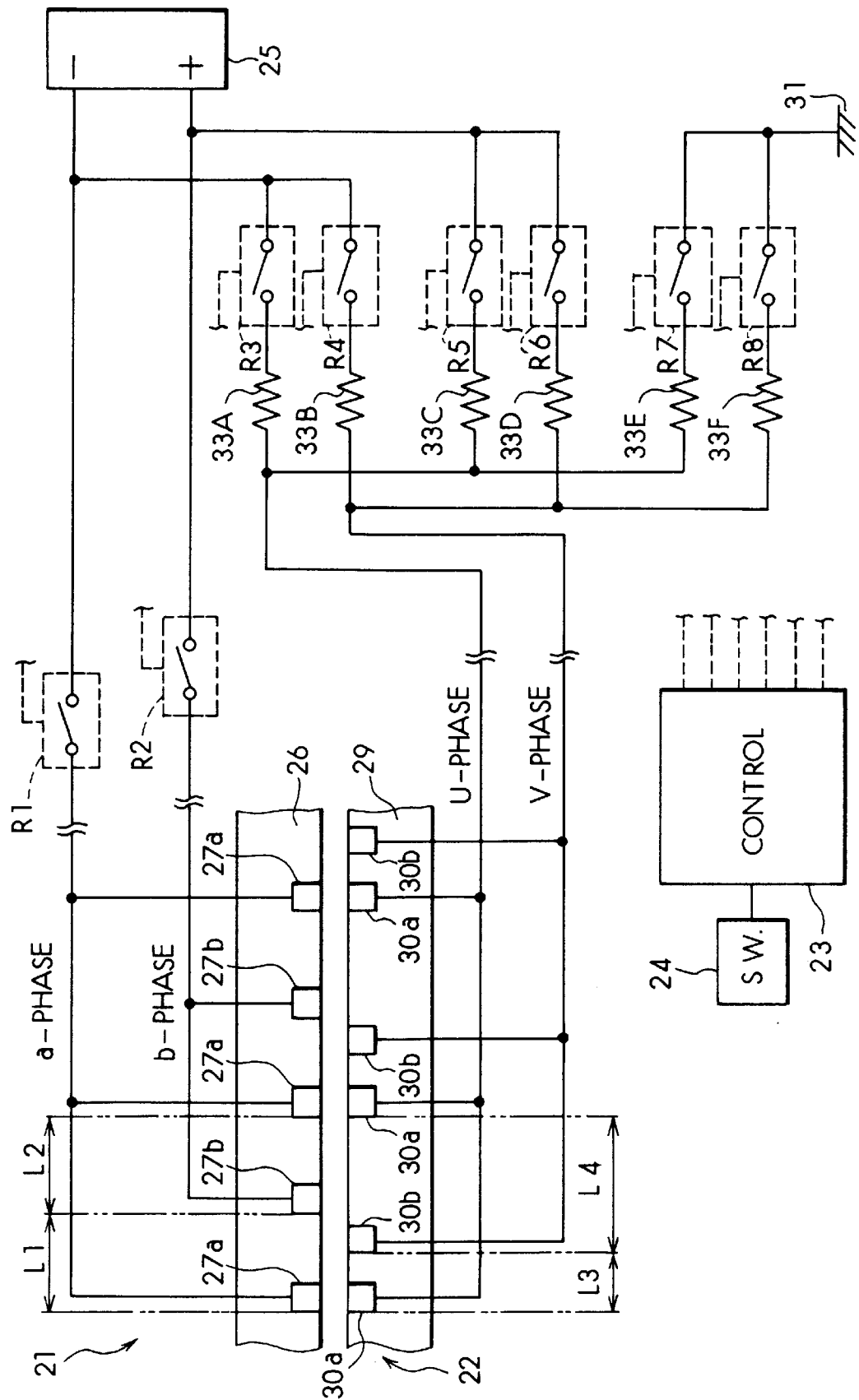
FIG. 1 is a schematic circuit diagram of an electrostatic actuator according to a first embodiment of the invention.

The present invention will then be explained in detail based on embodiments illustrated in the drawings.

Figure 2A:
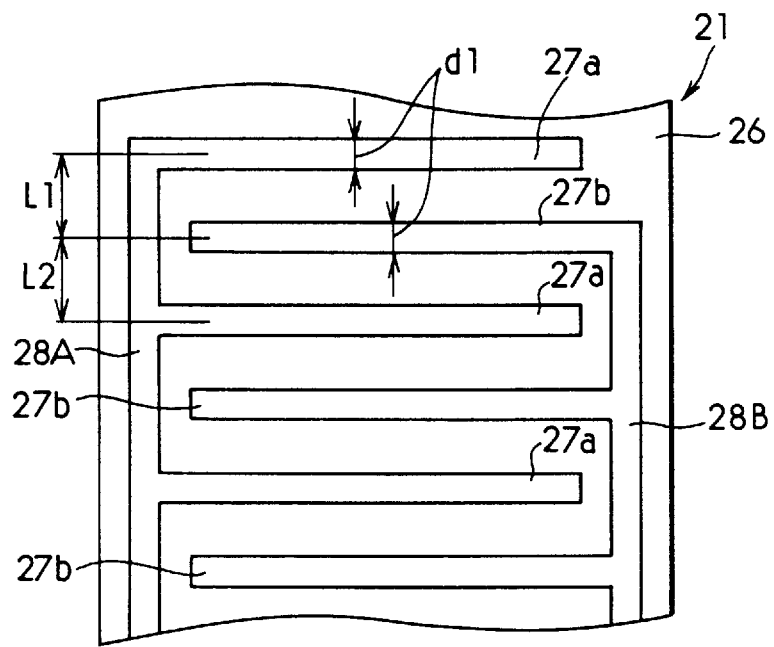
FIG. 2(A) is a partial plan view showing a movable element.
Figure 2B:
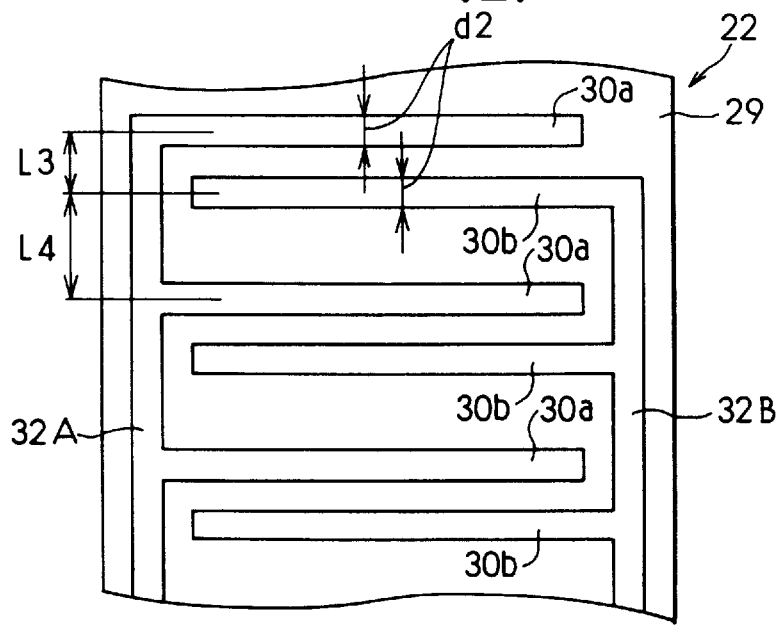
FIG. 2(B) is a partial plan view showing a stator element.

There is illustrated in FIG. 1, FIGS. 2(A) and 2(B) an electrostatic actuator according to a first embodiment of the 20 invention. The electrostatic actuator is provided with a movable element 21, a stator element 22, a control circuit 23, an operating switch 24, and a high voltage source 25.

The movable element 21, as shown in FIG. 2(A), has a plurality of electrodes 27a, 27b, ... 27a, 27b of a conductive metal, which are in the form of an elongate rectangle for forming a comb shape, provided in one surface of an sheet-shaped insulation layer 26 formed of dielectric such as polyethylene-terephthalate (PET), etc. These electrodes 27a, 27b are connected by every other one to respective electricity-feed portions 28A, 28B provided on either sides of the insulation layer 26. The electrodes 27a, 27a ... connected to one electricity-feed portion 28A constitute an electrical a-phase, while the electrodes 27b, 27b ... connected to the other electricity-feed portion 28B constitute an electrical b-phase.

The above-stated electrodes 27a, 27b for each phase of the movable element 21 have a width d1 equally set. Also, the a-phase electrodes 27a and the b-phase electrodes 27b have a spacing, i.e., interval or pitch, of electrodes equally set. Provided that the interval between an arbitrary electrode 27a of the a-phase electrodes 27a and an b-phase electrode 27b adjacent rightward as viewed in FIG. 1 to this electrode 27a is L1, and the interval between an arbitrary electrode 27b of the b-phase electrodes 27b and an a-phase electrode 27a adjacent rightward as viewed in FIG. 1 to the electrode 27b is L2, then L1:L2 is 1:1.

The a-phase electrodes 27a of the electrodes 27a, 27b of the movable element 21 are connected to a "−" side of the high-voltage source 25 via the electricity-feed portion 28A and a relay R1. The relay R1 acts to connect and cut off between the a-phase electrodes 27a and the "−" side of the high-voltage source 25, depending on instructions from the control circuit 23. The b-phase electrodes 27b of the electrodes 27a, 27b of the movable element 21, on the other hand, are connected to a "+" side of the high-voltage source 25 via the electricity-feed portion 28B and a relay R2. The relay R2 acts to connect and cut off between the b-phase electrodes 27b and the "+" side of the-high-voltage source 25, depending on instructions from the control circuit 23.

The stator element 22, as shown in FIG. 2(B), has a plurality of electrodes 30a, 30b, ... 30a, 30b of a conductive metal, which are in the form of elongate rectangles for forming a comb shape, provided in one surface of a sheet-shaped insulation layer 29 formed of dielectric such as polyethyleneterephthalate (PET), etc. These electrodes 30a, 30b are connected by every other one to respective electricity-feed portions 32A, 32B provided on either sides of the insulation layer 29. The electrodes 30a, 30a ... connected to one electricity-feed portion 32A constitute U-phase, while the electrodes 30b, 30b ... connected to the other electricity-feed portion 32B form V-phase.

The above-stated electrodes 30a, 30b for each phase of the stator element 22 are set equal in width d2. Also, the width d2 is equal to the width d1 of electrodes 27a, 27b for respective phases of the movable element 21. In the stator element 22, the interval between the U-phase electrode 30a and the V-phase electrode 30b is set unequal. That is, provided that the interval between an arbitrary electrode 30a of the U-phase electrodes 30a and an V-phase electrode 30b adjacent rightward as viewed in FIG. 1 to this electrode 30a is L3, and the interval between an arbitrary electrode 30b of the V-phase electrodes 30b and an U-phase electrode 30a adjacent rightward as viewed in FIG. 1 to this electrode 30b is L4, then L3:L4 is set to 1:2.

In this manner, the electrostatic actuator has unequal pitches between electrodes 30a, 30b of the stator element 22, to provide two phases to both of the electrodes 27a, 27b of the movable element 21 and the electrodes 30a, 30b of the stator element 22. Consequently, there is no necessity of providing through-holes or conductive materials in the movable element 21 and the stator element 22, thereby simplifying the structure for the movable element 21 and the stator element 22. Further, since the electrodes 27a, 27b, 30a, 30b of the movable element 21 and the stator element 22 are arranged in two electrical phases, it is possible to reduce the number of relays required for switching-over of the polarity, hereinafter mentioned, as compared with the case employing three electrical phases for the stator element.

The U-phase electrodes 30a of the electrodes 30a, 30b of the stator element 22 are connected from the electricity-feed portion 32A to the "−" side of the high-voltage source 25 via a resistor 33A and a relay R3, to the "+" side of the high-voltage source 25 via a resistor 33C and a relay R5, and also to a ground 31 having a potential of "0" via a resistor 33E and a relay R7. Similarly, the V-phase electrodes 30b of the electrodes 30a, 30b of the stator element 22 are connected from the electricity-feed portion 32B to the "−" side of the high-voltage source 25 via a resistor 33B and a relay R4, to the "+" side of the high-voltage source 25 via a resistor 33D and a relay R6, and also to a ground 31 via a resistor 33F and a relay R8. The relays R3–R8 acts to connect and cut off between the electrodes 30a, 30b of the stator element 22 and the "−" side or the "+" side of the high-voltage source 25 or the ground 31. A resistance value of 50 kΩ to 300 kΩ is employed for the resistors 33A–33F.

The control circuit 23 causes the relays R1–R8 to switch over, as stated hereinbelow, to alter the polarity of voltages applied to the electrodes 27a, 27b, 30a, 30b of the movable element 21 and the stator element 22. First, when a "−" voltage is to be applied to the a-phase electrodes 27a of the movable element 21, the control circuit 23 causes the relay R1 to turn on. Also, when a "+" high voltage is to be applied to the b-phase electrodes 27b of the movable element 21, it turns the relay R2 on.

On the other hand, when a "−" voltage is to be applied to the electrodes 30a, 30b of the stator element 22, the control circuit 23 causes the relays R3 and R4 to turn on, and the relays R5, R6 and the relays R7, R8 to turn off. Also, when a "+" high voltage is applied to the electrodes 30a, 30b of the stator element 22, the control circuit 23 causes the relays R5, R6 to turn on, and the relays R3, R4 and the relays R7, R8 to turn off. Further, when rendering the voltage on the electrodes 30a, 30b to "0" potential, the relays R7, R8 are turned on and the relays R3–R6 are turned off.

Also, when applying a ½ of the "−" voltage, denoted as "−/2", to the electrodes 30a, 30b of the stator element 22 wherein the "−" voltage is one applied by turning on the relays R3, R4 and turning off the relays R5, R6 and the relays R7, R8, the relays R3, R4 and the relays R7, R8 are turned on and the relay R5, R6 are turned off. Further, when applying a ½ of the "+" voltage, denoted as "+/2" wherein the "+" voltage is one applied by turning on the relays R5, R6 and turning off the relays R3, R4 and the relays R7, R8, the relay R5, R6 and the relays R7, R8 are turned on and the relay R3, R4 are turned off.

The operation of the first embodiment will be explained next.

In the first embodiment, the control circuit 23 causes the relays R1–R8 to switch over depending on setting of the operating switch 24 to thereby apply a voltage fixedly to the electrodes 27a, 27b of the movable element 21 while periodically switching over the polarity and the voltage value to apply a high voltage.

Figure 3:
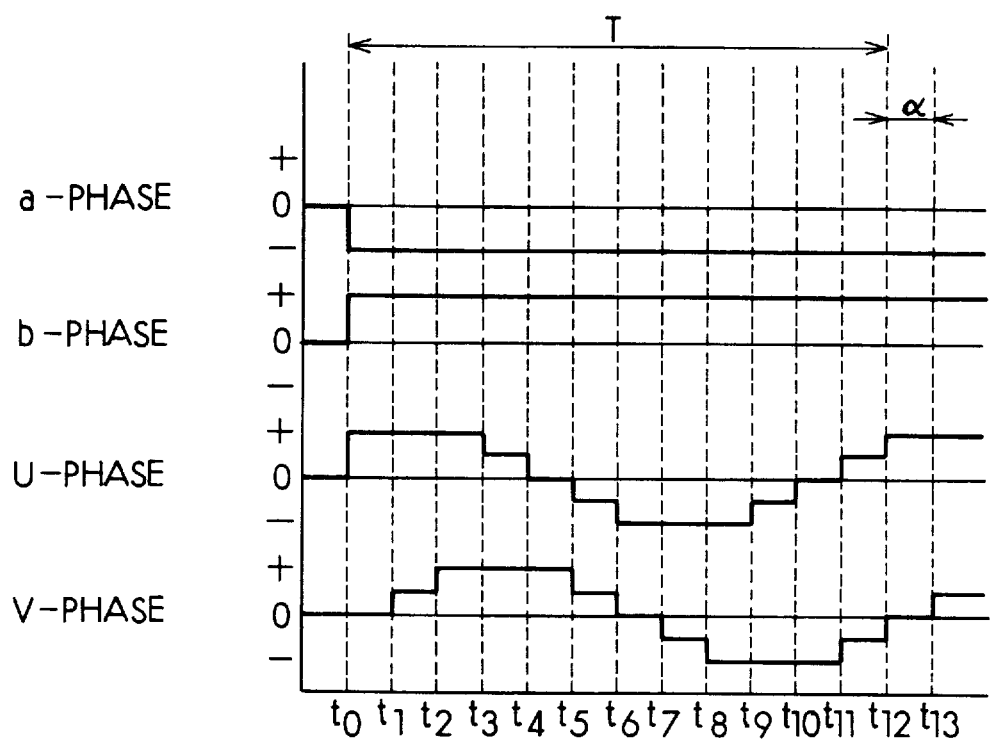
FIG. 3 is a waveform diagram showing voltages applied to a movable element and a stator element of a first embodiment.

In FIG. 3, the operating switch 24 is set held in "stationary" up to a time t0. During this time period, the relays R1 to R6 are turned off and the relays R7, R8 are turned on, so that the electrodes 27a, 27b of the movable element 21 and the electrodes 30a, 30b of the stator element 22 are at a potential "0" and accordingly the movable element 21 is held in a stationary state.

From the time t0, the operating switch 24 is set to "move rightward". On this occasion, a "−" high voltage is applied fixedly to the a-phase electrodes 27a of the movable element 21, while a "+" high voltage is applied fixedly to the b-phase electrodes 27b of the movable element 21. On the other hand, U-phase and V-phase electrodes 30a, 30b of the stator element 22 is applied by a voltage with the polarity and the voltage value switched periodically. The period T of switching-over of the polarity and the value of voltage applied to the stator element 22 involves 12 steps of an equi-time interval α. In this case, although the polarity and the voltage value are altered respectively in the same pattern for the U-phase electrodes 30a and the V-phase electrodes 30b, the polarity for the V-phase is switched with delay in phase by 2 steps, or ⅙ T, relative to the U-phase.

Figure 4A:
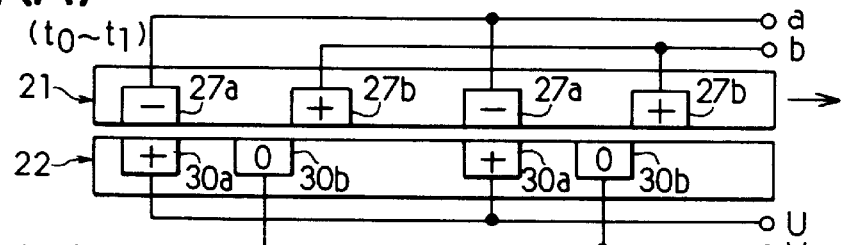
FIGS. 4(A), 4(B), 4(C), 4(D), and 4(E) are schematic diagrams for explaining a state of movement for the moving element.
Figure 4B:
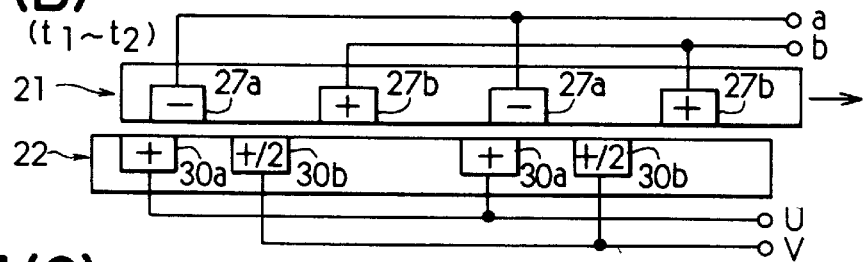
Figure 4C:
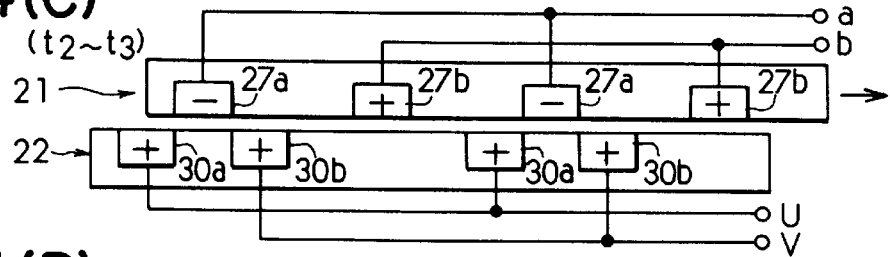
Figure 4D:
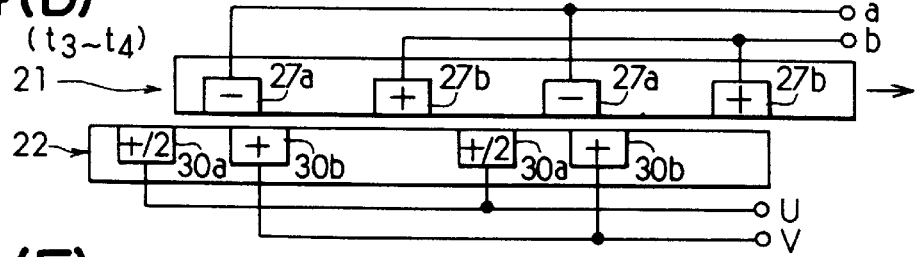
Figure 4E:
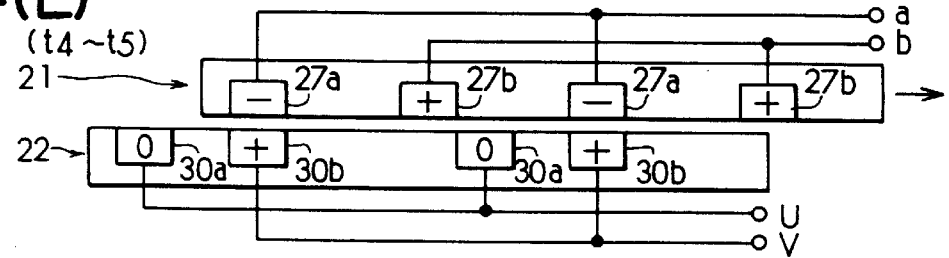
Figure 6A:
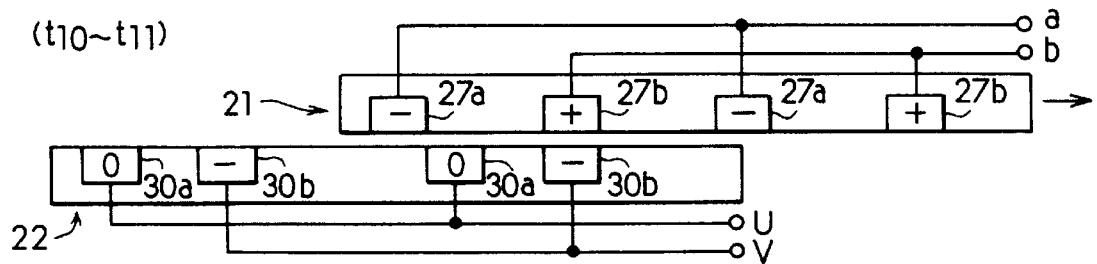
FIGS. 6(A), 6(B), and 6(C) are schematic diagrams for explaining a state of movement for the moving element.
Figure 6B:
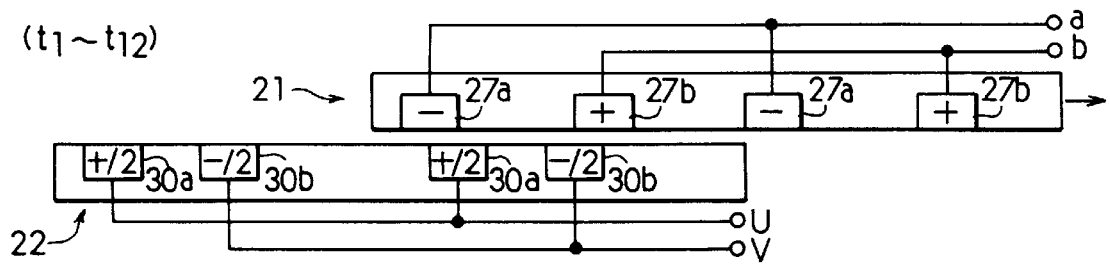
Figure 6C:
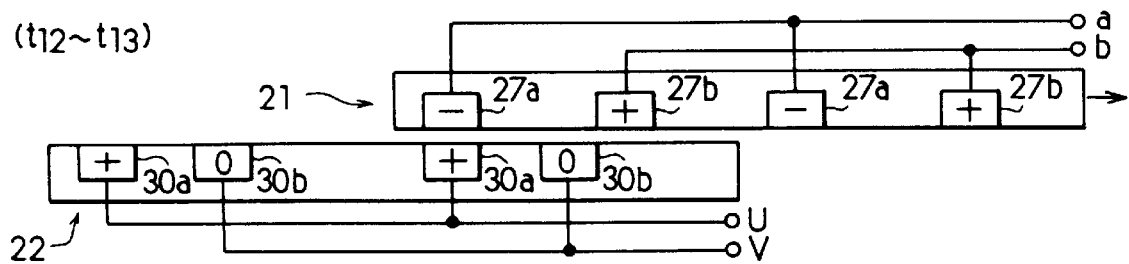

First, at a first step, or from time t0 to time t1 in FIG. 3, a state is given as the U-phase: "+" and the V-phase: "0", as shown in FIG. 4(A). At a second step, or from time t1 to time t2 in FIG. 3, the U-phase: "+" and the V-phase "+/2", as shown in FIG. 4(B). At a third step, or from time t2 to time t3 in FIG. 3, the U-phase: "+" and the V-phase: "+", as shown in FIG. 4(C). At a fourth step, or from time t3 to time t4 in FIG. 3, the U-phase: "+/2" and the V-phase "+", as shown in FIG. 4(D). At a fifth step, or from time t4 to time t5 in FIG. 3, the U-phase: "0" and the V-phase: "+", as shown in FIG. 4(E). At a sixth step, or from time t5 to time t6 in FIG. 3, the U-phase: "−/2" and the V-phase "+/2", as shown in FIG. 5(A). At a seventh step, or from time t6 to time t7 in FIG. 3, the U-phase: "−" and the V-phase: "0", as shown in FIG. 5(B). At an eighth step, or from time t7 to time t8 in FIG. 3, the U-phase: "−" and the V-phase "−/2", as shown in FIG. 5(C). At a ninth step, or from time t8 to time t9 in FIG. 3, the U-phase: "−" and the V-phase "−", as shown in FIG. 5(D). At a tenth step, or from time t9 to time t10 in FIG. 3, the U-phase: "−/2" and the V-phase: "−", as shown in FIG. 5(E). At an eleventh step, or from time t10 to time t11 in FIG. 3, the U-phase: "0" and the V-phase "−", as shown in FIG. 6(A). At a twelfth step, or from time t11 to time t12 in FIG. 3, the U-phase: "+/2" and the V-phase: "−/2", as shown in FIG. 6(B). This operation is thereafter repeated. For instance, from time t12 to time t13, the U-phase: "+" and the V-phase "0" similarly to the case of from time t0 to time t1.

If voltages are applied to the electrodes 27a, 27b of the movable element 21 and the electrodes 30a, 30b of the stator element 21, as stated above, the movable element 21 is moved rightward as viewed in the figures by attractive force and repulsive force resultant from force of static electricity caused between the electrodes 27a, 27b of the movable element 21 and the electrodes 30a, 30b of the stator element 22, as shown in FIGS. 4(A) to 6(E). Particularly, in the first embodiment, since voltages of five types of combinations of polarities and voltage values, i.e., "+", "+/2", "0", "−/2", and "−", are applied by switching-over therebetween to the electrodes 30a, 30b of the stator element 22, the driving force acting on the movable element 21 varies smoothly to thereby smooth the movement of the movable element 21.

Where the operating switch 24 is set to "move leftward", voltages are applied in the same pattern to the electrodes 30a, 30b of the stator element 22 by switching the polarity such that the phase for the V-phase electrodes 30b is advanced by 2 steps with respect to that of the U-phase electrodes 30a.

A second embodiment of the invention shown in FIG. 7, FIG. 8(A) and FIG. 8(B) will be explained next.

In the second embodiment, the electrodes 27a, 27b for each phase of the movable element 21 have a width d1 equally set. Also, the a-phase electrodes 27a and the b-phase electrodes 27b have an interval therebetween set unequal. That is, provided that the interval between an arbitrary electrode 27a of the a-phase electrodes 27a and an b-phase electrode 27b adjacent rightward as viewed in FIG. 7 to this electrode 27a is L1, and the interval between an arbitrary electrode 27b of the b-phase electrodes 27b and an a-phase electrode 27a adjacent rightward as viewed in FIG. 7 to this electrode 27b is L2, L1:L2 is set to 1:2.

The above-stated electrodes 30a, 30b for each phase of the stator element 22 have a width d2 equally set. The width d2 is equal to the width d1 electrodes 27a, 27b for respective phases of the movable element 21. Also, the interval between a U-phase electrode 30a and a V-phase electrode 30b is set unequal. That is, provided that the interval between an arbitrary electrode 30a of the U-phase electrodes 30a and an V-phase electrode 30b adjacent rightward as viewed in FIG. 7 to the electrode 30a is L3, and the interval between an arbitrary electrode 30b of the V-phase electrodes 30b and an U-phase electrode 30a adjacent rightward as viewed in FIG. 7 to the electrode 30b is L4, L3:L4 is set to 1:2.

In this manner, the electrostatic actuator according to the second embodiment has unequal intervals between electrodes 27a, 27b of the movable element 21 and the electrodes 30a, 30b of the stator element 22 to thereby provide two phases to the electrodes 27a, 27b, 30a, 30b respectively of the movable element 21 and the stator element 22 so that there is no necessity of providing through-holes or conductive materials in the movable element 21 and the stator element 22, thereby simplifying the structure for the movable element 21 and the stator element 22 and hence reducing the number of the relays required for switching-over the polarity. Also, in the second embodiment, the ratio L1:L2 given in interval of the electrodes 27a, 27b of the movable element 21 and the ratio L3:L4 in interval of the electrodes 30a, 30b of the stator element 22 are set equal, so that it is possible to constitute the movable element 21 and the stator element 22 in the same structure. If fabrication is made such that electrodes are arranged at an electrode pitch of 1:2 in an insulation layer, it will be applicable as the movable element 21 and as the stator element 22 as well, with reduced manufacturing cost.

Figure 7:
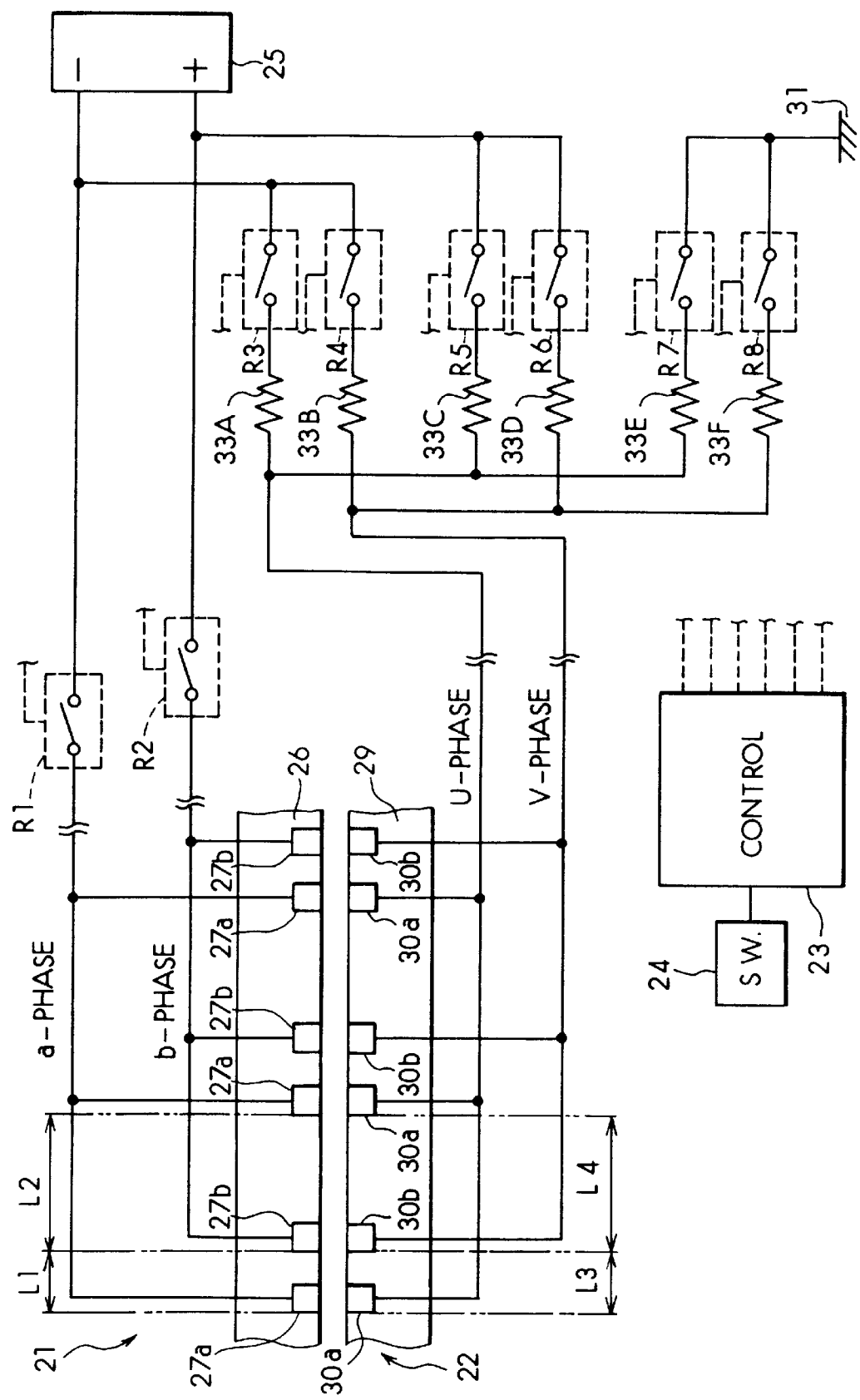
FIG. 7 is a schematic circuit diagram of an electrostatic actuator according to a second embodiment of the invention.
Figure 8A:
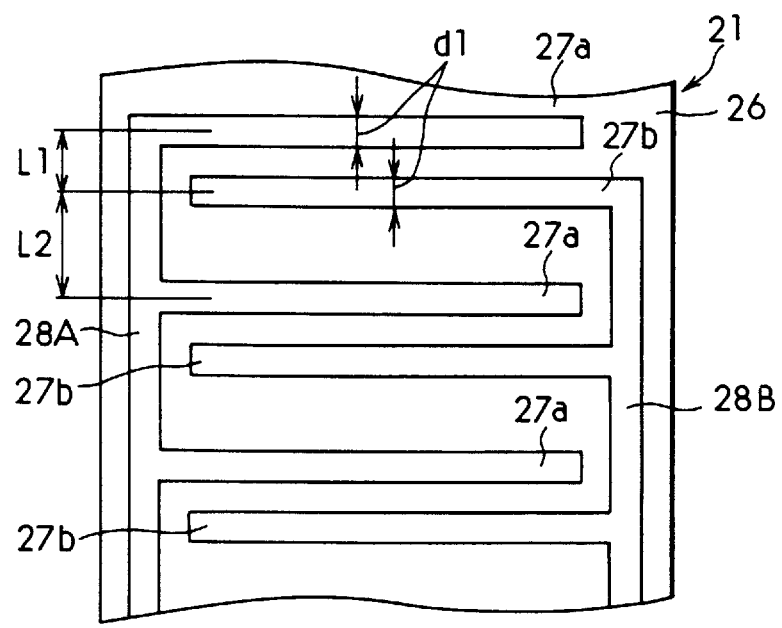
FIG. 8(A) is a partial plan view showing a movable element.
Figure 8B:
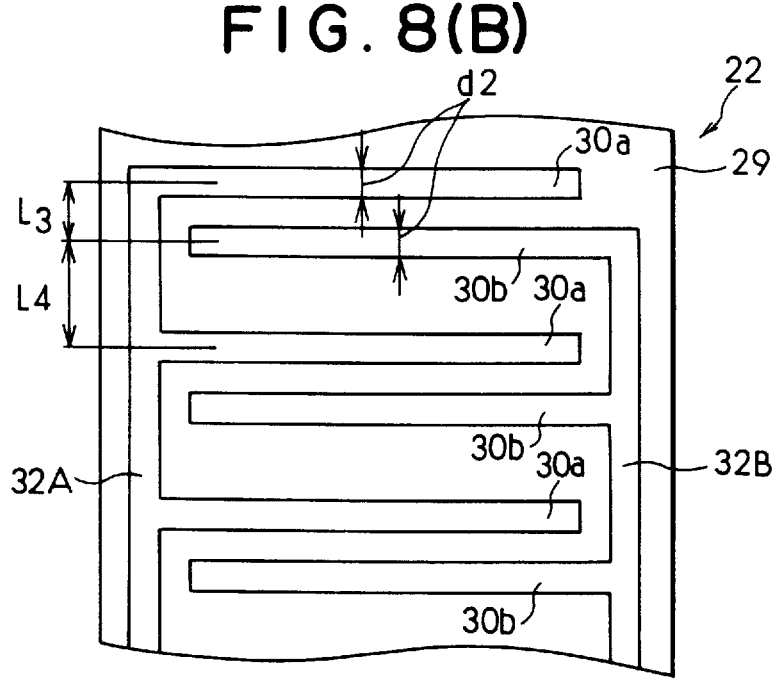
FIG. 8(B) is a partial plan view showing a stator element.

The second embodiment is the same in structure in other respects as the above-stated first embodiment, and the same reference characters are used in FIG. 7 and FIG. 8 for the same elements as those of the first embodiment.

The operation of the second embodiment will be explained next.

Figure 9:
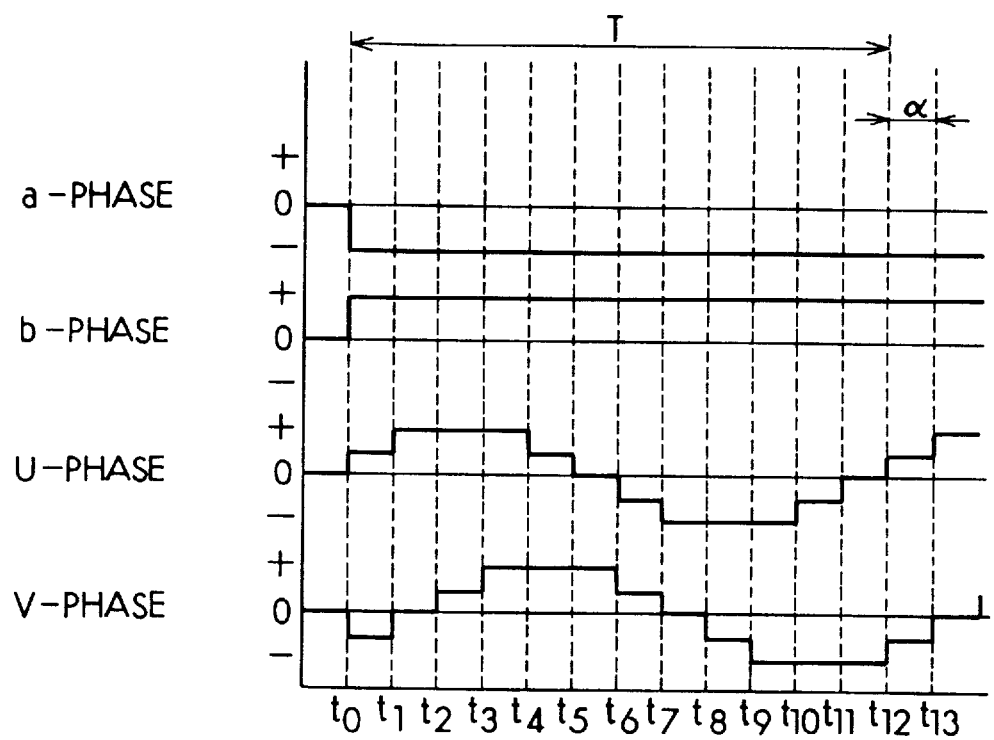
FIG. 9 is a waveform diagram showing voltages applied to a movable element and a stator element of a second embodiment.

FIG. 9 shows an example of operation of the second embodiment. In FIG. 9, the operating switch 24 is set held in "stationary" up to a time t0. During this time period, the relays R1, R2, the relays R3, R4, and the relay R5, R6 are turned off, and the relays R7, R8 are turned on. On this occasion, the electrodes 27a, 27b of the movable element 21 and the electrodes 30a, 30b of the stator element 22 are at a potential "0" and accordingly the movable element 21 is held in a stationary state.

From the time to, when the operating switch is set to "move rightward", a "−" high voltage is applied fixedly to the a-phase electrodes 27a of the movable element 21, while a "+" high voltage is applied fixedly to the b-phase electrodes 27b of the movable element 21. Further, U-phase and V-phase electrodes 30a, 30b of the stator element 22 are applied by a voltage with the polarity and the electric power value periodically switched over. The period T of switching-over of the value of polarity and the voltage applied to the stator element 22 involves 12 steps of an equi-time interval α. Also, although the polarity and the intensity are switched in the same pattern respectively for the U-phase electrodes 30a and the V-phase electrodes 30b, the phase for the V-phase is switched with delay by 2 steps, or ⅙ T, relative to the U-phase.

Figure 10A:
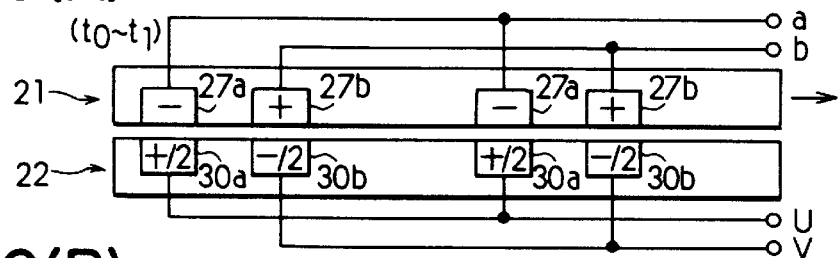
FIGS. 10(A), 10(B), 10(C), 10(D), and 10(E) are schematic diagrams for explaining a state of movement for the moving element.
Figure 10B:
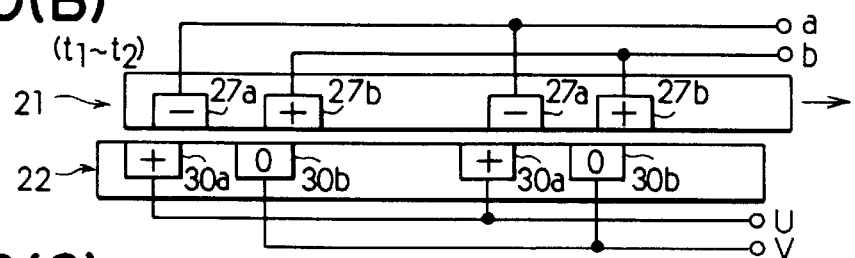
Figure 10C:
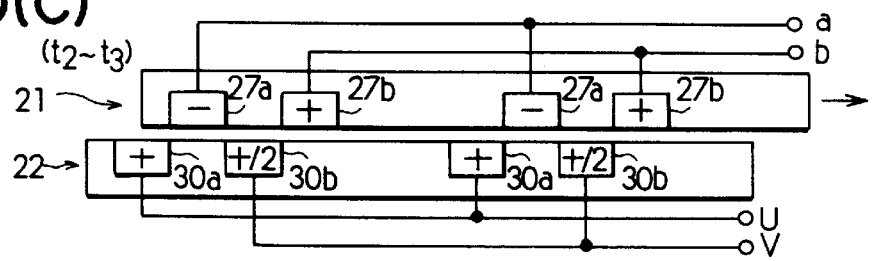
Figure 10D:
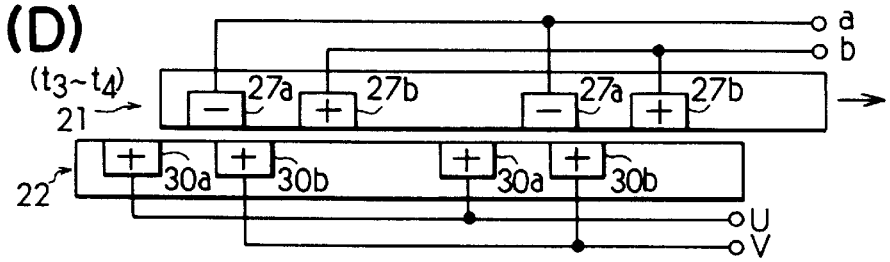
Figure 10E:
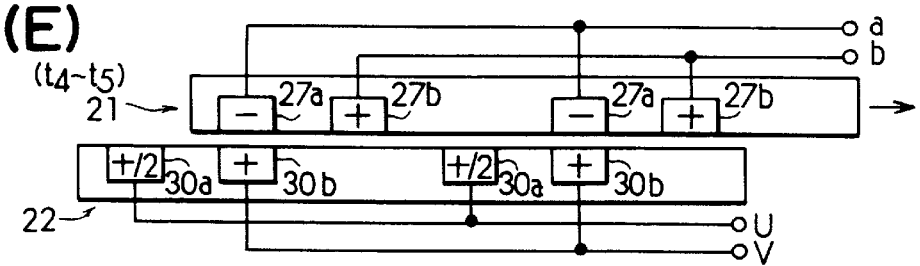
Figure 12A:
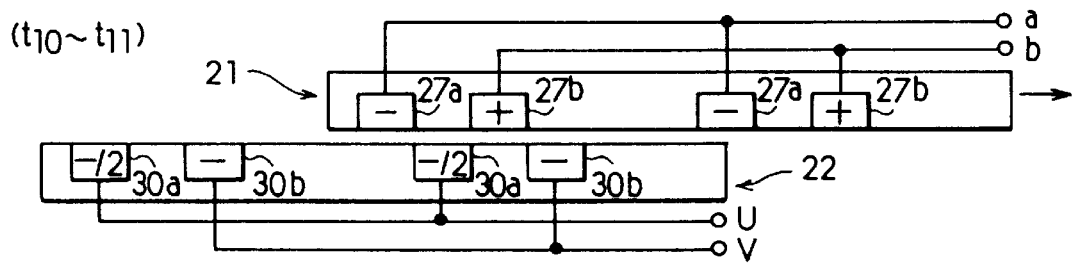
FIGS. 12(A), 12(B), and 12(C) are schematic diagrams for explaining a state of movement for the moving element.
Figure 12B:
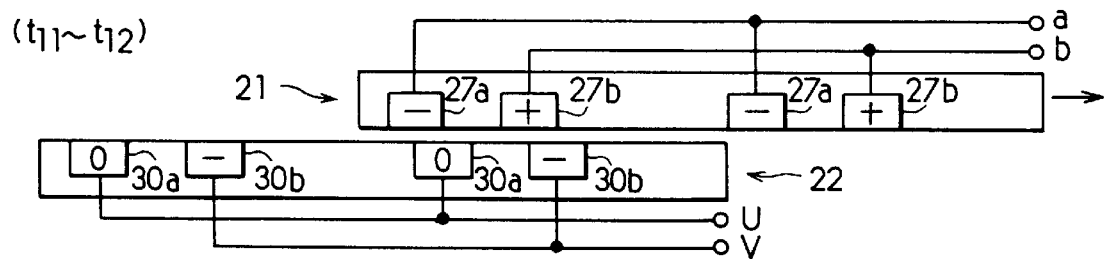
Figure 12C:
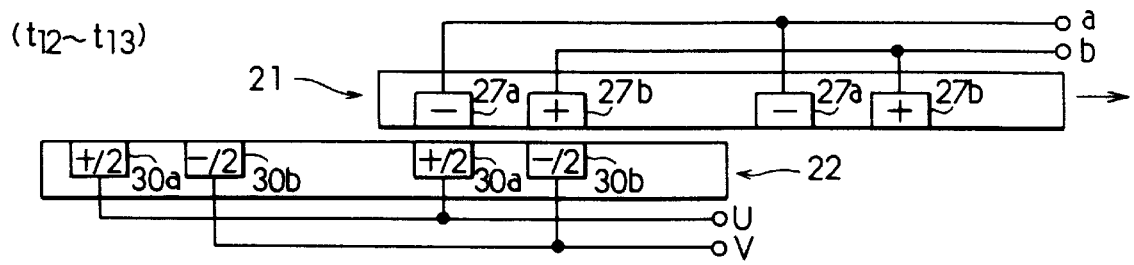

First, at a first step, or from time t0 to time t1 in FIG. 9, the U-phase: "+/2" and the V-phase: "−/2", as shown in FIG. 10(A). At a second step, or from time t1 to time t2 in FIG. 9, the U-phase: "+" and the V-phase "0", as shown in FIG. 10(B). At a third step, or from time t2 to time t3 in FIG. 9, the U-phase: "+" and the V-phase: "+/2", as shown in FIG. 10(C). At a fourth step, or from time t3 to time t4 in FIG. 9, the U-phase: "+" and the V-phase "+", as shown in FIG. 10(D). At a fifth step, or from time t4 to time t5 in FIG. 9, the U-phase: "+/2" and the V-phase: "+", as shown in FIG. 10(E). At a sixth step, or from time t5 to time t6 in FIG. 9, the U-phase: "0" and the V-phase "+", as shown in FIG. 11(A). At a seventh step, or from time t6 to time t7 in FIG. 9, the U-phase: "−/2" and the V-phase: "+/2", as shown in FIG. 11(B). At a eighth step, or from time t7 to time t8 FIG. 9, the U-phase: "−" and the V-phase "0", as shown in FIG. 11(C). At a ninth step, or from time t8 to time t9 in FIG. 9, the U-phase: "−" and the V-phase "−/2", as shown in FIG. 11(D). At a tenth step, or from time t9 to time t10 in FIG. 9, the U-phase: "−" and the V-phase: "−", as shown in FIG. 11(E). At an eleventh step, or from time t10 to time t11 in FIG. 9, the U-phase: "−/2" and the V-phase "−", as shown in FIG. 12(A). At a twelfth step, or from time t11 to time t12 in FIG. 9, the U-phase: "0" and the V-phase: "−", as shown in FIG. 12(B). This is thereafter repeated. For instance, from time t12 to time t13 in FIG. 9, the U-phase: "+/2" and the V-phase "−/2" similarly to the case of from time t1 to time t2.

If voltages are applied to the electrodes 27a, 27b of the movable element 21 and the electrodes 30a, 30b of the stator element 21, as stated above, the movable element 21 is moved rightward as viewed in the figures by attractive force and repulsive force due to electrostatic force caused between the electrodes 27a, 27b of the movable element 21 and the electrodes 30a, 30b of the stator element 22, as shown in FIG. 10(A) to FIG. 12(C). In the second embodiment, since voltages of five types of combinations of polarities and voltage values, i.e., "+", "+/2", "0", "−/2", and "−", are applied by switching-over therebetween to the electrodes 30a, 30b of the stator element 22 in a manner similar to the first embodiment, the driving force acting on the movable element 21 varies smoothly to thereby smooth the driving of the movable element 21.

Where the operating switch 24 is set to "move leftward", a voltage may be applied in the same pattern to the electrodes 30a, 30b of the stator element 22 by switching-over of the polarity such that the V-phase electrodes 30b is advanced by 2 steps in phase with respect to the U-phase electrodes 30a.

Figure 13:
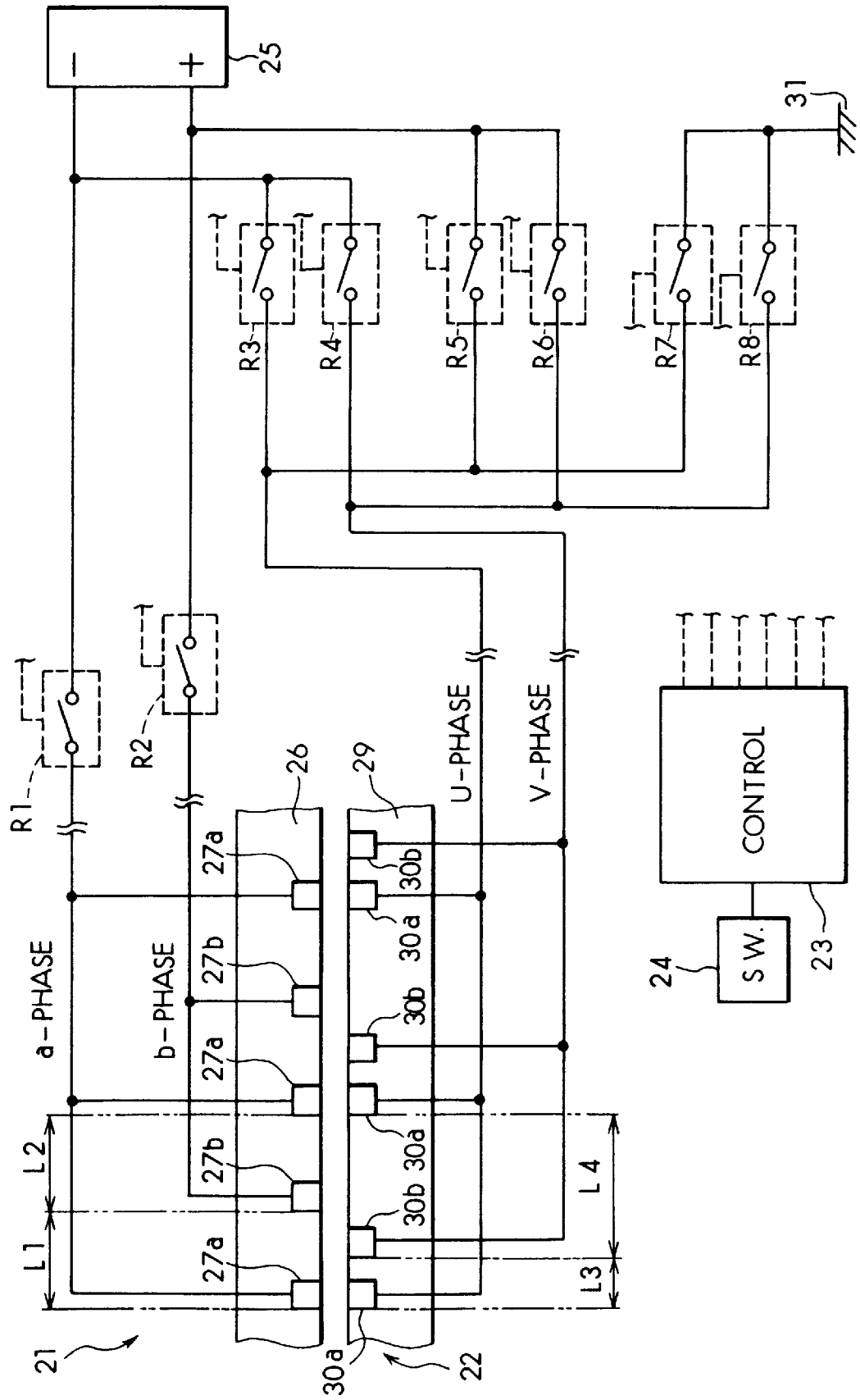
FIG. 13 is a schematic circuit diagram of an electrostatic actuator according to a third embodiment of the invention.
Figure 14A:
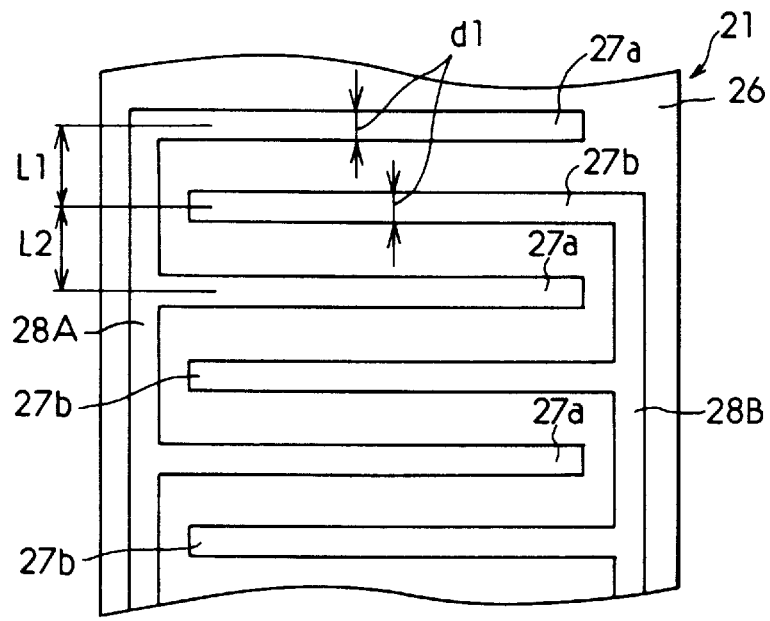
FIG. 14(A) is a partial plan view showing a movable element.
Figure 14B:
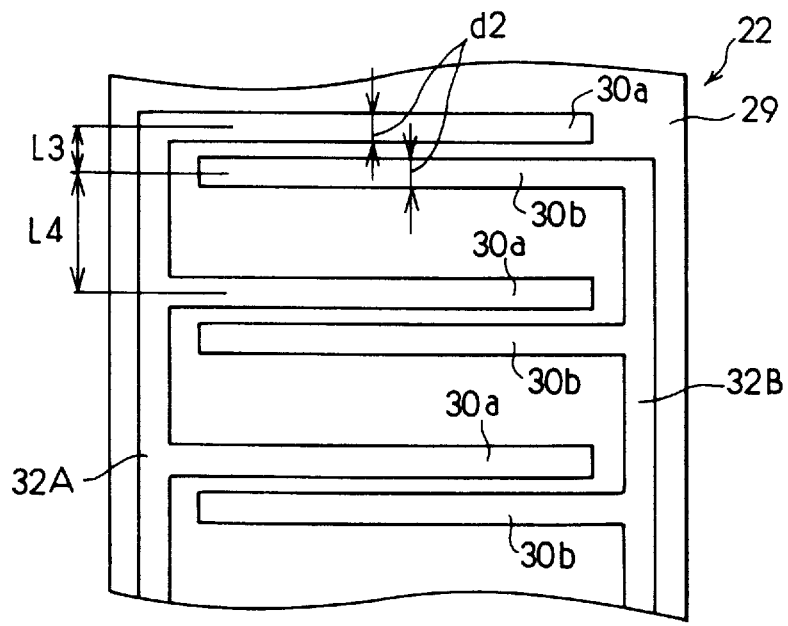
FIG. 14(B) is a partial plan view showing a stator element.

A third embodiment of the invention shown in FIG. 13 and FIG. 14 will be explained.

In the third embodiment, the electrodes 27a, 27b for each phase of the movable element 21 are set equal in width d1. The a-phase electrodes 27a and the b-phase electrodes 27b are set equal in interval, i.e., L1:L2=1:1, similarly to the case of the first embodiment.

On the other hand, the electrodes 30a, 30b for each phase of the stator element 22 are provided such that the interval between a U-phase electrode 30*a* and a V-phase electrode 30*b* is set unequal. That is, provided that the interval between an arbitrary electrode 30*a* of the U-phase electrodes 30*a* and an V-phase electrode 30*b* adjacent rightward as viewed in FIG. 13 to the electrode 30*a* is L3, and the interval between an arbitrary electrode 30*b* of the V-phase electrodes 30*b* and a U-phase electrode 30*a* adjacent rightward as viewed in FIG. 13 to the electrode 30*b* is L4, L3:L4 is set to 1:3. In the third embodiment, no resistor is interposed between the U-phase and V-phase electrodes 30*a*, 30*b* and the relays R3–R8.

The electrostatic actuator according to the third embodiment has two electrical phases for the electrodes 27*a*, 27*b* of the movable element 21 and the electrodes 30*a*, 30*b* of the stator element 22 so that there is no necessity of providing through-holes or conductive materials in the movable element 21 and the stator element 22, thereby simplifying the structure for the movable element 21 and the stator element 22 and hence reducing the number of the relays required for switching the polarity. The third embodiment is the same in structure on other points as in the first embodiment.

Next, the operation of the third embodiment will be explained.

Figure 15:
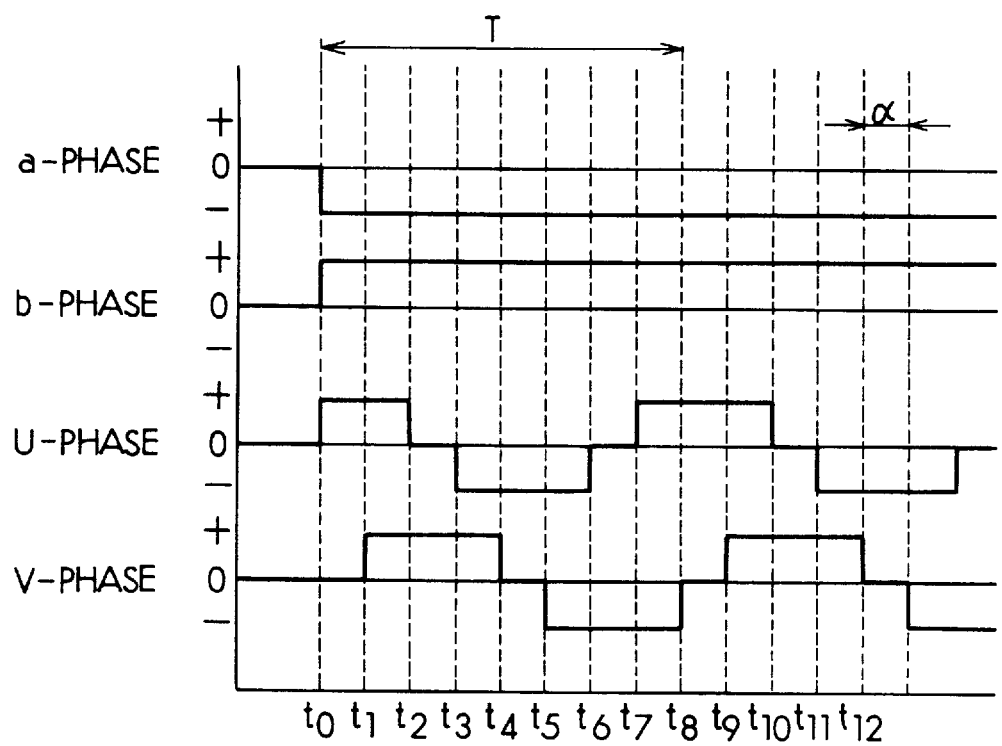
FIG. 15 is a waveform diagram showing voltages applied to a movable element and a stator element of a third embodiment.

FIG. 15 shows an example of operation of the third embodiment. In FIG. 15, the operating switch 24 is set held in "stationary" up to a time t0. During this time period, the relays R1–R6 are turned off, and the relays R7, R8 are turned on so that the electrodes 27*a*, 27*b* of the movable element 21 and the electrodes 30*a*, 30*b* of the stator element 22 are at a potential "0" and accordingly the movable element 21 is held in a stationary state.

From the time t0, the operating switch is set to "move rightward", and accordingly a "−" high voltage is applied fixedly to the a-phase electrodes 27*a* of the movable element 21 while a "+" high voltage is applied fixedly to the b-phase electrodes 27*b* of the movable element 21. Also, the U-phase and V-phase electrodes 30*a*, 30*b* of the stator element 22 are applied with voltages by periodically switching over the polarity and the intensity thereof. The period T during one-time switching-over of the polarity and the intensity of voltage applied to the stator element 22 involve 8 steps of an equi-time interval α. Also, although the polarity and the intensity are switched in the same pattern for the U-phase electrodes 30*a* and the V-phase electrodes 30*b*, the V-phase is switched with delay in phase by 2 steps, or ⅙ T, relative to the U-phase.

Figure 17A:
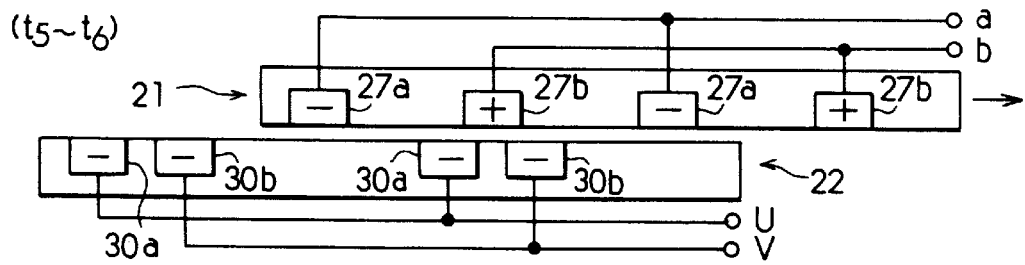
FIGS. 17(A), 17(B), 17(C) and 17(D) are schematic diagrams for explaining a state of movement for the moving element.
Figure 17B:
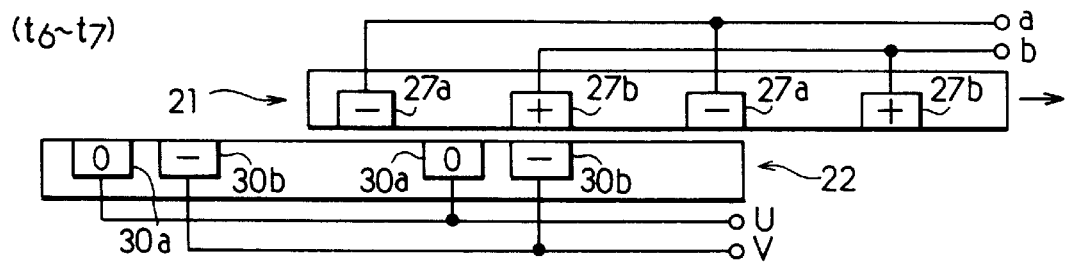
Figure 17C:
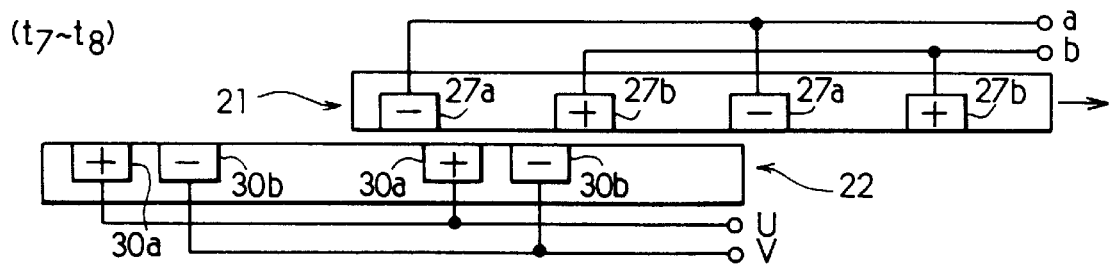
Figure 17D:
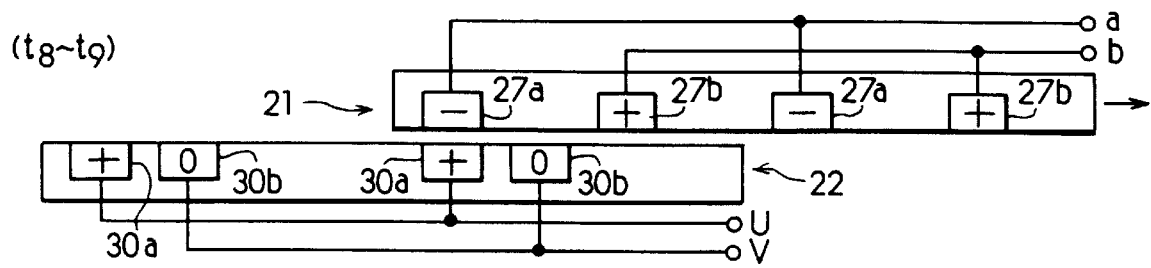

First, at a first step, or from time t0 to time t1 in FIG. 15, the U-phase: "+" and the V-phase: "0", as shown in FIG. 16(A). At a second step, or from time t1 to time t2 in FIG. 15, the U-phase: "+" and the V-phase "+", as shown in FIG. 16(B). At a third step, or from time t2 to time t3 in FIG. 15, the U-phase: "0" and the V-phase: "+", as shown in FIG. 16(C). At a fourth step, or from time t3 to time t4 in FIG. 15, the U-phase: "−" and the V-phase: "+", as shown in FIG. 16(D). At a fifth step, or from time t4 to time t5 in FIG. 15, the U-phase: "−" and the V-phase: "0", as shown in FIG. 16(E). At a sixth step, or from time t5 to time t6 in FIG. 15, the U-phase: "−" and the V-phase "−", as shown in FIG. 17(A). At a seventh step, or from time t6 to time t7 in FIG. 15, the U-phase: "0" and the V-phase: "−", as shown in FIG. 17(B). At an eighth step, or from time t7 to time t8 FIG. 15, the U-phase: "+" and the V-phase "−", as shown in FIG. 17(C). This is thereafter repeated. For instance, from time t8 to time t9 in FIG. 15, the U-phase: "+" and the V-phase "0" similarly to the case of from time t1 to time t2.

If voltages are applied to the electrodes 27*a*, 27*b* of the movable element 21 and the electrodes 30*a*, 30*b* of the stator element 21, as stated above, the movable element 21 is moved rightward by attractive force and repulsive force resultant from electrostatic force caused between the electrodes 27*a*, 27*b* of the movable element 21 and the electrodes 30*a*, 30*b* of the stator element 22, as shown in FIG. 16(A) to FIG. 17(D).

A fourth embodiment of the invention shown in FIG. 18, FIG. 19(A) and FIG. 19(B) will be explained.

In the fourth embodiment, the stator element 22 has a ground section 40 which is connected to the ground 31 to be kept always at a potential "0".

Figure 19A:
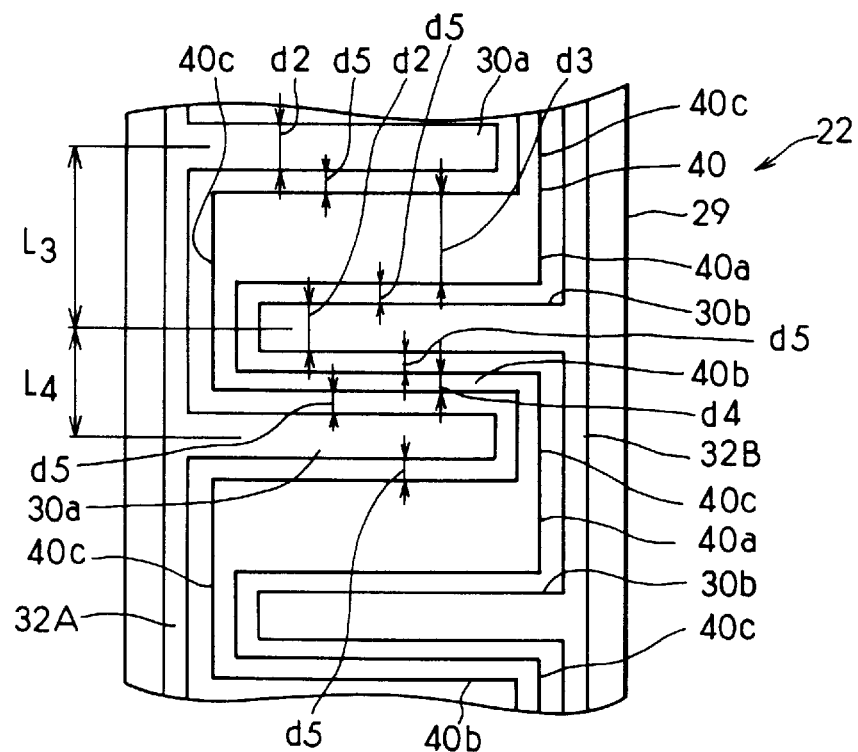
FIG. 19(A) is a partial plan view showing a movable element.

The ground section 40 is provided in a surface on a side of the insulation layer 29 where the electrodes 30*a*, 30*b* of the stator element 22 are provided, and formed by a metallic film provided in a zigzag form between the electrodes 30*a* and 30*b*, as shown in FIG. 19(A). Specifically, the connecting section 40 is provided with first portions 40*a* provided in a wide-rectangular form parallel with the electrodes 30*a*, 30*b* between an arbitrary electrode 30*a* of the U-phase electrodes 30*a* and a V-phase electrode 30*b* adjacent downward as viewed in FIG. 19(A) thereto, and second portions 40*b* provided in a narrow-rectangular form parallel with the electrodes 30*a*, 30*b* between an arbitrary electrode 30*b* of the V-phase electrodes 30*b* and a U-phase electrode 30*a* adjacent downward thereto as viewed in FIG. 19(A). Also, the first portions 40*a* and the second portions 40*b* are connected by connecting portions 40*c* with a narrow width provided in parallel with the electricity-feed portions 28A, 28B.

Figure 18:
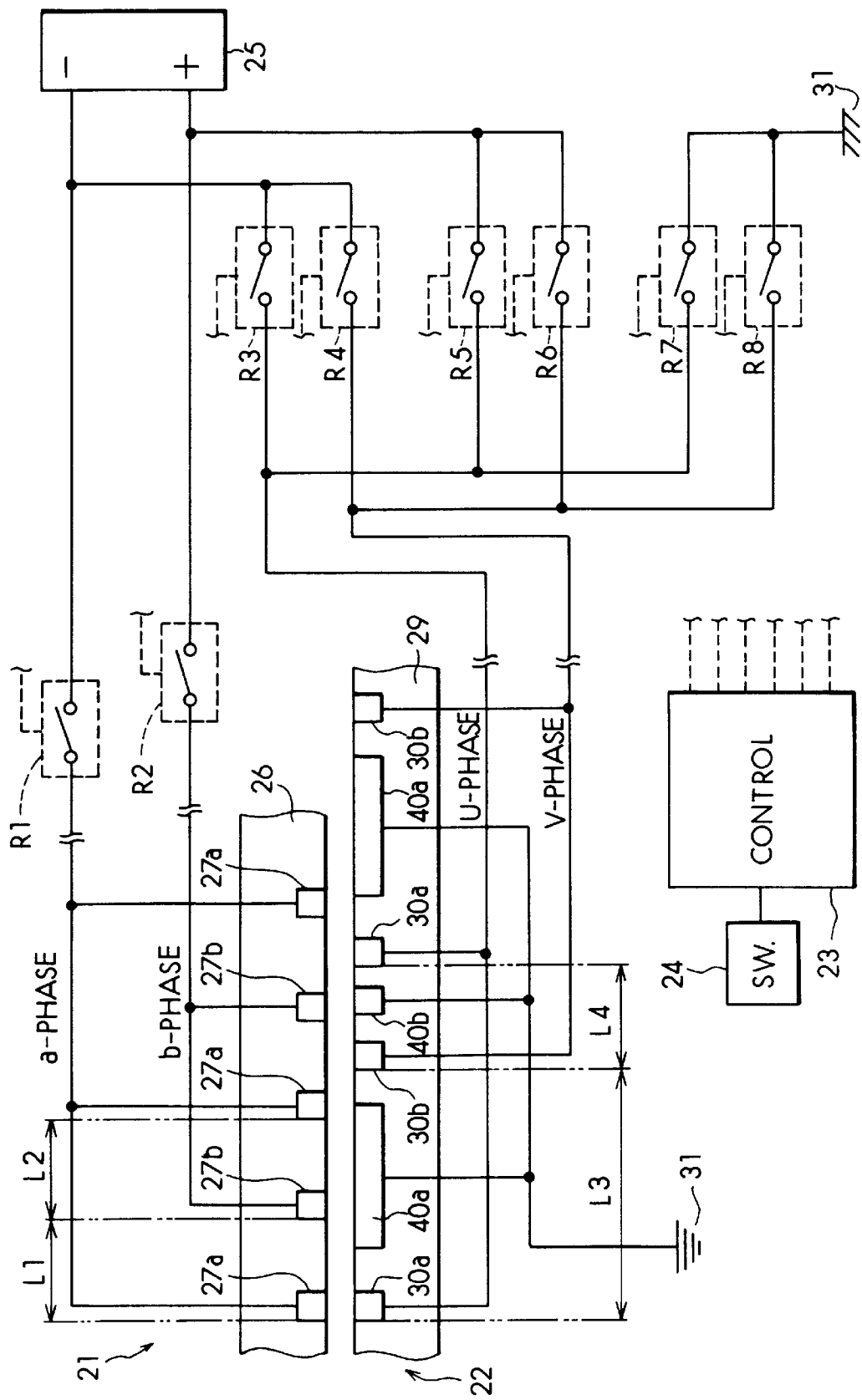
FIG. 18 is a schematic circuit diagram of an electrostatic actuator according to a fourth embodiment of the invention.

The ground section 40, as shown in FIG. 18, is connected to a ground at a potential of "0". No relays or the like are interposed between the ground section 40 and the ground 31 so that the potential thereof is kept at "0" regardless of the voltage applied to the electrodes 27*a*, 27*b*, 30*a*, 30*b* of the movable element 21 and the stator element 22.

The U-phase electrodes 30*a* and the V-phase electrodes 30*b* of the stator element 22 have a width d2 set equal. Also, the interval between electrodes 30*a*, 30*b* is set unequal. That is, provided that the interval between an arbitrary electrode 30*a* of the U-phase electrodes 30*a* and a V-phase electrode 30*b* adjacent rightward as viewed in FIG. 18 to the electrode 30*a* is L3, and the interval between an arbitrary electrode 30*b* of the V-phase electrodes 30*b* and an U-phase electrode 30*a* adjacent rightward as viewed in FIG. 18 to the electrode 30*b* is L4, L3:L4 is set to 5:3.

As shown in FIG. 19(A), the first portion 40*a* of the above ground section 40 has a width d3 which is set such that the ratio thereof, or d2:d3, with respect to the width d2 of the U-phase and V-phase electrodes 30*a*, 30*b* becomes 1:2. Also, the ground section 40 has a width d4 which is set such that the ratio thereof, or d2:d4, with respect to the width d2 of the U-phase and V-phase electrodes 30*a*, 30*b* becomes 5:2.

Incidentally, provided that the width of the insulation layer 29 between an electrode 30*a* and an electrode 40*a*, between an electrode 40*a* and an electrode 30*b*, between an electrode 30*b* and an electrode 40*b*, and between an electrode 40*b* and an electrode 30*a*, is d5, d2:d3:d4:d5= 10:20:4:5.

In the stator element 22 of the fourth embodiment, the arrangement of the electrodes 30*a*, 30*b* as well as the first portion 40*a* and the second portion 40*b* of the ground section 40 were designed in a manner described hereinbelow.

Figure 20:
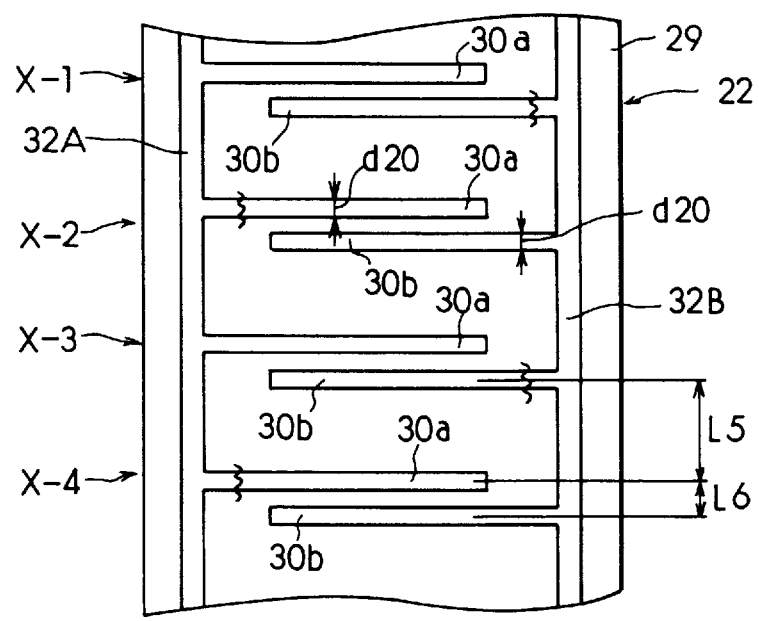
FIG. 20 is a partial plan view for explaining arrangement of electrodes and a ground section of a stator element according to the fourth embodiment.

As shown in FIG. 20, assumption is made on the stator element 22 that U-phase electrodes 30*a* and V-phase electrodes 30*b* thereof have the same width d20 with the ratio of distance L5, L6 between electrodes is 3:1, in a manner similar to the third embodiment. In FIG. 20, a set of the electrodes placed every other one, e.g., the electrodes 30a of electrode pairs X-2, X-4 and the electrodes 30b of electrode pairs X-1, X-3, are omitted from the electrode pairs X-1, X-2, X-3, . . . juxtaposed downward in the order of a U-phase electrode and a V-phase electrode, and in such state a ground section 40 is provided between the electrodes 30a, 30b. Also, the width of the electrodes 30a, 30b is set wide by increasing from d20 to d2, as shown in FIG. 19(A), so as to decrease small the spacing between the ground section 40 and an electrodes 30a, 30b.

Figure 19B:
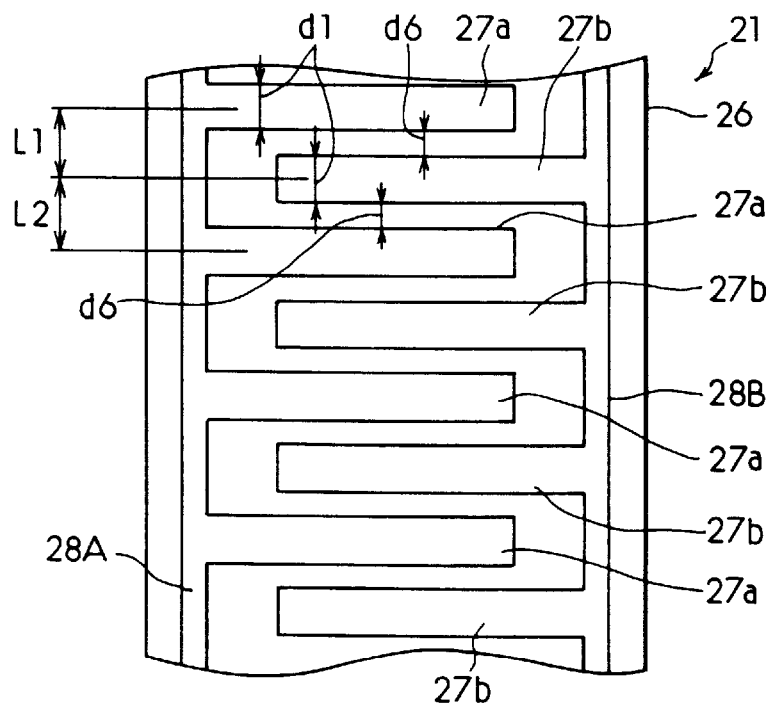
FIG. 19(B) is a partial plan view showing a stator element.

In the fourth embodiment, the structure of the movable element 21 shown in FIG. 19(B) is similar to the above-stated first embodiment, wherein the width d1 of the a-phase electrodes 27a and b-phase electrodes 27b is constant, and the ratio in interval of electrodes, or L1:L2, is 1:1. Also, provided that the width of the insulation layer 26 between an electrode 27a and an electrode 27b, and between an electrode 27b and an electrode 27a is d6, the ratio d1:d2:d3:d4:d5:d6 is 10:10:20:4:5:6 and the ratio L1:L2:L3:L4:L5:L6 is 2:2:5:3:3:1.

The structures in other respects for the fourth embodiment are the same as the third embodiment, and the same elements are denoted by the same reference characters to omit explanation thereon. the operation of the fourth embodiment will be explained.

To drive the electrostatic actuator according to the fourth embodiment, voltages with a waveform similar to the third embodiment may be applied.

Figure 21:
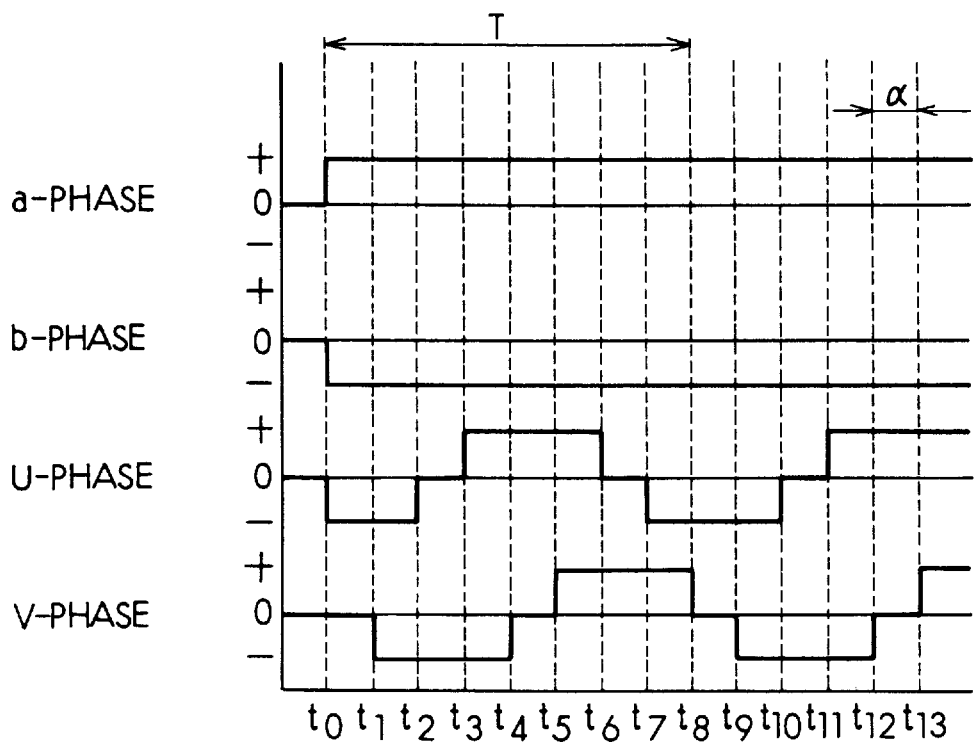
FIG. 21 is a waveform diagram showing voltages applied to a movable element and a stator element of a fourth embodiment.

FIG. 21 shows one example of operation of the fourth embodiment, wherein in FIG. 21 the operating switch 24 is set held in "stationary" up to a time t0. During this time period, the relays R1–R5, R6 are turned off and the relays R7, R8 are turned on so that the voltages applied to the electrodes 27a, 27b of the movable element 21 and the electrodes 30a, 30b of the stator element 22 become "0", and accordingly the movable element 21 is held in a stationary state.

From the time t0, the operating switch is set to "move rightward", and accordingly a "+" high voltage is applied fixedly to the a-phase electrodes 27a of the movable element 21 while a "−" high voltage is applied fixedly to the b-phase electrodes 27b of the movable element 21. Also, the U-phase and V-phase electrodes 30a, 30b of the stator element 22 are applied by a voltage with the polarity and the intensity thereof switched periodically. The period T of one-time switching of the polarity and the intensity of voltage applied to the stator element 22 involves 8 steps of an equi-time interval α. Also, although the polarity and the intensity are switched in the same pattern for the U-phase electrodes 30a and the V-phase electrodes 30b, the V-phase is switched with delay in phase by 2 steps, or ¼ T, relative to the U-phase.

Figure 22A:
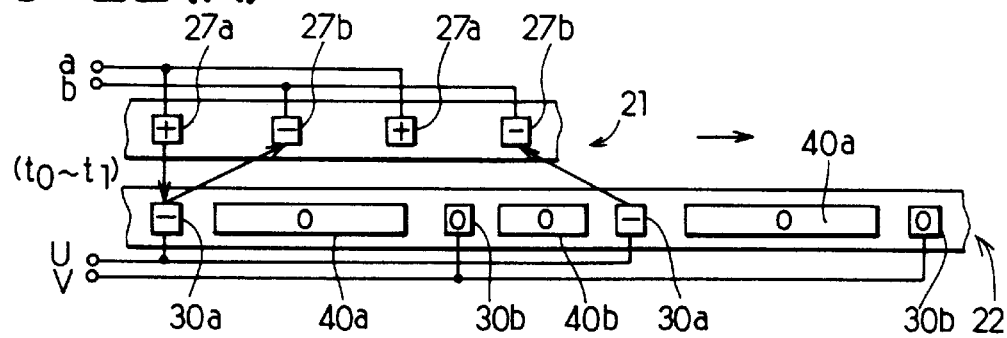
FIGS. 22(A), 22(B), 22(C), and 22(D) are schematic diagrams for explaining a state of movement for the moving element.
Figure 22B:
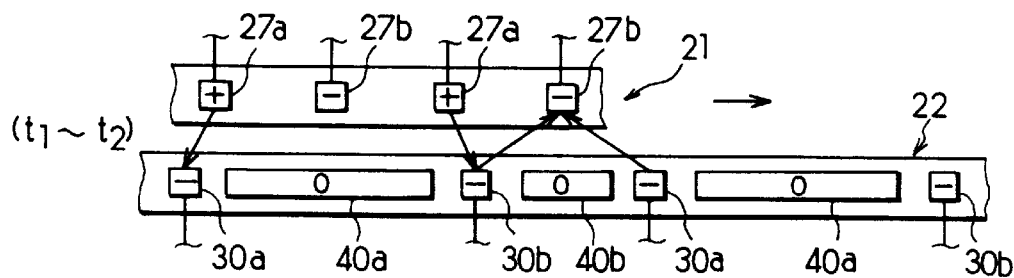
Figure 22C:
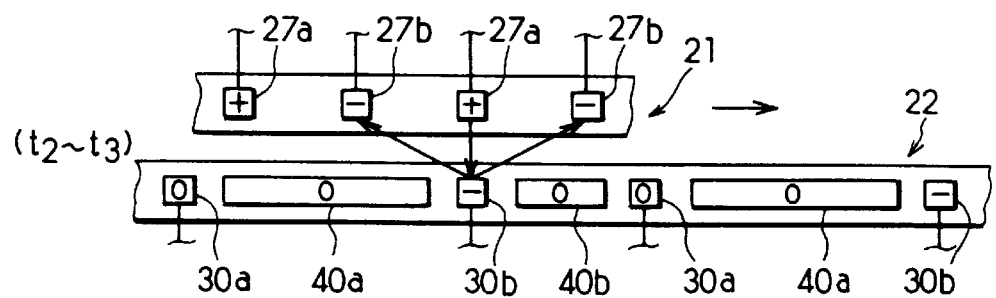
Figure 22D:
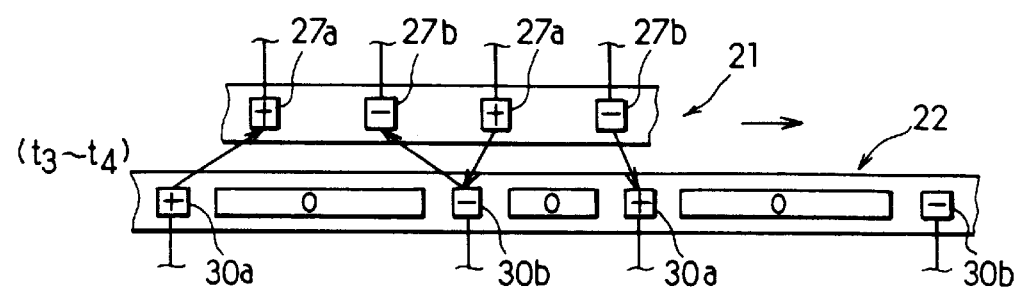

First, at a first step, or from time t0 to time t1 in FIG. 21, a state is given as the U-phase: "−" and the V-phase: "0", as shown in FIG. 22(A). At a second step, or from time t1 to time t2 in FIG. 21, the U-phase: "−" and the V-phase "−", as shown in FIG. 22(B). At a third step, or from time t2 to time t3 in FIG. 21, the U-phase: "0" and the V-phase: "−", as shown in FIG. 22(C). At a fourth step, or from time t3 to time t4 in FIG. 21, the U-phase: "+" and the V-phase "−", as shown in FIG. 22(D). At a fifth step, or from time t4 to time t5 in FIG. 21, the U-phase: "+" and the V-phase: "0", as shown in FIG. 23(A). At a sixth step, or from time t5 to time t6 in FIG. 21, the U-phase: "+" and the V-phase "+", as shown in FIG. 23(B). At a seventh step, or from time t6 to time t7 in FIG. 21, the U-phase: "0" and the V-phase: "+", as shown in FIG. 23(C). At an eighth step, or from time t7 to time t8 FIG. 21, the U-phase: "−" and the V-phase "+", as shown in FIG. 23(D). This is thereafter repeated. For instance, from time t8 to time t9, the U-phase: "−" and the V-phase "0" similarly to the case of from time t1 to time t2, as shown in FIG. 23(E).

If voltages are applied to the electrodes 27a, 27b of the movable element 21 and the electrodes 30a, 30b of the stator element 21, as stated above, the movable element 21 is moved in the rightward direction by attractive force and repulsive force resultant from electrostatic force caused between the electrodes 27a, 27b of the movable element 21 and the electrodes 30a, 30b of the stator element 22, as shown in FIG. 22(A) to FIG. 23(E).

In the fourth embodiment, the ground section 40 is provided to hold at all times the voltage on the stator element 22 at "0" potential. Consequently, even if voltages are applied to the electrodes 30a, 30b in such a waveform that the U-phase electrodes 30a and the V-phase electrodes 30b of the stator element 22 be applied simultaneously by voltages of the same polarity, the insulation layer 29 of the stator element 22 can be prevented from being electrified due to the same polarity applied to the U-phase and the V-phase electrodes 30a, 30b, thereby preventing the driving force for the movable element 21 from lowering due to electrification.

Although both of the electrodes 30a and 30b are applied by voltages in a same polarity at the second step shown in FIG. 22(B), or from time t1 to time t2 in FIG. 21, or at the sixth step shown in FIG. 23(B), or from time t5 to time t6 in FIG. 21, for instance, the first portions 40a and the second portions 40b of the ground section 40 are arranged between the electrodes 30a, 30b so that the insulation layer 29 of the stator element 29 is prevented from being electrified.

Also, because the ground section 40, whose potential is kept at "0", is provided in the stator element 22, as stated above, even when voltages is applied to the electrodes 30a, 30b by switching of the polarity involve deviation toward a "+" or "−" side within one period T, the insulation layer 29 of the stator element 22 can be prevented from electrification.

Figure 24A:
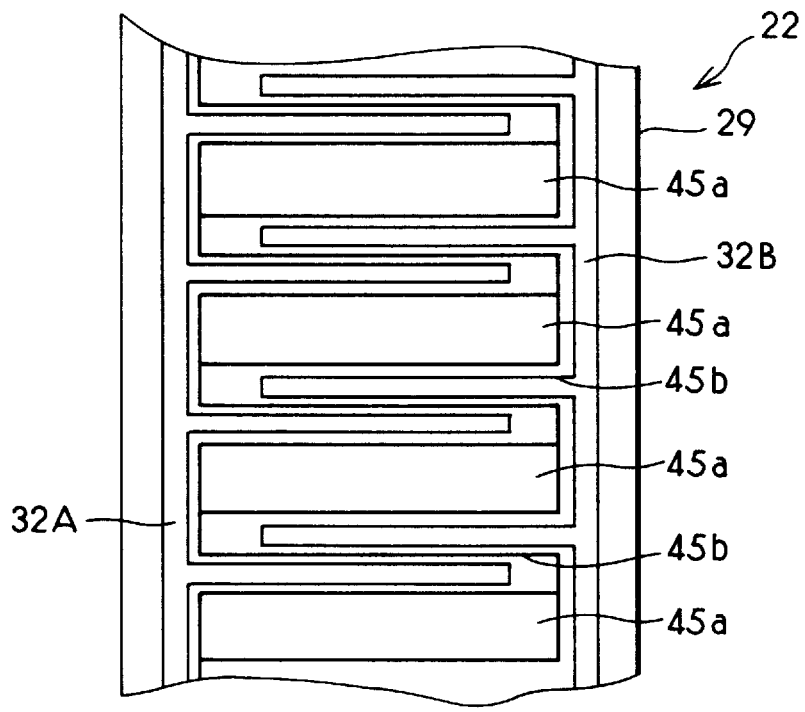
FIG. 24(A) is a partial plan view showing another example of a stator element provided with a ground section.

The structure of the electrodes in the stator element 22 or the movable element 21 in the case of providing the ground section 40 is not limited to the above. For instance, as shown in FIG. 24(A), broad-width rectangular portions 45a may be provided solely in an interval, which is greater, between a U-phase electrode 30a and a V-phase electrode 30b juxtaposed in that order from the above to the below such that line portions 45b connect the rectangular portions 45a in series.

Figure 24B:
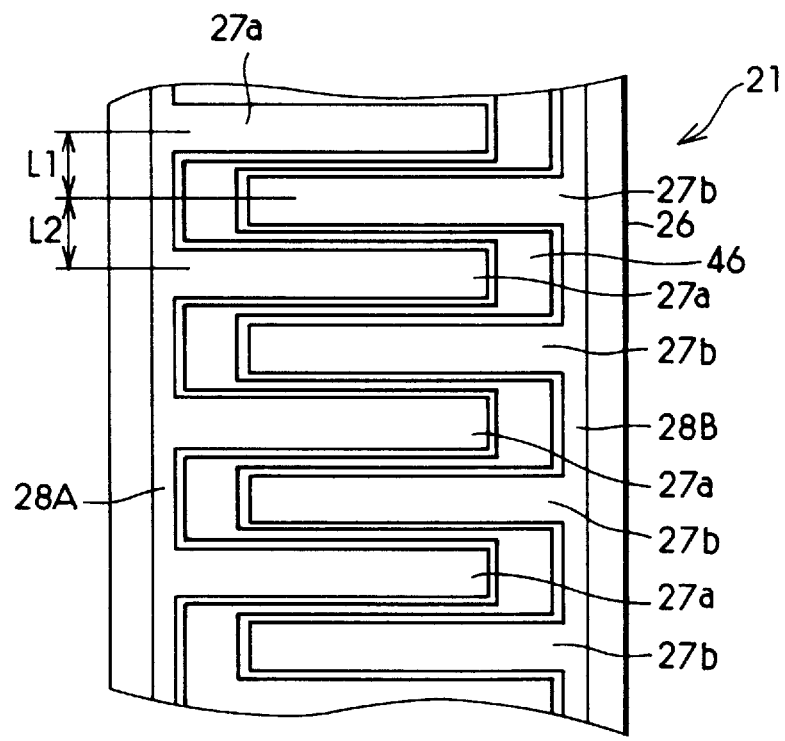
FIG. 24(B) is a partial plan view showing another example of a movable element provided with a ground section.

Also, a ground section 46 may be provided in the movable element 21, as shown in FIG. 24(B). In FIG. 24(B), the ratio of the intervals L1, L2 of the a-phase and b-phase electrodes 27a, 27b is 1:1, so that the ground section 46 is provided by micro-processing between the electrodes 27a, 27b because of narrowness of interval between the electrodes.

In this manner, it is possible to provide a ground section in either one or both of the movable element 21 and the stator element 22.

Figure 26A:
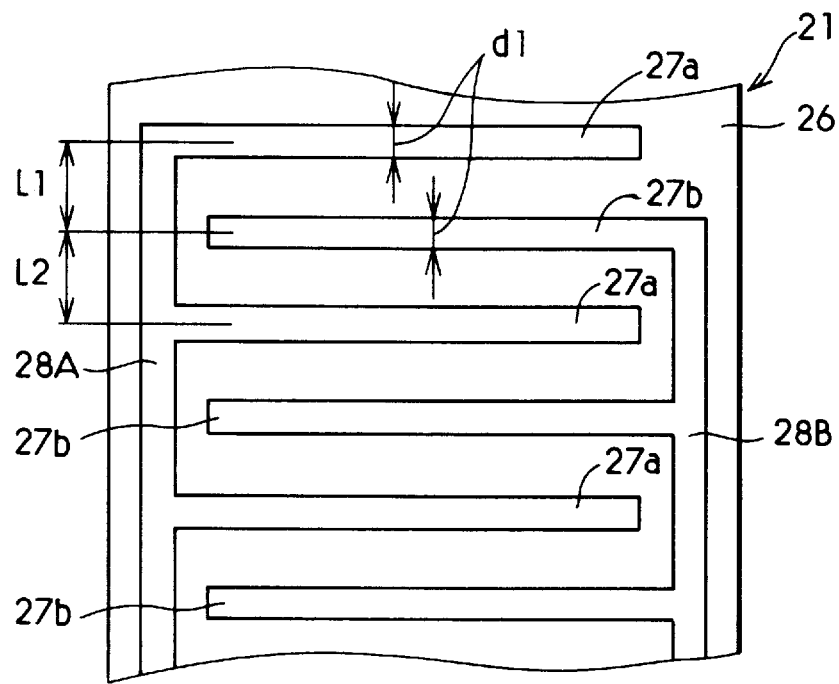
FIG. 26(A) is a partial plan view showing a movable element.
Figure 26B:
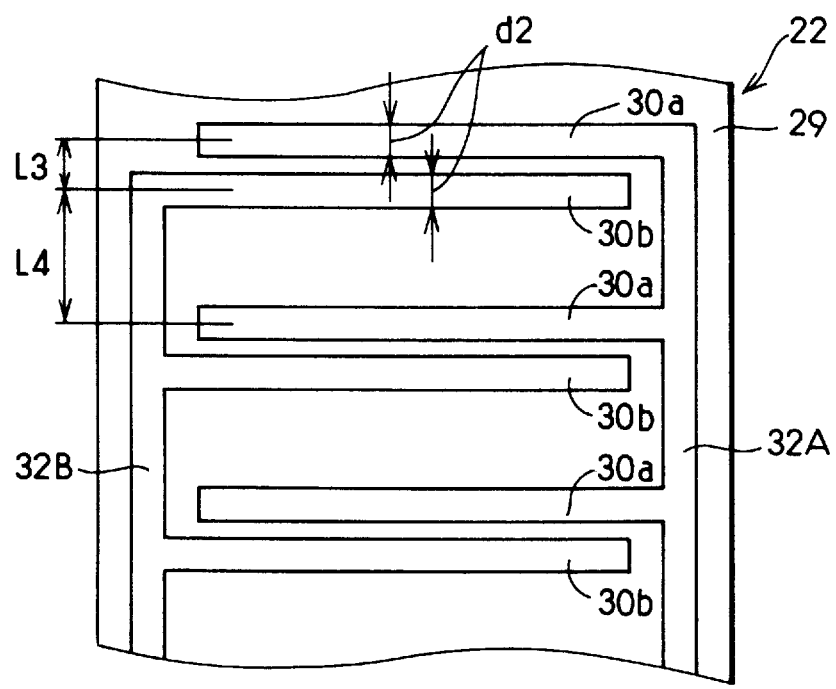
FIG. 26(B) is a partial plan view showing a stator element.

FIG. 25, FIG. 26(A) and FIG. 26(B) show a fifth embodiment of the present invention.

The movable element 21 of the fifth embodiment has electrodes 27a, 27b provided in an insulating layer 26 so that electrodes 27a, 27b located by every other one are connected to respective electricity-feed sections 28A, 28B provided at either sides of the insulation layer 26. The electrodes 27a, 27a . . . connected to one electricity-feed section 28A is for a-phase, whereas the electrodes 27b, 27b . . . connected to the other electricity-feed section for b-phase. Also, the electrodes 27a, 27b has a width d1 and an electrode pitch set equal for each phase, i.e., L1:L2=1:1.

The electrodes 27a, 27b of the movable element 21 include a-phase electrodes 27a which are connected from the electricity-feed section 28A to a "−" side of a high voltage source 25 and a ground 31 via a relay R21. The electrodes 27a, 27b of the movable element 21 also include b-phase electrodes 27b which are connected from the electricity-feed section 28B to a "+" side of the high voltage source 25 as well as the ground 31 via a relay R22. The relays R21, R22 are switched over between an x side and a y side by instructions from a control circuit 23. When it is switched to the x side, the electrodes 27a, 27b are connected to the "−" side or the "+" side of the high voltage source 25, whereas when connected to the y side, the electrodes 27a, 27b is connected at the potential "0".

The stator element 22, as shown in FIG. 26(B), has electrodes 30a, 30b provided in an insulation layer 29 so that the electrodes 30a, 30b located every other one are connected to electricity-feed sections 32A, 32B provided on either sides of the insulation layer 29. The electrodes 30a, 30a . . . connected to one electricity-feed section 32A constitute U-phase, whereas the electrodes 31b, 31b . . . connected to the other electricity-feed section 32B V-phase. The electrodes 30a, 30b have a width d2 set equal, and L3:L4 is set to 1:3.

Also, a resistor 45A is interposed between relays R23, R25, R27 and the U-phase electrodes 30a. Also, a resistor 45B is interposed between relays R24, R26, R28 and the V-phase electrodes 30b. These resistors 45A, 45B serve as a low-pass filter, so that they remove a high-frequency component out of an alternating current in a rectangular waveform outputted from the relays R23–R28 so as to convert into a waveform presenting a curve with smooed rise and fall portions for outputting it to the electrodes 30a, 30b of the stator element 22.

The operation of the fifth embodiment will be explained.

Figure 27:
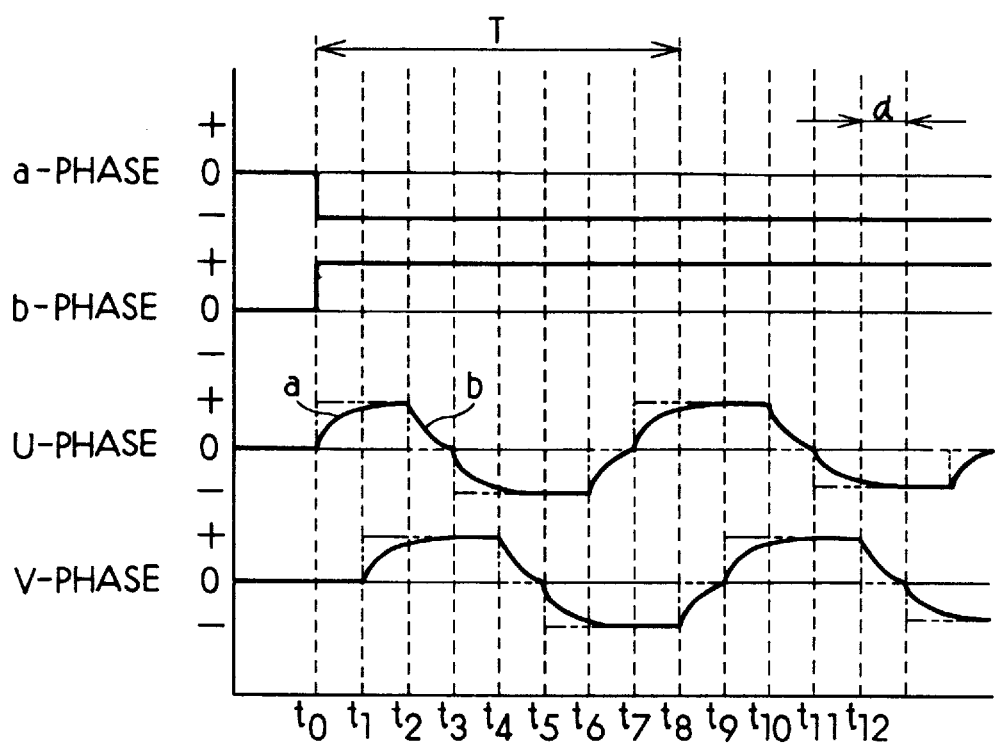
FIG. 27 is a waveform diagram showing voltages applied to a movable element and a stator element of a fifth embodiment.

FIG. 27 shows one example of operation of the fifth embodiment, wherein in FIG. 27 the operating switch 24 is set held in "stationary" up to a time t0. During this time period, the relays R21 and R22 are set to the y side, and R23–R26 are turned off with relays R27, R28 turned on so that the potential of the electrodes 27a, 27b of the movable element 21 and the electrodes 30a, 30b of the stator element 22 become "0", and accordingly the movable element 21 is held in a stationary state.

From the time t0, the operating switch is set to "move rightward", and a "−" high voltage is applied fixedly to the a-phase electrodes 27a of the movable element 21 while a "+" high voltage is applied fixedly to the b-phase electrodes 27b of the movable element 21. Also, the U-phase and V-phase electrodes 30a, 30b of the stator element 22 are applied by a voltage with the polarity and the voltage value thereof periodically switched over. The period T of one-time switching-over of the polarity and the value of voltage applied to the stator element 22 involves 8 steps of an equi-time interval α. Also, although the polarity and the intensity are switched in the same pattern for the U-phase electrodes 30a and the V-phase electrodes 30b, the V-phase is switched with delay in phase by 2 steps, or ⅙ T, relative to the U-phase.

First, at a first step, or from time t0 to time t1 in FIG. 27, the U-phase: "+" and the V-phase: "0". At a second step, or from time t1 to time t2 in FIG. 27, the U-phase: "+" and the V-phase "+". At a third step, or from time t2 to time t3 in FIG. 27, the U-phase: "0" and the V-phase: "+". At a fourth step, or from time t3 to time t4 in FIG. 27, the U-phase: "−" and the V-phase "+". At a fifth step, or from time t4 to time t5 in FIG. 27, the U-phase: "−" and the V-phase: "0". At a sixth step, or from time t5 to time t6 in FIG. 27, the U-phase: "−" and the V-phase "−". At a seventh step, or from time t6 to time t7 in FIG. 27, the U-phase: "0" and the v-phase: "−". At an eighth step, or from time t7 to time t8 FIG. 27, the U-phase: "+" and the V-phase "−". This is thereafter repeated. For instance, from time t8 to time t9, the U-phase: "+" and the V-phase "0" similarly to the case of from time t1 to time t2.

The waveform of the alternating current, which is outputted from the high voltage source via the relays R23–R28, is in a rectangular form, as shown by the two-dot chain lines in FIG. 27. The alternating current in a rectangular form outputted from the relays R23–R28 is inputted to the resistors 45A, 45B which are interposed between the relays R23–R28 and the electrodes 30a, 30b. To this end, the voltages outputted from the resistors 45A, 45B have delay of time caused in a waveform thereof with respect to the waveforms of the input voltages shown by the two-dot chain lines so that the voltage is given with a rise portion a presenting a smoothly inclined curve upwardly convex as viewed in the figure and a fall portion b presenting a smoothly inclined curve downwardly convex as viewed in the figure. Consequently, the voltages outputted from the resistors 45A, 45B to the electrodes 30a, 30b become to assume a wave-like waveform, as shown by the solid lines in FIG. 27.

In this manner, in the fifth embodiment, the waveform of the voltages applied to the electrodes 30a, 30b of the stator element 22 is in the wave-like form having smoothly-inclined curves in the rise portion a and the fall portion b. Hence, even where the voltage is switched from "0" to "+" or "−" or the voltage is changed from "+" or "−" to "0", the switching is smoothly performed. Consequently, the driving force for the movable element 21 is smoothly varied upon switching over of the voltages applied to the electrodes 30a, 30b of the stator element 29, thereby largely reducing noise from the movable element 21.

In the fifth embodiment, since the sum of the electrostatic capacitances C for the U-phase and V-phase electrodes 30a and 30b are each 8000 pF and the resistance values R for the resistors 45A, 45B are 500 KΩ, the time constant τ becomes $(8000\times10^{-12})\times(500\times10^{3})=40\times10^{-4}=4$ (ms). With the time delay of 4 ms, the voltages rise and lower in an appropriate period of time to thereby provide significant reduction of noise from the movable element 21.

However, the resistance values for the resistors 45A, 45B are not limited to the value 500 kΩ, it may be set so as to provide an appropriate time constant τ in accordance with the electrostatic capacitances for the electrodes 30a, 30b. It is preferred to specify the resistance values for the resistors 45A, 45B in a range of from 300 kΩ to 1 MΩ, when the electrostatic capacitances for the electrodes 30a, 30b are 8000 pF. If the resistance value is set to 1 MΩ or greater, noise is effectively reduced, but the time constant becomes excessively large, so that if the time α of one step is taken short, the time α will elapse before completion of rising or falling of the voltage value, thereby making it impossible to drive the movable element at a high speed. On the other hand, if this resistance value is set to 300 kΩ or smaller, the time constant τ becomes excessively small, and accordingly the voltage abruptly rises or falls as if the resistors 45A, 45B are not provided, thereby offering insufficient effect of noise reduction.

If the values of the resistors 45A, 45B are 300 KΩ or smaller, or 50 kΩ to 300 kΩ, as employed in the first embodiment, the voltage waveform becomes rectangular.

Figure 28:
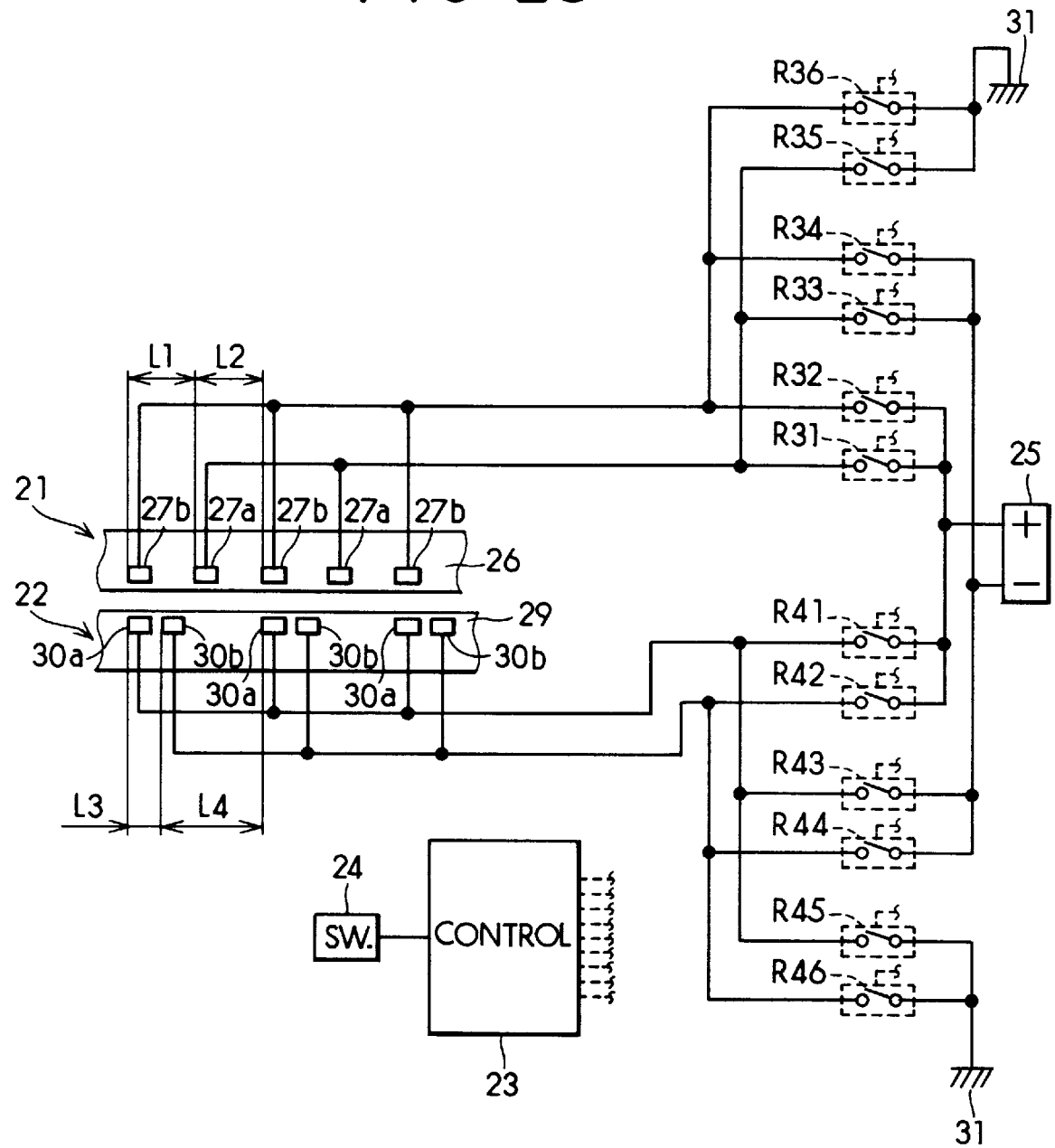
FIG. 28 is a schematic circuit diagram of an electrostatic actuator according to a sixth embodiment of the invention.

FIG. 28 and FIG. 29 show a sixth embodiment of the present invention.

Figure 29A:
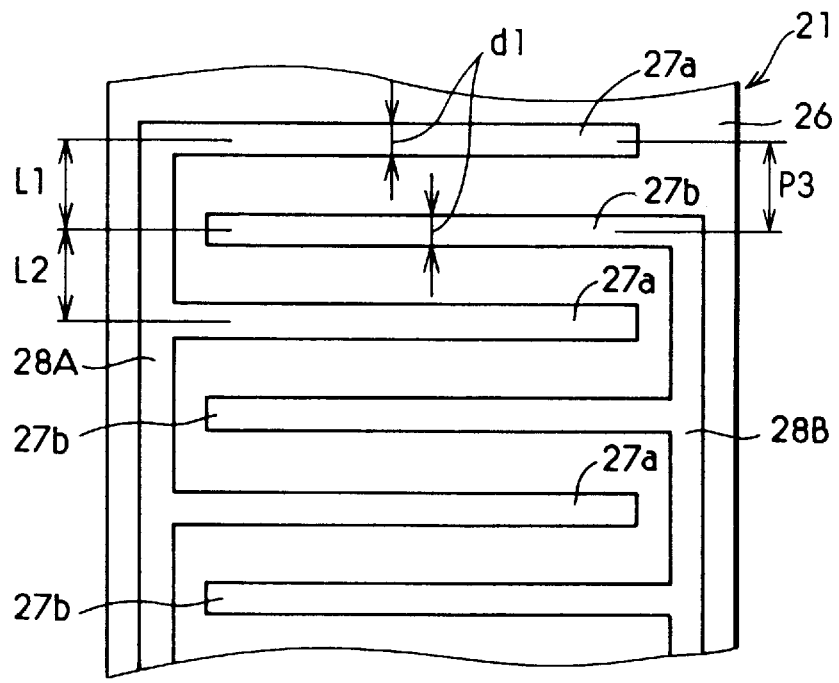
FIG. 29(A) is a partial plan view showing a movable element.

The movable element 21, as shown in FIG. 29(A), has electrodes 27a, 27b provided in a surface of an insulating layer 26 so that electrodes 27a, 27b located every other one are connected to respective electricity-feed portions 28A, 28B provided at either sides of the insulation layer 26. The electrodes 27a, 27a . . . connected to one electricity-feed section 28A is for a-phase, whereas the electrodes 27b, 27b . . . connected to the other electricity-feed section for b-phase. Also, the electrodes 27a, 27b has a width d1 set equal, and L1:L2 is set to 1:1.

The electrodes 27a, 27b of the movable element 21 include a-phase electrodes 27a which are connected from the electricity-feed section 28A to a "+" side and a "−" side of a high voltage source 25 and a ground 31 respectively via relays R31, R33, and R35. The electrodes 27a, 27b of the movable element 21 also include b-phase electrodes 27b which are connected through the electricity-feed section 28B to a "+" side and a "+" side of the high voltage source 25 and the ground 31 respectively via relays R32, R34, and R36.

Figure 29B:
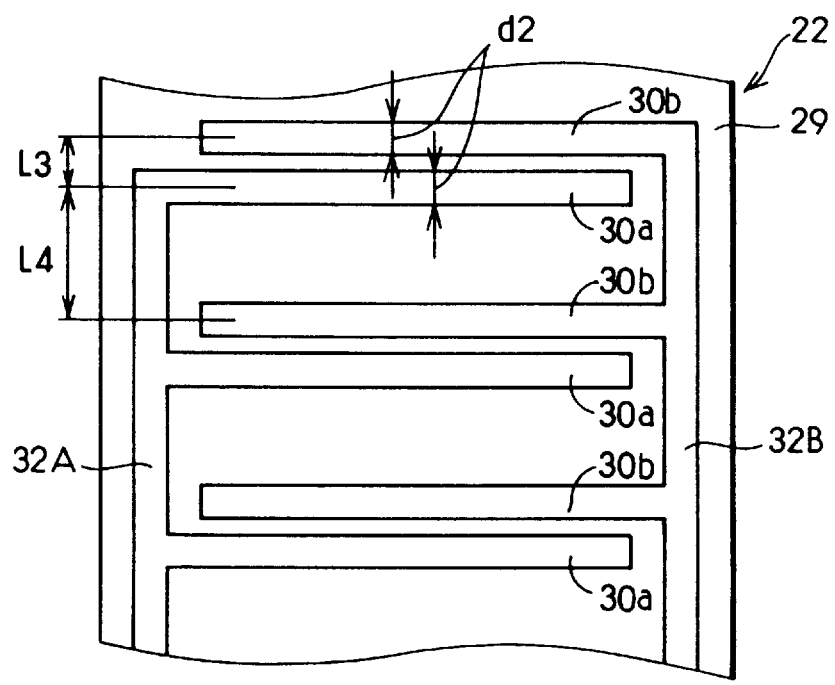
FIG. 29(B) is a partial plan view showing a stator element.

The stator element 22, as shown in FIG. 29(B), has electrodes 30a, 30b provided in an insulation layer 30 so that the electrodes 30a, 30b located by every other one are connected to electricity-feed sections 32A, 32B provided on either sides of the insulation layer 29. The electrodes 30a connected to one electricity-feed portion 32A constitute U-phase, whereas the electrodes 31b connected to the other electricity-feed section 32B V-phase.

The electrodes 30a, 30b for each phase have a width d2 set equal, wherein the width d2 is equal to the width d1 of the electrodes 27a, 27b for each phase of the movable element. Also, setting is made as L3:L4=1:3.

The U-phase electrodes 30a of the stator element 22 are connected from the electricity-feed portion 32A via relays R41, R43, R45 respectively to a "+" side and a "−" side of a high voltage source and a ground 31. Also, the V-phase electrodes 30b of the stator element 22 are connected from electricity-feed portion 32B via relays R42, R44, R46 respectively to a "+" side and a "−" side of a high voltage source 25 and a ground 31.

The operation of the sixth embodiment will be explained.

Figure 30:
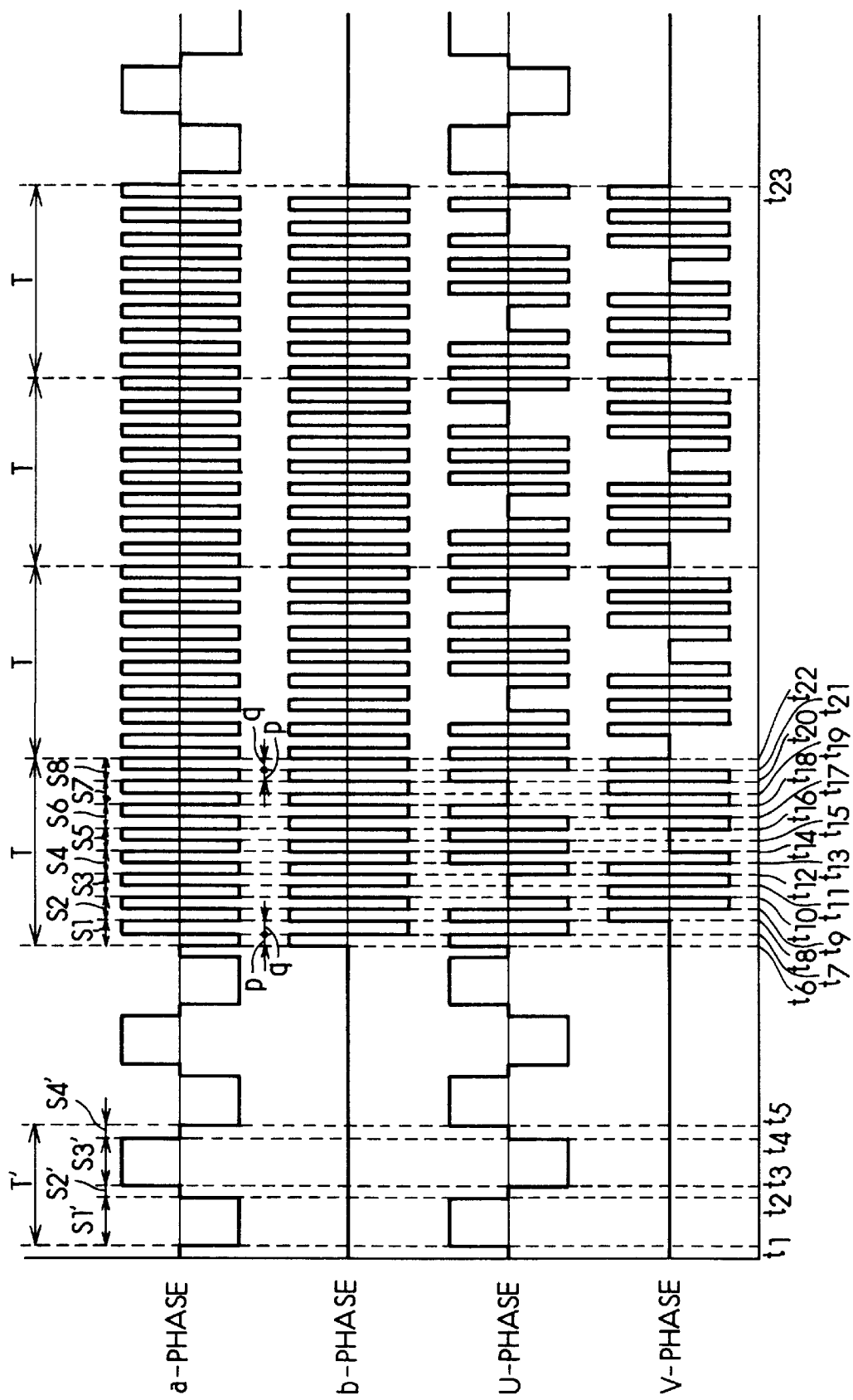
FIG. 30 is a waveform diagram showing voltages applied to a movable element and a stator element of a sixth embodiment.

In FIG. 30, the operating switch 24 is set to "stationary" before time t6 and after time t23.

Incidentally, as shown in FIGS. 31(A)–(D), the relation in position of the movable element 21 and the stator element 22 while the movable element 21 is stationary lies in that the a-phase electrodes 27a of the movable element 21 are opposed to the U-phase electrodes 30a of the stator element 22 and the V-phase electrodes 30b of the stator element 22 is in a position intermediate between an a-phase electrode 27a of and a b-phase electrode 27b of the movable element 21.

While the movable element 21 is stationary, voltages are applied to the a-phase electrodes 27a of the movable element 21 and the U-phase electrodes 30a of the stator element 22 so that the movable element 21 is attracted toward and fixedly held over the stator element 22 by attractive force between the electrodes 27a and 30a due to static electricity. The application of voltages to the electrodes 27a, 30a is performed so as not to electrify the insulation layers 26, 29 of the movable element 21 and the stator element 22.

Specifically, while the movable element 21 is stationary, voltages are applied to the electrodes 27a, 27b, 30a, 30b of the movable element 21 and the stator element 22 with repetition of a minute-time period T' involving a first attraction step S1', a first ground connection step S2', a second attraction step S3', and second ground connection step S4'. The first and second attraction steps S1', and S3' are equal in duration, and the first and second ground connection steps also have equal duration.

Figure 31A:
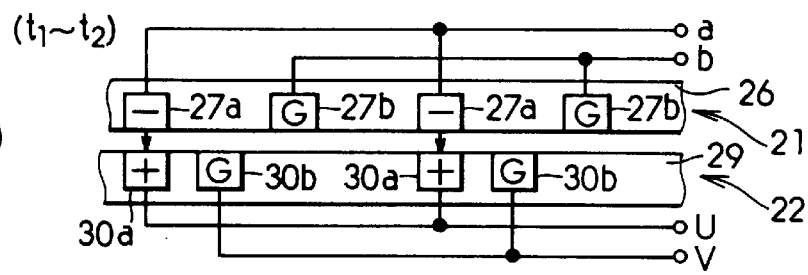
FIGS. 31(A), 31(B), 31(C), and 31(D) are schematic diagrams for explaining a state of movement for the moving element.

During the first attraction step S1', or time t1 to time t2 in FIG. 30, a "−" voltage is applied to the a-phase electrodes 27a of the movable element 21, and a voltage with a polarity "+" is applied to the U-phase electrodes 30a of the stator element 22 in opposite to the a-phase electrodes 27a. On the other hand, the b-phase electrodes 27b of the movable element 21 and the V-phase electrodes 30b of the stator element 22 are connected to the ground 31 to thereby render the potential "0", as shown in FIG. 31(A). Consequently, during the first attraction step S1', attractive force is created between the a-phase electrodes 27a and the U-phase electrodes 30a due to static electricity, as shown by arrows in FIG. 31(A), so that the stator element 22 is attracted toward the movable element 21, thereby fixedly holding it in a stationary state.

Figure 31B:
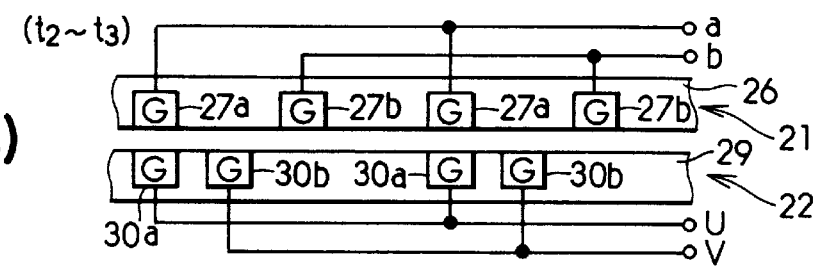

In the first ground connection step S2', or time t2 to time t3 in FIG. 30, subsequent to the first attraction step S1', all the electrodes 27a, 27b, 30a, 30b are connected to the ground 31 to render their potentials "0", as shown in FIG. 31(B).

Figure 31C:
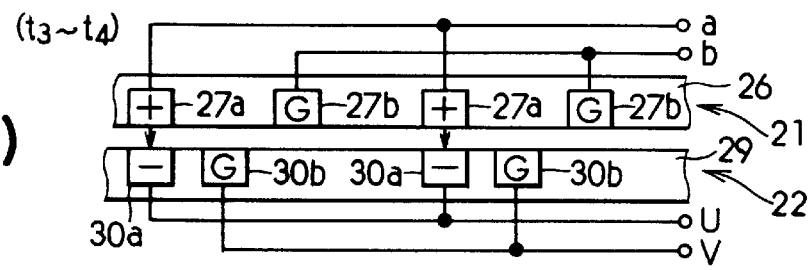

In the second attraction step S2', or time t3 to time t4 in FIG. 30, subsequent to the first ground connection step S1', voltages are applied to the a-phase electrodes 27a of the movable element 21 and U-phase electrodes 30a of the stator element 22 in polarities reverse to the first attraction step S1'. That is, a "+" voltage is applied to the a-phase electrodes 27a, while applying a "−" voltage to the U-phase electrodes 30a opposite thereto, as shown in FIG. 31(C). Also, the b-phase electrodes 27b and the V-phase electrodes 30b are connected to the ground 31 to render their potentials "0".

In the second attraction step S3', attractive force is created between the a-phase electrodes 27a and the U-phase electrodes 30a due to static electricity so that the movable element 21 is fixedly held in a stationary state, as shown in FIG. 31(C), similarly to the first attraction state S1.

Figure 31D:
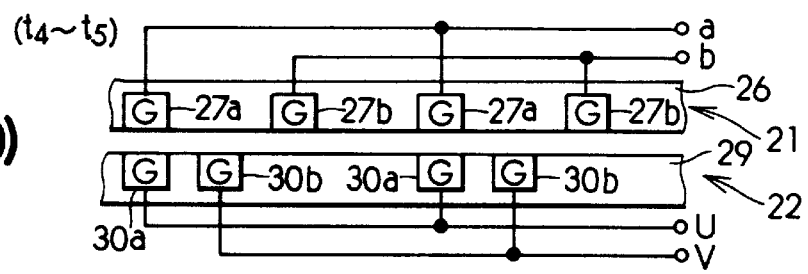

The second attraction step S3' is followed by the second ground connection step S4', or time t4 to time t5 in FIG. 30, wherein all the electrodes 27a, 27b, 30a, 30b of the movable element 21 and the stator element 22 are connected to the ground 31 to render their potentials "0", as shown in FIG. 31(D).

Thus, in the sixth embodiment, since the movable element 21 is fixedly held on the stator element 22 by the attractive force created between the a-phase electrodes 27a of the movable element 21 and the U-phase electrodes 30a of the stator element 22 during the first and second attraction steps S1', S3', there is no necessity of providing an external holding mechanism for holding fixedly the movable element 21 in a stationary state.

Also, the polarities of voltages applied to the a-phase electrodes 27a and the U-phase electrodes 30a are reversed between the first attraction step S1' and the second attraction step S3' as stated above, and the first attraction step S1' and the second attraction step S3' have the equal duration, so that the sum of voltages applied to the movable element 21 and the stator element 22 is "0". Therefore, the first embodiment can prevent the insulation layers 26, 29 from electrifying upon applying voltages to the electrodes 27a, 27b, 30a, 30b.

Further, in the sixth embodiment, the first ground connection step S2' and the second ground connection step S4' are provided between the first attraction step S2' and the second attraction step S4', wherein "+" or "−" polarity voltages are applied to the a-phase, b-phase electrodes 27a, 27b of the movable element 21 and the U-phase, V-phase electrodes of the stator element 22, to bring the potentials of the electrodes 27a, 27b, 30a, 30b to "0" before switching-over of the polarities of the a-phase and b-phase electrodes 27a, 27b and the U-phase and V-phase electrodes 30a, 30b. Therefore, the polarities of voltages applied to the electrodes 27a, 27b, 30a, 30b is not suffered by instantaneous and abrupt changing-over, being prevented from occurrence of so-called ripple noise as a factor for malfunction.

Furthermore, the provision of the first and second ground connection steps S2', S4' for bringing all the potentials of the electrodes 27a, 27b, 30a, 30b to "0" potential contributes to improve the efficiency of removing electrification to be caused by inversion of voltages applied to the a-phase and b-phase electrodes 27a, 27b and the U-phase and V-phase electrodes 30a, 30b during the above first and second attraction steps S1', S3'.

In FIG. 30, although the potential on the b-phase electrodes 27b and the V-phase electrode 30b are rendered "0", voltages may respectively be applied to these electrodes 27b, 30b with similar waveforms to those for the a-phase electrodes 27a and the U-phase electrodes 30a.

In FIG. 30, the operating switch 24 is set to "move rightward" during time t6 to time t23.

When driving the movable element 21, voltages are applied by repetition of the period T involving the first to eight steps S1 to S8, wherein the first to eighth steps S1 to S8 are each divided with a early-half period p and a later-half period q. Voltage is applied during the early-half period p of each steps S1 to S8 such that a driving force acts on the movable element 21 whereas voltage is applied with reversed polarity, during the later-half period q for prevention of electrification on the insulation layers 26, 29.

A voltage of the "−" polarity is applied to the a-phase electrodes 27a of the movable element 21 during the early-half period p of the first step S1, and a voltage of the "+" polarity, with the polarity reversed, is applied during the later-half period q of the first step S1. Also, in the second to eighth steps S2 to S8, voltage is applied in "−" during the early-half period p and "+" during the later-half period q, similarly to the above first step S1. To the b-phase electrodes 27b of the movable element 21, a voltage of the "+"polarity is applied during the early-half period p of the first step S1, and a voltage of the "−" polarity is applied by reversing the polarity during the later-half period q of the first step S1. Similarly, in the second to eighth steps S2 to S8, voltages are applied in "−" during the early-half period p and "+" during the later-half period q.

In the sixth embodiment, since voltage is applied with such waveform, the sum of the voltages, applied within each of steps S1 to S8 to either the a-phase and b-phase electrodes 27a, 27b, become "0", and the sum of voltages applied within one period T is also "0". Therefore, the insulation layer 26 is prevented from being electrified by the voltages applied to the electrodes 27a, 27b of the movable element 21 upon driving the movable element 21.

During the movement of the movable element 21, voltages in the same waveform are applied to the U-phase and V-phase electrodes 30a, 30b of the stator element 22 such that the voltage for the V-phase electrodes 31a is advanced by two steps, or ¼ T in phase with respect to the voltage for the U-phase electrodes 30b.

In the early-half periods p of the first to eighth steps S1 to S8, voltages of "+", "+", "0", "−", "−", "−", "0", and "+" are respectively applied to the U-phase electrodes 30a, for acting a driving force on the movable element 21. On the other hand, in the later-half periods q of the first to eighth steps S1 to S8, voltages with reversed polarities of "−", "−", "0", "+", "+", "+", "0", and "−" are respectively applied thereto.

Then, in the early-half periods p of the first to eighth steps S1 to S8, voltages of "0", "+", "+", "+", "−", "−", and "−" are respectively applied to the V-phase electrodes 30b, for acting a driving force on the movable element 21. On the other hand, in the later-half periods q of the first to eighth steps S1 to S8, voltages with reversed polarities of "0", "−", "−", "−", "0", "+", "+", and "+" are respectively applied thereto.

Thus, in the sixth embodiment, since voltages with polarities, which are reverse to the polarities for the voltages applied to the early-half periods of the first to eighth steps S1 to S8, are applied to the U-phase and V-phase electrodes 30a, 30b during the later-half periods q, the sum of voltages applied to the U-phase and V-phase electrodes 30a, 30b is "0" for each step S1 to S10, and hence the sum of voltages applied, within each period T, to the U-phase and V-phase electrodes 30a, 30b of the stator element 22 is also "0". Therefore, the electrostatic actuator of the sixth embodiment can prevent the insulation layer 29 from electrifying due to application of voltages to the electrodes 30a, 30b of the stator element 22 upon driving the movable element 21.

The movement of the movable element 21 within one period T will be explained with referring to FIG. 32 to FIG. 36.

Figure 32A:
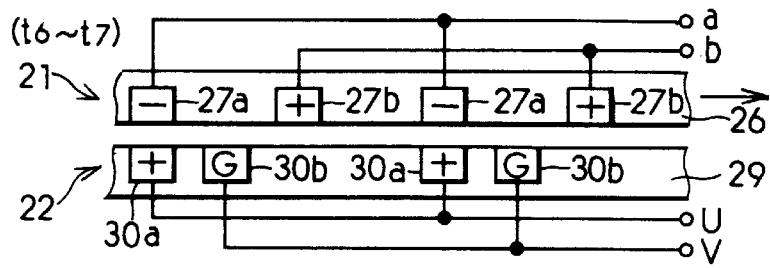
FIGS. 32(A), 32(B), 32(C), 32(D), and 32(E) are schematic diagrams for explaining a state of movement for the moving element.

Here, it is assumed that the relationship in position between the movable element 21 and the stator element 22 is in a state of FIG. 32(A) at a time point that the operating switch 24 is set to "move", because the a-phase electrode 27a of the movable element 21, in a stationary state of the movable element 21, is opposite to the U-phase electrode of the stator element 22 and the V-phase electrodes 30b are in an intermediate position between an a-phase electrode 27a and a b-phase electrode 27b of the movable element 21.

As shown in FIG. 32(A), the a-phase and b-phase electrodes 27a, 27b of the movable element 21 are respectively applied by "−" and "+" voltages during the early-half period p, or time t6 to t7 in FIG. 30, of the first step S1. Also, the U-phase electrodes 30a of the stator element 22 are applied by a "+" voltage and the V-phase electrodes 30b are at a potential of "0" potential.

Figure 32B:
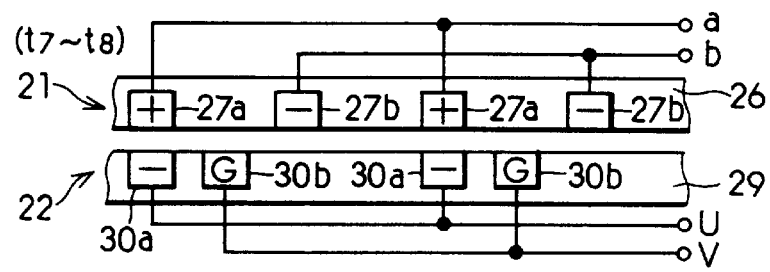

As shown in FIG. 32(B), the a-phase and b-phase electrodes 27a, 27b of the movable element 21 are respectively applied by "+" and "−" voltages during the later-half period q, or time t7 to t8 in FIG. 30, of the first step S1. Also, the U-phase electrodes 30a of the stator element 22 are applied by a "−" voltage and the V-phase electrodes 30b are at a potential of "0".

Figure 32C:
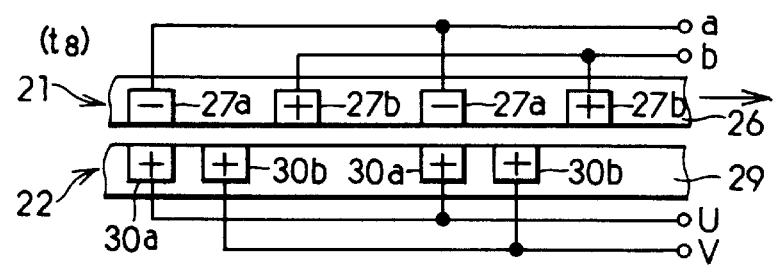

As shown in FIG. 32(C), the voltages applied to the a-phase and b-phase electrodes 27a, 27b of the movable element 21 are respectively switched to "−" and "+" at the commencement of the early-half period p of the second step S2, or at time t8 in FIG. 3. Also, the voltages applied to the U-phase and V-phase electrodes 30a, 30b are both switched to "+".

Figure 32D:
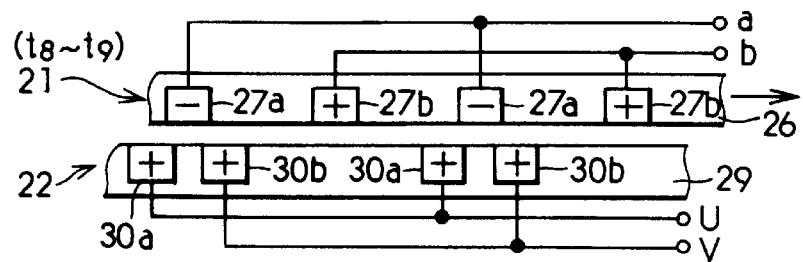

As shown in FIG. 32(D), the movable element 21 moves rightward as viewed in the figure with respect to the stator element 21 so that an a-phase electrode 27a is at an intermediate position between a U-phase electrode 31a and a V-phase electrode 30b during the early-half period p, or time t8 to t9 in FIG. 30, of the second step S2.

Figure 32E:
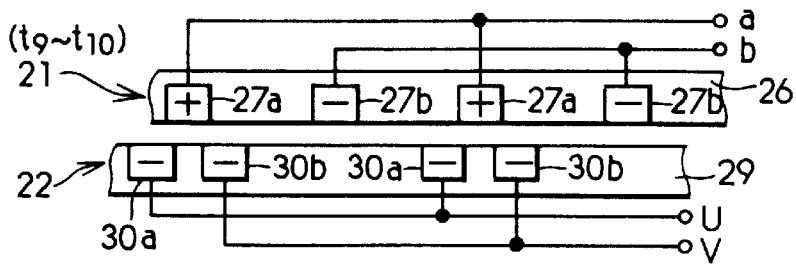

As shown in FIG. 32(E), voltages of "+" and "−" are respectively applied to the a-phase and b-phase electrodes 27a, 27b of the movable element 21 during the later-half q, or time t9 to time t10 in FIG. 30, of the second step S2. Also, the voltages of "−" are applied to the U-phase and V-phase electrodes 30a, 30b of the stator element 22.

Figure 33A:
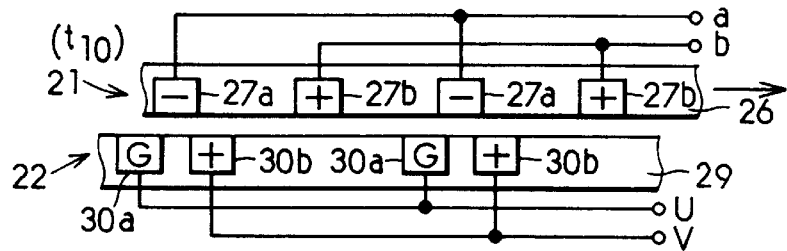
FIGS. 33(A), 33(B), 33(C), 33(D) and 33(E) are schematic diagrams for explaining a state of movement for the moving element.

As shown in FIG. 33(A), the voltages applied to the a-phase and b-phase electrodes 27a, 27b of the movable element 21 are respectively switched to "−" and "+" at the commencement of the early-half period p, or time t10 in FIG. 30, of the third step S3. Also, the voltages applied to the U-phase and V-phase electrodes 30a, 30b of the stator element 22 are respectively switched to "0" and "+".

Figure 33B:
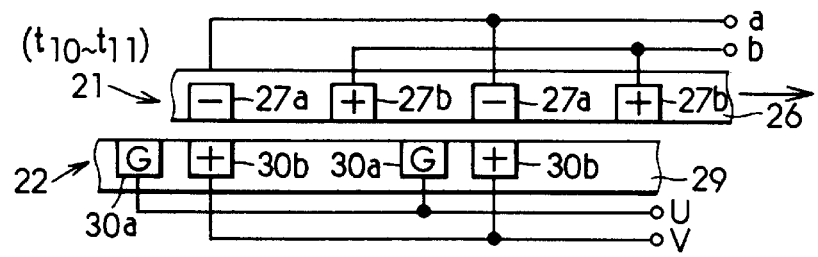

As shown in FIG. 33(B), the movable element 21 moves rightward as viewed in the figure with respect to the stator element 21 so that the a-phase electrodes 27a of the movable element 21 are in a state that they are opposite to the v-phase electrodes 30b of the stator element 22 during the early-half period p, or time t10 to t11 in FIG. 30, of the third step S3.

Figure 33C:
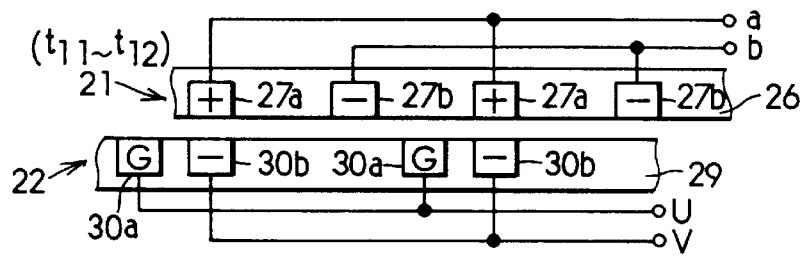

As shown in FIG. 33(C), voltages of "+" and "−" are respectively applied to the a-phase electrodes 27a, 27b of the movable element 21 during the later-half q, or time t11 to time t12 in FIG. 30, of the third step S3. Also, the voltages of "0" and "−" are respectively applied to the U-phase electrodes 30a, 30b of the stator element 22.

Figure 33D:
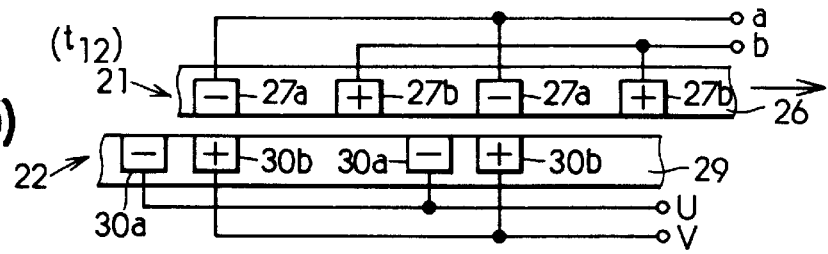

As shown in FIG. 33(D), the voltages applied to the a-phase and b-phase electrodes 27a, 27b of the movable element 21 are respectively switched in polarity to "−" and "+" at the commencement of the early-half period p, or time t12 in FIG. 30, of the fourth step S4. Also, the voltages applied to the U-phase and V-phase electrodes 30a, 30b of the stator element 22 are respectively switched to "−" and "+".

Figure 33E:
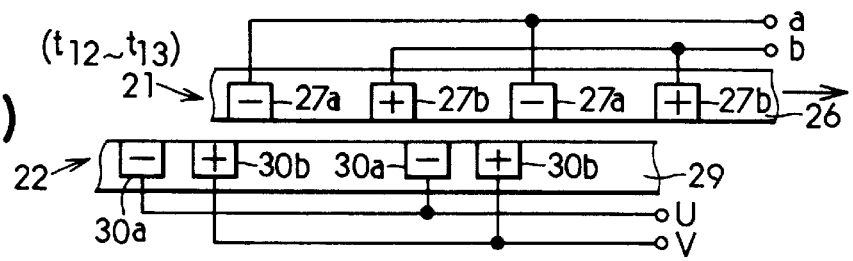

As shown in FIG. 33(E), the movable element 21 moves rightward as viewed in the figure so that an a-phase electrode 27a of the movable element 21 and a V-phase electrode 30b of the stator element 22 overlap widthways by a half during the early-half period p, or time t12 to t13 in FIG. 30, of the fourth step S4.

Figure 34A:
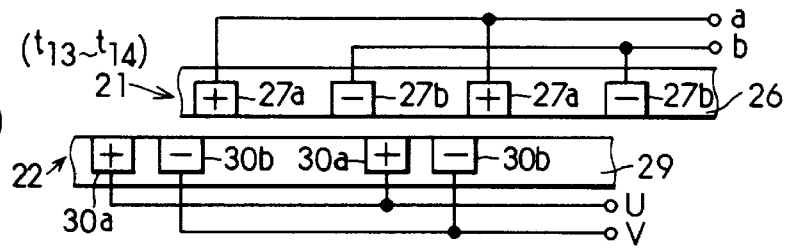
FIGS. 34(A), 34(B), 34(C), 34(D), and 34(E) are schematic diagrams for explaining a state of movement for the moving element.

As shown in FIG. 34(A), voltages of "+" and "−" are respectively applied to the a-phase and b-phase electrodes 27a, 27b of the movable element 21 during the later-half q, or time t13 to time , of the fourth step S3. Also, the voltages of "+" and "−" are respectively applied to the U-phase and V-phase electrodes 30a, 30b of the stator element 22.

Figure 34B:
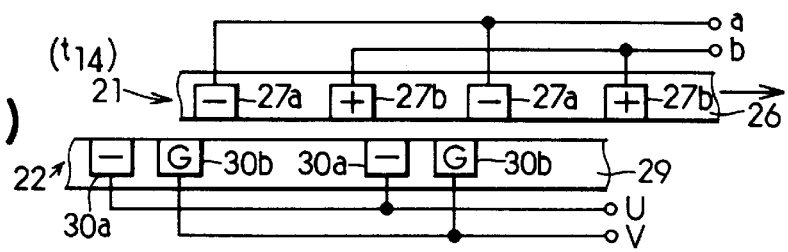

As shown in FIG. 34(B), the voltages applied to the a-phase and b-phase electrodes 27a, 27b of the movable element 21 are respectively switched in polarity to "−" and "+" at the commencement of the early-half period p, or time in FIG. 30, of the third step S3. Also, the voltages applied to the U-phase and V-phase electrodes 30a, 30b of the stator element 22 are respectively switched to "−" and "0".

Figure 34C:
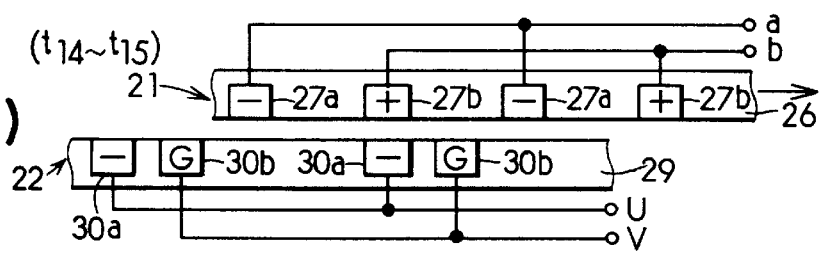

As shown in FIG. 34(C), the movable element 21 moves rightward as viewed in the figure so that the b-phase electrode 27b of the movable element 21 is in a state that it is opposite to the U-phase electrode 30a of the stator element 22 during the early-half period p, or time to time t15 in FIG. 30, of the fifth step S5.

Figure 34D:
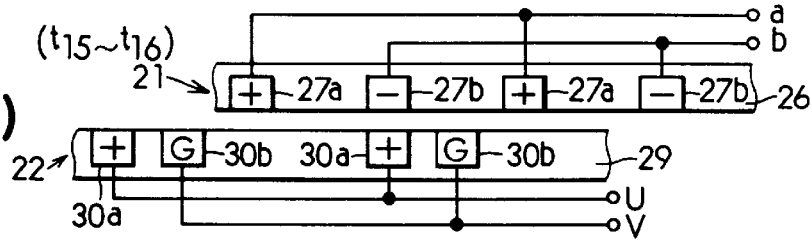

As shown in FIG. 34(D), voltages of "+" and "−" are respectively applied to the a-phase and b-phase electrodes 27a, 27b of the movable element 21 during the later-half q, or time t15 to time t16 in FIG. 30, of the fifth step S3. Also, the voltages of "+" and "0" are respectively applied to the U-phase and V-phase electrodes 30a, 30b of the stator element 22.

Figure 34E:
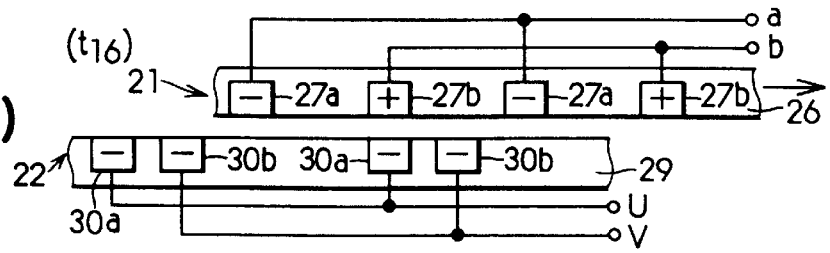

As shown in FIG. 34(E), the voltages applied to the a-phase and b-phase electrodes 27a, 27b of the movable element 21 are respectively switched in polarity to "−" and "+" at the commencement of the early-half period p, or time t16 in FIG. 30, of the sixth step S6. Also, the voltages applied to the U-phase and V-phase electrodes 30a, 30b of the stator element 22 are respectively switched to "−" and "+".

Figure 35A:
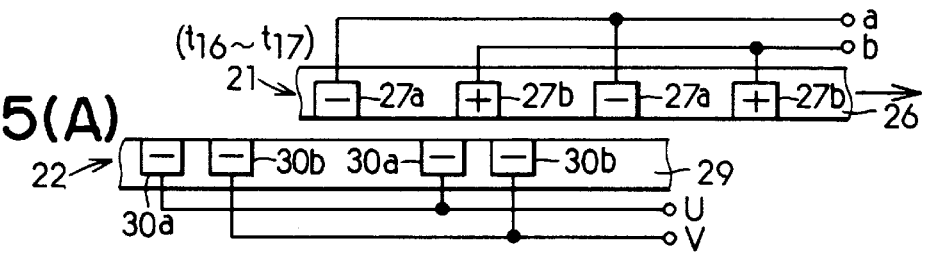
FIGS. 35(A), 35(B), 35(C), 35(D), and 35(E) are schematic diagrams for explaining a state of movement for the moving element.

As shown in FIG. 35(A), the movable element 21 moves rightward as viewed in the figure so that the a-phase and b-phase phase electrodes 27a, 27b of the movable element 21 are in an intermediate position between U-phase and V-phase electrodes 30a and 30b, during the early-half period p, or time t16 to time t17 in FIG. 30, of the sixth step S6.

Figure 35B:
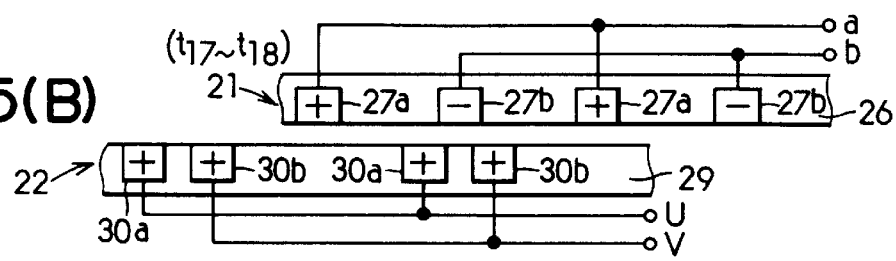

As shown in FIG. 35(B), voltages of "+" and "−" are respectively applied to the a-phase and b-phase electrodes 27a, 27b of the movable element 21 during the later-half q, or time t17 to time t18 in FIG. 30, of the sixth step S6. Also, the a voltage of "+" is applied to both of the U-phase and V-phase electrodes 30a, 30b of the stator element 22.

Figure 35C:
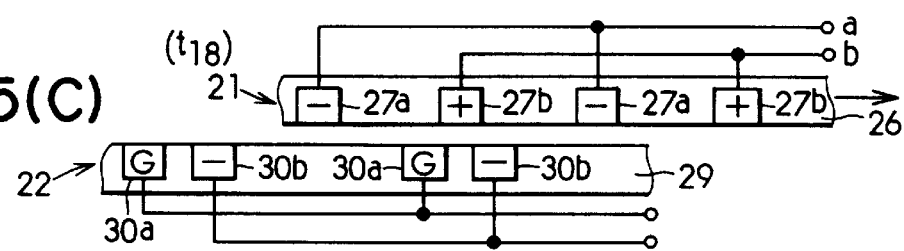

As shown in FIG. 35(C), the voltages applied to the a-phase and b-phase electrodes 27a, 27b of the movable element 21 are respectively switched to "−" and "+" at the commencement of the early-half period p, or time t18 in FIG. 30, of the seventh step S7. Also, the voltages applied to the U-phase and V-phase electrodes 30a, 30b of the stator element 22 are respectively switched to "0" and "−".

Figure 35D:
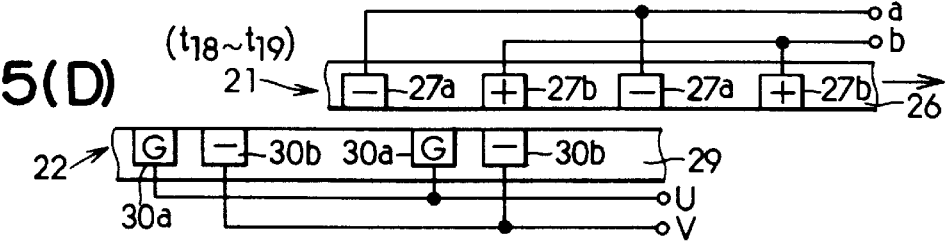

As shown in FIG. 35(D), the movable element 21 moves rightward as viewed in the figure so that the b-phase electrodes 27b of the movable element 21 are in a state that they are opposite to the V-phase electrodes 30b of the stator element 22 during the early-half period p, or time t18 to t19 in FIG. 30, of the seventh step S7.

Figure 35E:
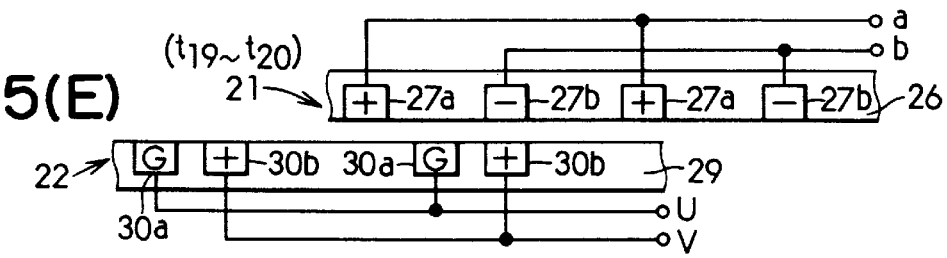

As shown in FIG. 35(E), voltages of "+" and "−" are respectively applied to the a-phase and b-phase electrodes 27a, 27b of the movable element 21 during the later-half q, or time t19 to time t20 in FIG. 30, of the seventh step S7. Also, the voltages of "0" and "+" are respectively applied to the U-phase and V-phase electrodes 30a, 30b of the stator element 22.

As shown in FIG. 36(A), the voltages applied to the a-phase and b-phase electrodes 27a, 27b of the movable element 21 are respectively switched to "−" and "+" at the commencement of the early-half period p, or time t20 in FIG. 30, of the eighth step S8. Also, the voltages applied to the U-phase and V-phase electrodes 30a, 30b of the stator element 22 are respectively switched to "+" and "−".

As shown in FIG. 36(B), the movable element 21 moves rightward as viewed in the figure so that a-phase and b-phase electrodes 27a of the movable element 21 are respectively overlap widthways by a half with U-phase and V-phase electrodes 30a, 30b of the stator element 22 during the early-half period p, or time t20 to t21 in FIG. 30, of the eighth step S8.

As shown in FIG. 36(C), voltages of "+" and "−" are respectively applied to the a-phase and b-phase electrodes 27a, 27b of the movable element 21 during the later-half q, or time t21 to time t22 in FIG. 30, of the eighth step S8. Also, the voltages of "−" and "+" are respectively applied to the U-phase and V-phase electrodes 30a, 30b of the stator element 22.

In this manner, the electrostatic actuator according to the sixth embodiment provides, during driving thereof, steps S1 to S8 divided as a early-half period p and a later-half period q so that, in the early-half period, voltages are applied to the electrodes 27a, 27b, 30a, 30b of the movable element 21 and the stator element 22 to act a driving force on the movable element 21 while, in the later-half period of each of the steps S1 to S8, voltages are applied in polarity reverse to the early-half period p to render "0" the sum of voltages applied to each of the electrodes 27a to 30b in each of the steps S1 to S8, thereby preventing electrification on the insulation layers 26, 29 of the movable element 21 and the stator element 22. Also, in this embodiment, the sum of voltages applied to the electrodes 27a, 27b of the movable element 21 and the stator element 22 within one period C is "0", and therefore it is also possible to prevent electrification on the insulation layer 26, 29 of the movable element 21 and the stator element 22.

Thus, in the sixth embodiment, the insulation layers 26, 29 are prevented from being electrified by applying voltages to the electrodes 27a–30b of the movable element 21 and the stator element 22 during driving of the movable element 21. Consequently, the movable element 21 is prevented from lowering in driving force to be reduced by the electrification on the insulation layers 26, 29 of the electrostatic force acting between the electrodes 27a, 27b of the movable element 21 and the electrodes 30a, 30b of the stator element 22.

Where the operating switch 24 has been set to "move rightward", voltages may be applied in a same pattern to the electrodes 30a, 30b of the stator element 22 by switching over the polarity thereof, wherein the voltage on the V-phase electrodes 30 is delayed by two steps in phase with respect to that of the U-phase electrodes 30a.

The present invention is not limited to the above-stated embodiments, but can be modified in various forms.

Figure 37:
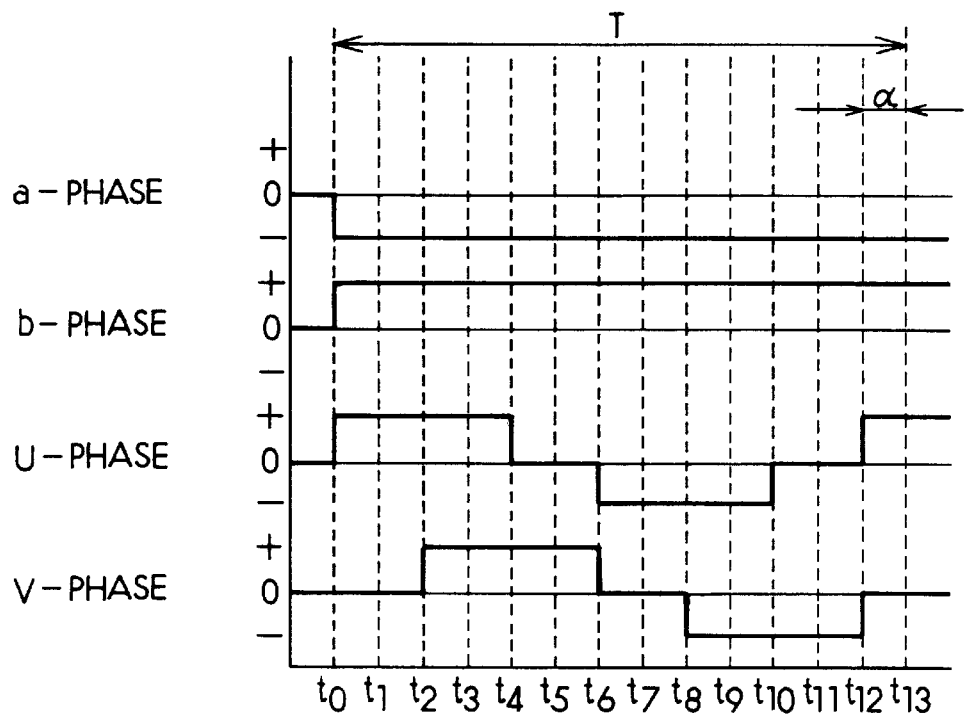
FIG. 37 is a waveform diagram showing another example of voltages applied to a movable element and a stator element.
Figure 38:
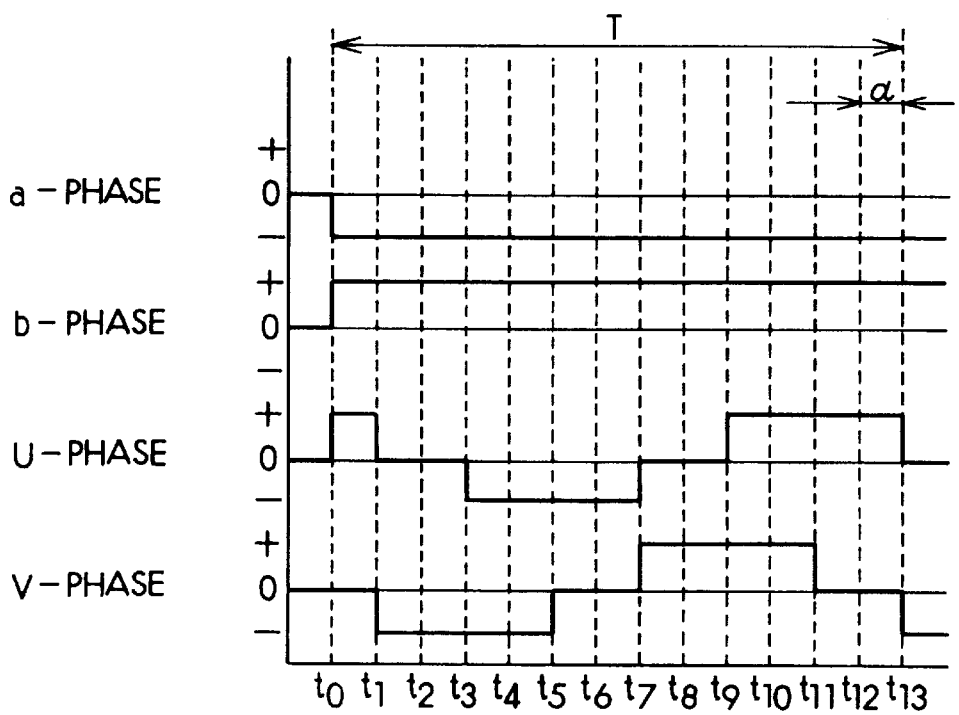
FIG. 38 is a waveform diagram showing another example of voltages applied to a movable element and a stator element.
Figure 39:
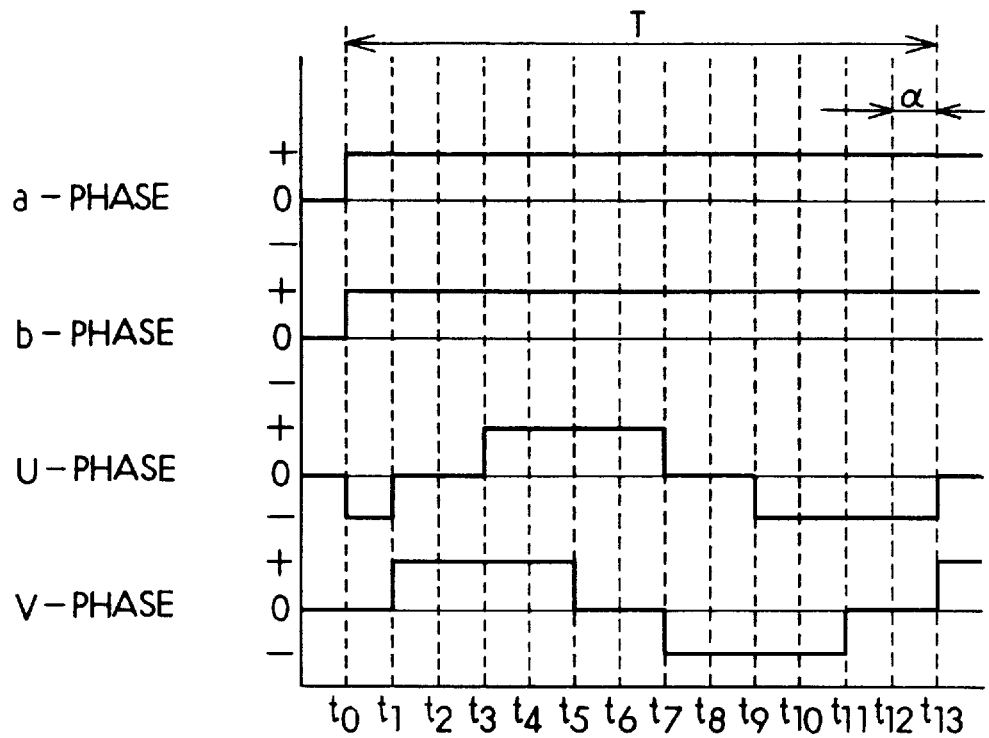
FIG. 39 is a waveform diagram showing another example of voltages applied to a movable element and a stator element.
Figure 40:
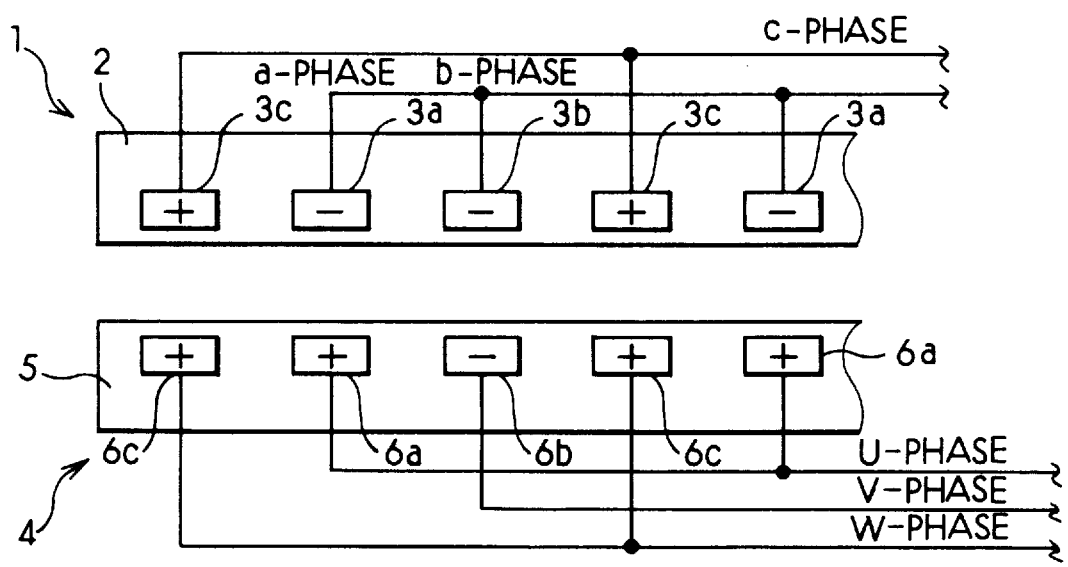
FIG. 40 is a schematic diagram showing one example of a conventional electrostatic actuator.
Figure 41:
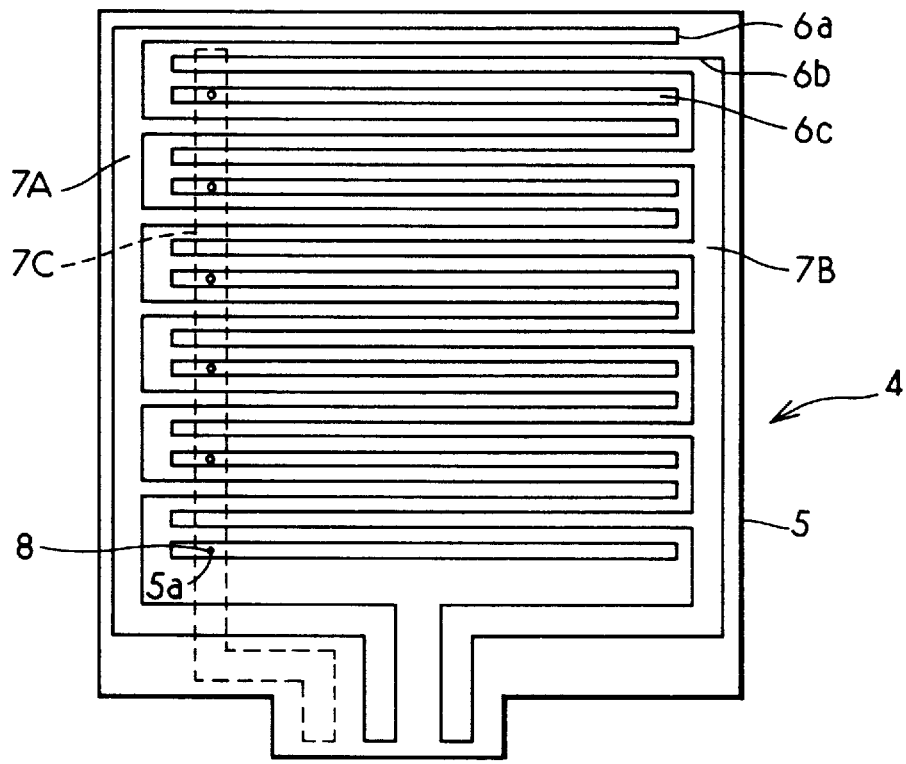
FIG. 41 is a plan view showing the electrostatic actuator of FIG. 40.
Figure 42:
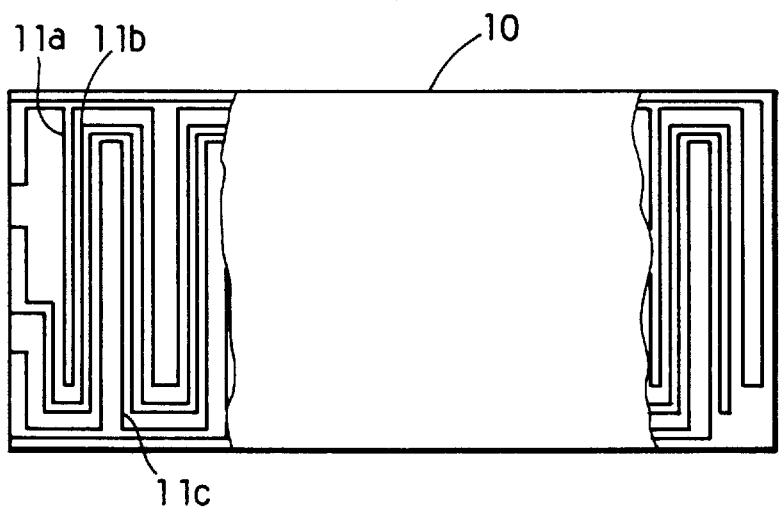
FIG. 42 is a plan view showing another example of a conventional electrostatic actuator.
Figure 43:
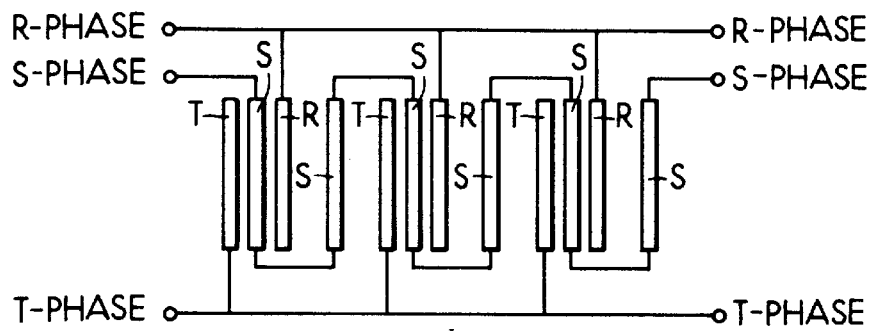
FIG. 43 is a schematic circuit diagram showing another example of a conventional electrostatic actuator.
Figure 44:
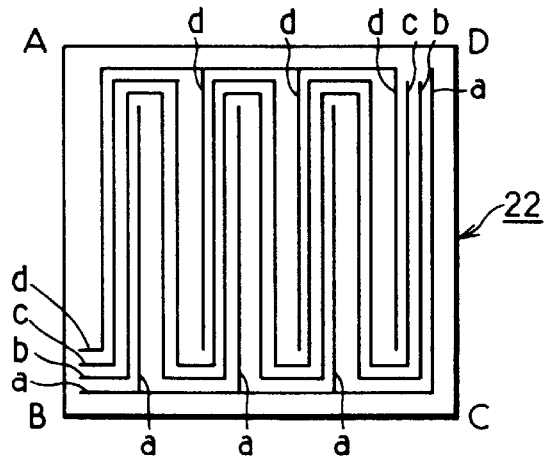
FIG. 44 is a plan view showing another example of a conventional electrostatic actuator.
Figure 45:
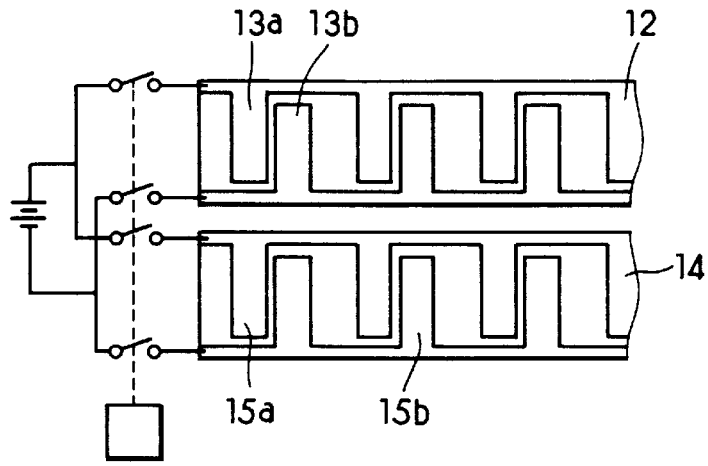
FIG. 45 is a circuit diagram showing another example of a conventional electrostatic actuator.

For instance, in the first embodiment, the movable element 21 can be driven with three voltages of "−", "+", and "0" applied to the electrodes 30a, 30b of the stator element 22, as shown in FIG. 37. Although, the movable element 21 moves rightward in this FIG. 37 example, if the operating switch 24 is set to "move leftward", voltages with waveforms of from time t13 to time t1 in FIG. 37, i.e., waveforms shown in FIG. 38, is applied to the electrodes 30a, 30b. Although the movable element 21 moves leftward in FIG. 38., in case where the polarities of voltages applied for both of the movable element 21 and the stator element 22 are reversal to the case of FIG. 38, the movable element 21 is moved leftward. Thus, if inversion is made on voltages, which are to be applied to the electrodes 27a, 27b of the movable element 21, in dependence on the moving direction of the moving element 21, there is no necessity of supplying constant electricity to the movable element 21 at all times, thereby preventing electrification on the insulation layer 26 of the movable element 21.

Also, in the above embodiments, voltages are applied by fixing the polarity for the electrodes 30a, 30b of the stator element 22 and switching the polarity for the electrodes 27a, 27b of the movable element 21, the application of voltage may be done by switching the polarity for the electrodes 27a, 27b of the movable element 21 and fixing it for the electrodes 30a, 30b of the stator element 22.

Furthermore, in the above embodiment, voltage applied to the electrodes is switched in polarity by turning on and turning off the relays, but the electrodes for each phase may be applied by voltages of alternating waveforms in different phase without employing the relays.

What is claimed is:

1. An electrostatic actuator comprising:

a stator element having a plurality of electrodes provided on an insulation layer thereof;

a movable element having a plurality of electrodes provided on an insulation layer thereof and arranged opposite to said stator element so as to be movable with respect to said stator element in a direction parallel to said stator element; and a voltage being applied to one of said electrodes of said stator element and said electrodes of said movable element with a polarity thereof fixed, and a voltage being applied to the other one of said electrodes of said stator element and said electrodes of said movable element with a polarity thereof being switched so as to drive said movable element in a direction parallel to said stator element through attractive force and repulsive force caused between said electrodes of said movable element and said electrodes of said stator element, wherein said electrodes of said movable element are connected together at every other electrode thereof to provide two electrical phases for said movable element;

said electrodes of said stator element are connected together at every other electrode to provide two electrical phases for said stator element; and an interval of at least one of said electrodes of said movable element and said electrodes of said stator element is unequal.

2. An electrostatic actuator according to claim 1, wherein:

only one of the interval of said electrodes of said movable element and the interval of said electrodes of said stator element is unequal.

3. An electrostatic actuator according to claim 1, wherein:

the interval of said electrodes of said movable element is unequal; and the interval of said electrodes of said stator element is unequal.

4. An electrostatic actuator according to claim 3, wherein:

the interval of said electrodes of said movable element is set identical to the interval of said electrodes of said stator element.

5. An electrostatic actuator comprising:

a stator element having a plurality of electrodes provided on an insulation layer thereof;

a movable element having a plurality of electrodes provided on an insulation layer thereof and arranged opposite to said stator element so as to be movable with respect to said stator element in a direction parallel to said stator element; and a voltage being applied to one of said electrodes of said stator element and said electrodes of said movable element with a polarity thereof fixed, and a voltage being applied to the other one of said electrodes of said stator element and said electrodes of said movable element with a polarity thereof bein switched so as to drive said movable element in a direction parallel to said stator element through attractive force and repulsive force caused between said electrodes of said movable element and said electrodes of said stator element, wherein said electrodes of said movable element are connected together at every other electrode thereof to provide two electrical phases for said movable element;

said electrodes of said stator element are connected together at every other electrode to provide two electrical phases for the stator element;

an interval of at least one of said electrodes of said movable element and said electrodes of said stator element unequal; and a ground section is provided between adjacent ones of said electrodes in at least one of said movable element and said stator element and grounded to zero potential.

6. An electrostatic actuator comprising:

a stator element having a plurality of electrodes provided on an insulation layer thereof, said electrodes of said stator element being connected together at every other electrode to provide two electrical phases for said stator element;

a movable element having a plurality of electrodes provided on an insulation layer thereof and arranged opposite to said stator element so as to be movable with respect to said stator element in a direction parallel to said stator element, said electrodes of said movable element being connected together at every other electrode thereof to provide two electrical phases for said movable element;

an interval of at least one of said electrodes of said movable element and said electrodes of said stator element being unequal; and control means for controlling voltage applied to the electrodes of the movable element and the stator element so that said electrodes of said movable element and said stator element are supplied, at a time of driving said movable element, with voltages in which polarities are switched at a plurality of steps, with each step being divided into an early half period and a later half period;

said electrodes of said movable element and said stator element are supplied, during the early half period, with voltages so that a driving force is exerted on said movable element to move said movable element in a direction parallel to said stator element; and said electrodes of said movable element and said stator element are supplied, during the later half period, with voltages which are reversed in polarity from the voltages supplied in the early half period.

7. An electrostatic actuator comprising:

a stator element having a plurality of electrodes provided on an insulation layer thereof, said electrodes of said stator element being connected together at every other electrode to provide two electrical phases for said stator element;

a movable element having a plurality of electrodes provided on an insulation layer thereof and arranged opposite to said stator element so as to be movable with respect to said stator element in a direction parallel to said stator element, said electrodes of said movable element being connected together at every other electrode thereof to provide two electrical phases for said movable element;

an interval of at least one of said electrodes of said movable element and said electrodes of said stator element being unequal; and control means for controlling voltage applied to the electrodes of the movable element and the stator element so that said electrodes of said movable element and stator element are supplied, at a time of stopping said movable element, with voltages in which polarities are switched at a plurality of steps, so that said electrodes of said movable element and said stator element which oppose each other are supplied with voltages of different polarities and each of said electrodes of said movable element and said stator element are alternately supplied with voltages of a positive polarity and a negative polarity.

* * * * *